US 6,556,711 B2

(12) United States Patent
Koga et al.

(10) Patent No.: US 6,556,711 B2
(45) Date of Patent: Apr. 29, 2003

(54) IMAGE PROCESSING APPARATUS AND METHOD

(75) Inventors: Shinichiro Koga, Utsunomiya (JP); Yoshihiro Ishida, Kawasaki (JP); Osamu Yoshizaki, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/162,727

(22) Filed: Sep. 30, 1998

(65) Prior Publication Data

US 2002/0064307 A1 May 30, 2002

Related U.S. Application Data

(62) Division of application No. 08/579,358, filed on Dec. 27, 1995, now Pat. No. 5,848,185.

(30) Foreign Application Priority Data

Dec. 28, 1994 (JP) .............................................. 6-329111
Jun. 8, 1995 (JP) .............................................. 7-141692

(51) Int. Cl.[7] .................................................. G06K 9/34
(52) U.S. Cl. ...................... 382/173; 382/299; 358/462; 358/464
(58) Field of Search .................................. 382/164, 173, 382/176, 177, 180, 298, 299; 358/453, 462, 464

(56) References Cited

U.S. PATENT DOCUMENTS

| 5,060,280 A | 10/1991 | Mita et al. ..................... 382/33 |
| 5,267,333 A | 11/1993 | Aono et al. .................. 358/464 |
| 5,289,296 A | 2/1994 | Yamada ....................... 358/530 |
| 5,459,586 A * | 10/1995 | Nagasato et al. ............ 358/450 |
| 5,613,016 A * | 3/1997 | Saitoh ........................ 382/174 |
| 5,680,150 A | 10/1997 | Shimizu et al. ............. 345/115 |
| 5,796,862 A * | 8/1998 | Pawlicki et al. ............. 382/173 |
| 5,867,593 A * | 2/1999 | Fukuda et al. ............... 382/176 |
| 5,872,864 A * | 2/1999 | Imade et al. ................. 382/176 |
| 5,943,680 A | 8/1999 | Shimizu et al. ............. 707/528 |
| 5,949,555 A | 9/1999 | Sakai et al. .................. 358/462 |
| 6,072,941 A | 6/2000 | Suzuki et al. ............... 395/109 |
| 6,282,314 B1 | 8/2001 | Sugiura et al. ............. 382/173 |

FOREIGN PATENT DOCUMENTS

| EP | 0516576 | 12/1992 | ............ G06K/9/20 |
| JP | 4-157872 A | 5/1992 | |
| JP | 4-356873 A | 12/1992 | |
| JP | 05274472 | * 10/1993 | ............ G06K/9/20 |

OTHER PUBLICATIONS

Yamata et al.; "Multimedia Document Structuring Processing System", The Journal of the Institute of Image Electronics Engineers of Japan, vol. 19, No. 5, pp. 286–295, 1990.

(List continued on next page.)

Primary Examiner—Jingge Wu
(74) Attorney, Agent, or Firm—Fitzpatrick, Cella, Harper & Scinto

(57) ABSTRACT

A digital color image to be processed is inputted at a color image input step, image segments are extracted from the input color image at an image-segment extraction step, and the data of the extracted image segments is created. Next, image-segment components in each extracted image segment are discriminated at an image-segment discrimination step, and each extracted image segment is subjected to zoom processing, which conforms to the discriminated image-segment component, at an adaptive zoom step, thereby creating a zoomed image of the input image. The zoomed image that has been created is displayed, outputted as a hard copy or delivered to a transmission line at a color image output step. Accordingly, a color image in which image segments having different characteristics are mixed can be subjected to excellent processing.

10 Claims, 55 Drawing Sheets

OTHER PUBLICATIONS

"Parallel Field Segmentation of Free–Format Documents", 1979 Information Processing society of Japan, 20th All–Japan Convention, 2E–1.

"Dialog–type Analytical Support System in Understanding of Document Images, and Document Image Data–Base Editing Management system", Kato, Hanaki, Sakai, Technical Report of the Institute of Electronics, Information and Communication Engineers of Japan, PRL84–101, pp. 65–72 (1984).

"Structuring of Color Image Information by Area Partition Processing", Journal of Information Processing Society of Japan, vol. 19, No. 12, pp. 1130–1136, Dec. 1978.

The Institute of Electronics, Information and Communication Engineers, 1990, Spring, All–Japan Convention, D416 7–168.

Testuya, Ochi: "Bilevel Rendition Method for Documents Including Gray–Scale and Bilevel Image", The Transactions of the Institute of Electronic and Communication Engineers, vol. J67–B, No. 7, pp. 781–788, 1984.

Ito, et al.: "Parallel Field Segmentation of Free–Format Documents", 1979 Information Processing Society of Japan, 20th All–Japan Convention, pp. 453–454.

IBM Technical Disclosures Bulletin, vol. 31, No. 7, pp. 73–74, XP00011103, "Automatic Document Segmentation".

Matsumoto Kobayashi: "Study on the Effect of the Resolution Conversion on Picture Quality", The Journal of the Institute of Image Electronics Engineers of Japan, vol. 12, No. 5, pp. 354–362, 1983.

The Transactions of the Institute of Electronics, Information and Communication Engineers B–I, vol. J75–BI, No. 6, pp. 422–430, 1992, Jun. 1992.

* cited by examiner

FIG. 5A
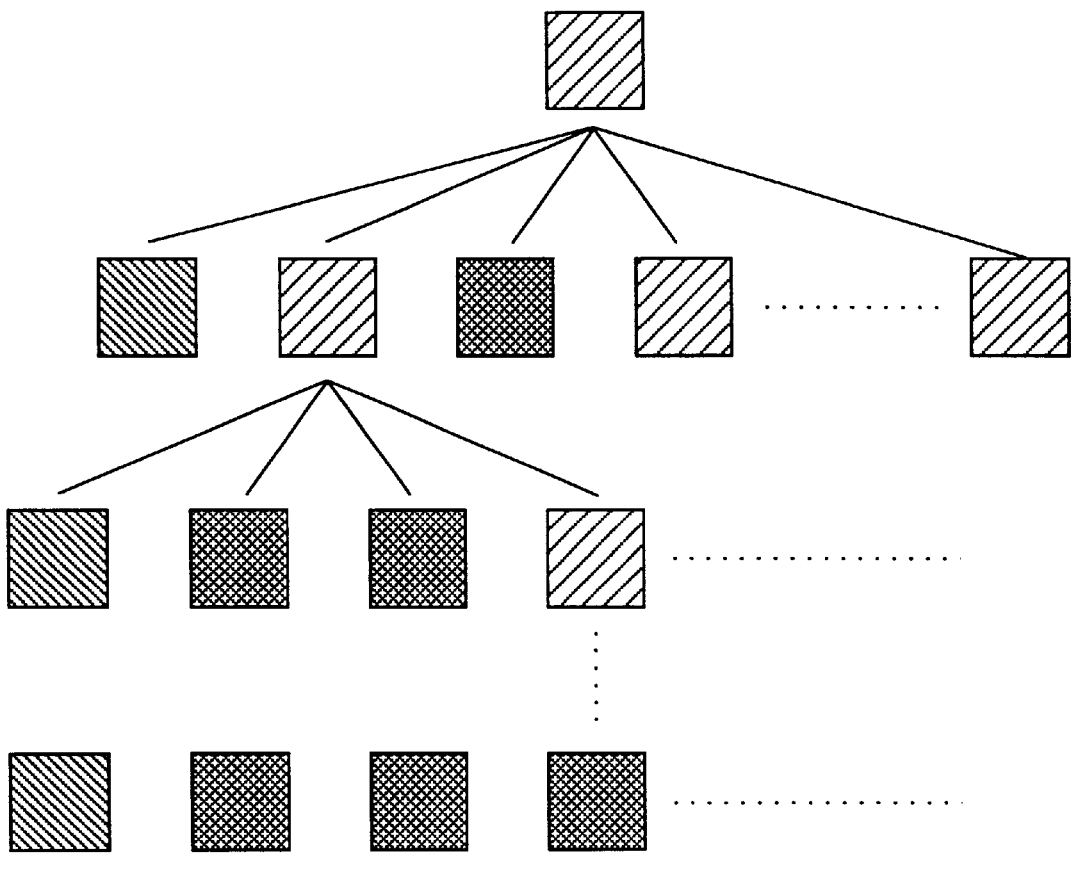
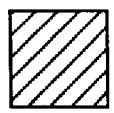 INTERMEDIATE IMAGE-SEGMENT NODE
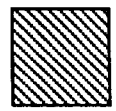 BACKGROUND IMAGE-SEGMENT NODE
(FINAL IMAGE-SEGMENT NODE)
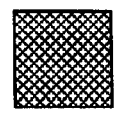 GENERAL IMAGE-SEGMENT NODE
(FINAL IMAGE-SEGMENT NODE)

FIG. 5B

| IMAGE-SEGMENT TYPE | |
|---|---|
| IMAGE-SEGMENT POSITION<br><br>x COORDINATE<br>y COORDINATE<br>WIDTH<br>HEIGHT | |
| IMAGE-SEGMENT SHAPE | |
| IMAGE-SEGMENT COMPONENT | |
| IMAGE-SEGMENT COLOR<br><br>R<br>G<br>B | |
| PARENT NODE | |
| CHILD NODE | |

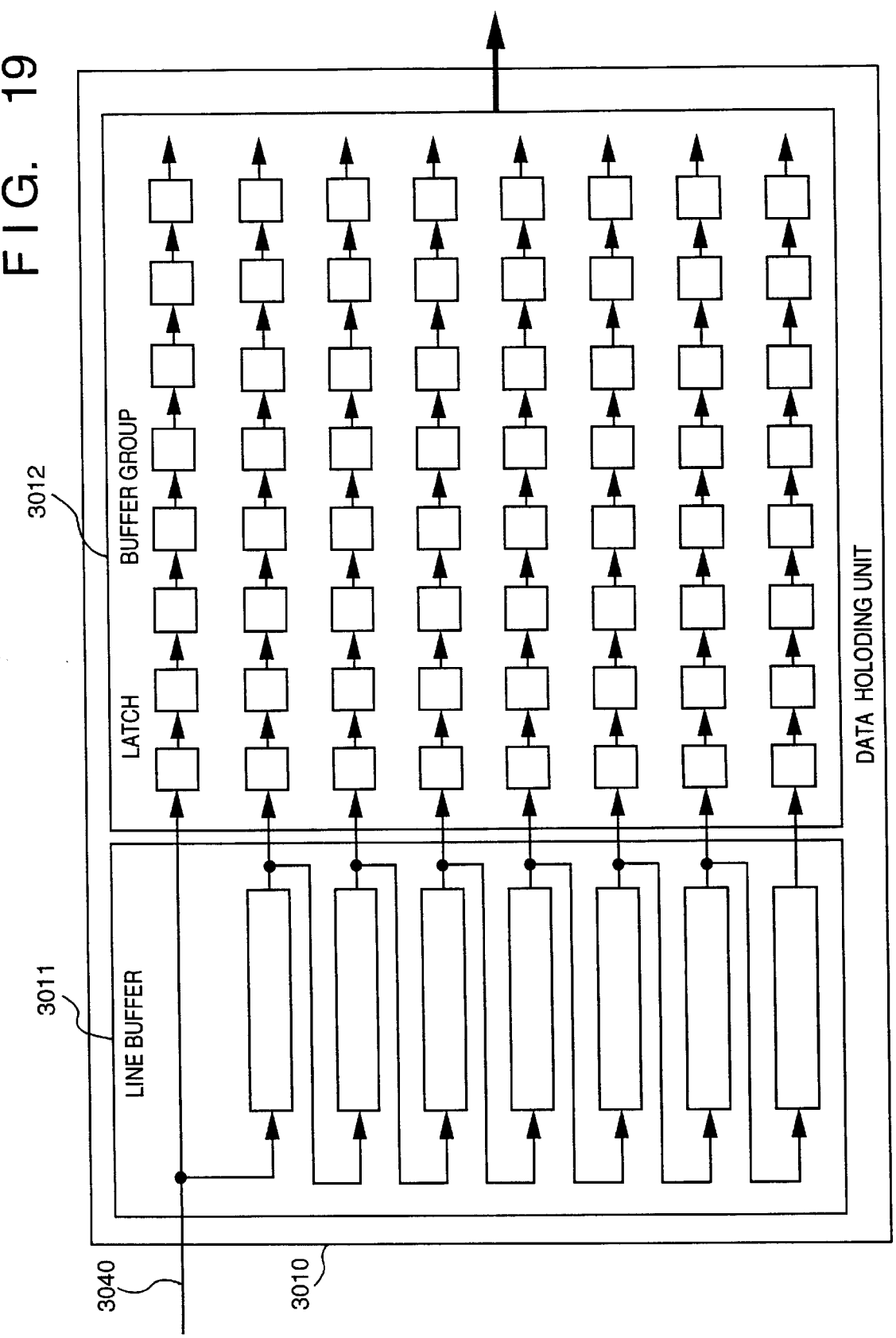

FIG. 24
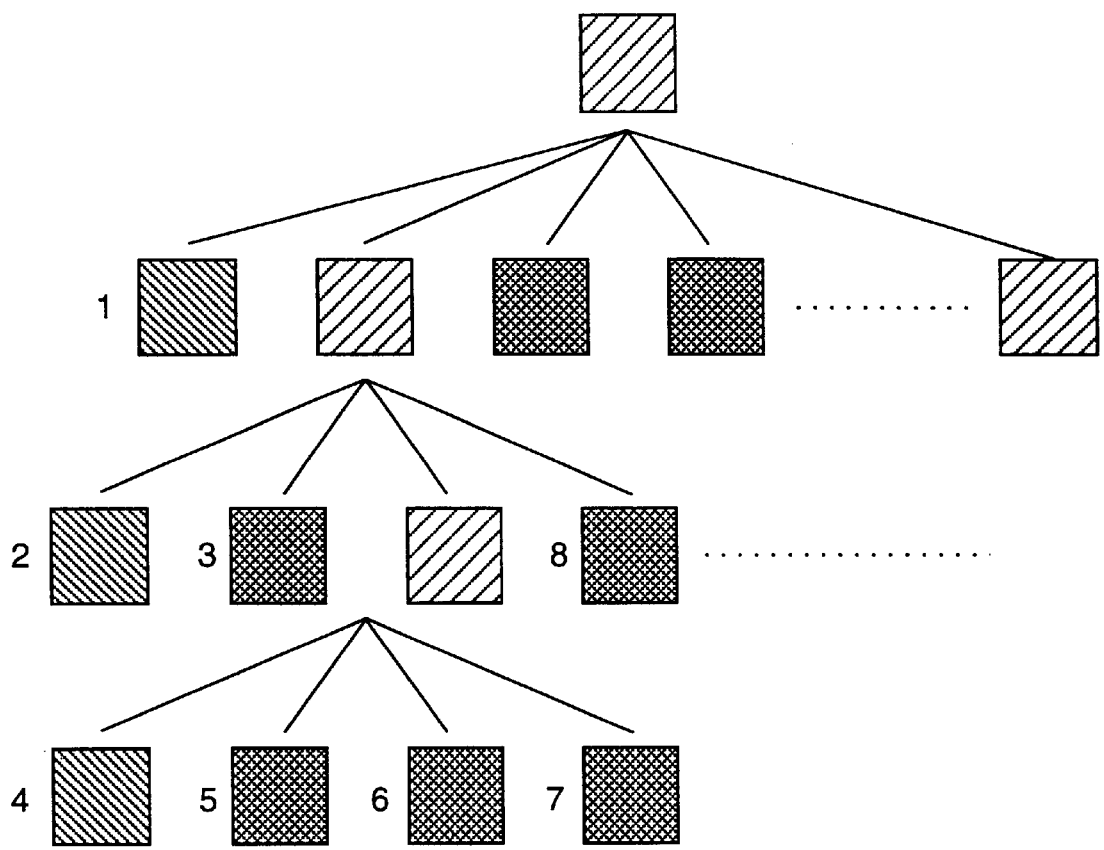
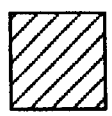 INTERMEDIATE IMAGE-SEGMENT NODE
 BACKGROUND IMAGE-SEGMENT NODE
(FINAL IMAGE-SEGMENT NODE)
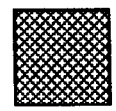 GENERAL IMAGE-SEGMENT NODE
(FINAL IMAGE-SEGMENT NODE)

FIG. 30A

| | |
|---|---|
| IMAGE-SEGMENT TYPE | |
| IMAGE-SEGMENT POSITION<br>　　x COORDINATE<br>　　y COORDINATE<br>　　WIDTH<br>　　HEIGHT | |
| IMAGE-SEGMENT SHAPE | |
| IMAGE-SEGMENT COMPONENT | |
| IMAGE-SEGMENT COLOR<br>　　R<br>　　G<br>　　B | |
| PARENT NODE | |
| CHILD NODE | |

FIG. 30B

| | |
|---|---|
| IMAGE-SEGMENT TYPE | |
| IMAGE-SEGMENT POSITION<br>　　x COORDINATE<br>　　y COORDINATE<br>　　WIDTH<br>　　HEIGHT | |
| IMAGE-SEGMENT SHAPE | |
| IMAGE-SEGMENT COMPONENT | |
| IMAGE-SEGMENT IMAGE DATA | |
| PARENT NODE | |
| CHILD NODE | |

FIG. 54
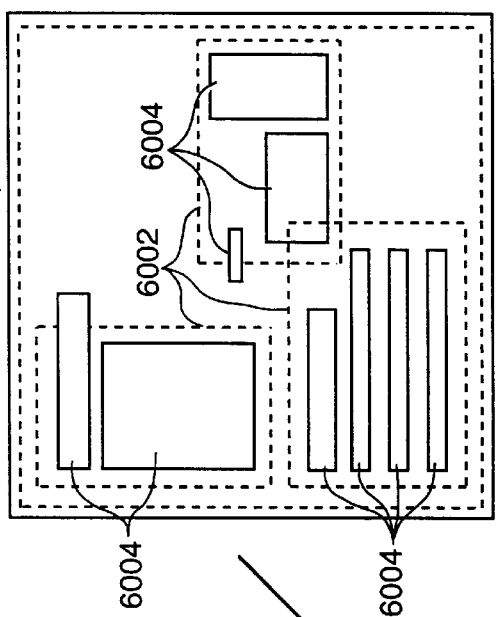
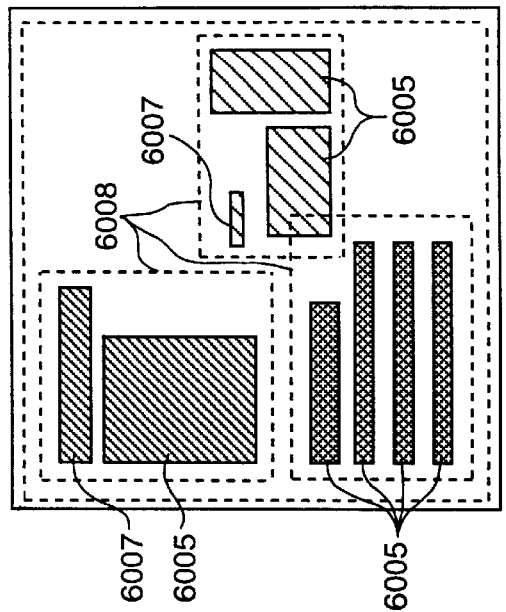
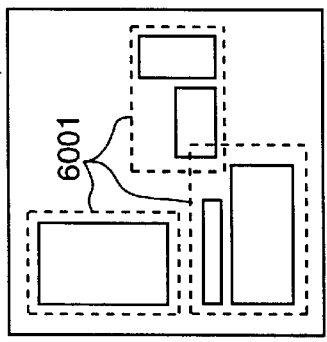
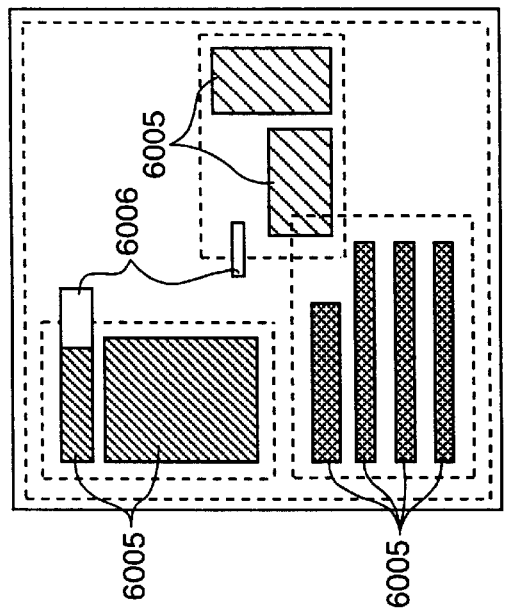

FIG. 55
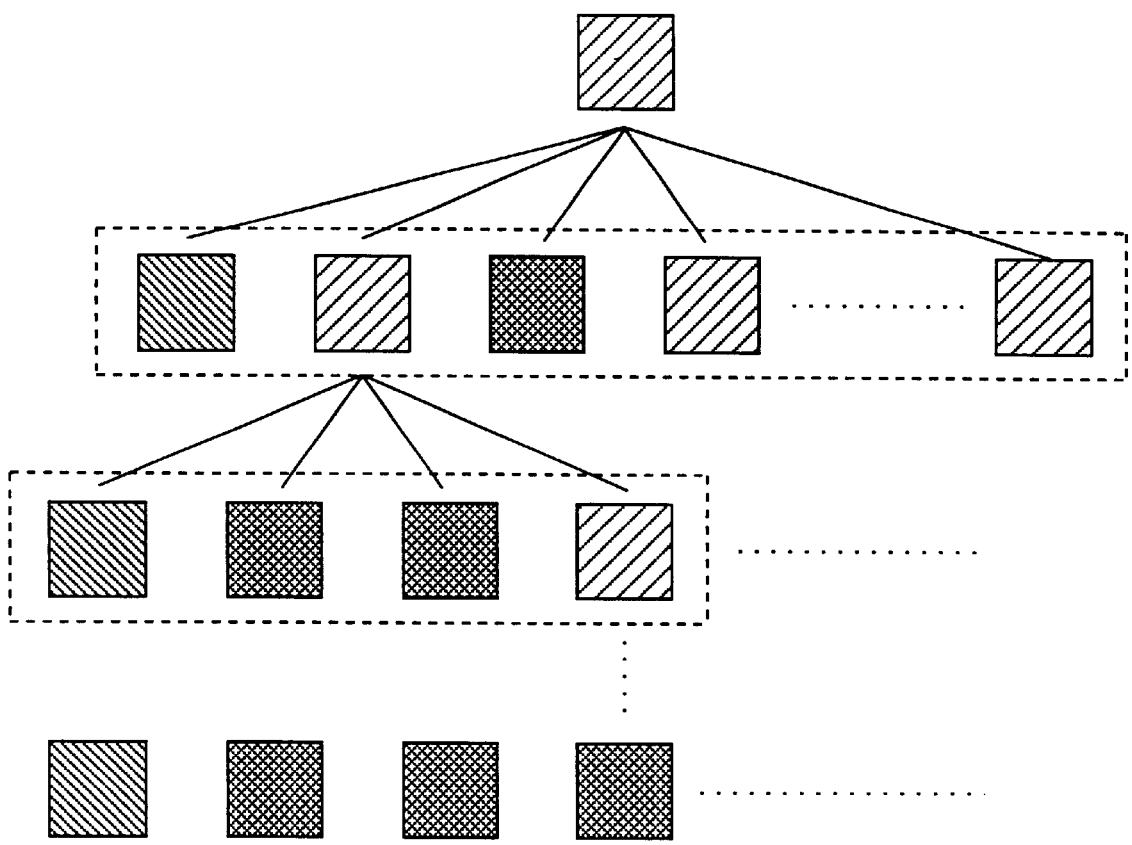
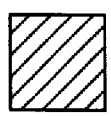 INTERMEDIATE IMAGE-SEGMENT NODE
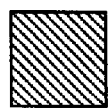 BACKGROUND IMAGE-SEGMENT NODE
(FINAL IMAGE-SEGMENT NODE)
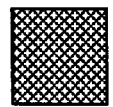 GENERAL IMAGE-SEGMENT NODE
(FINAL IMAGE-SEGMENT NODE)
 GROUP OF IMAGE SEGMENTS OF SAME LEVEL

FIG. 56A

| DIRECTORY INFORMATION | ... | IMAGE INPUT MODULE | IMAGE-SEGMENT EXTRACTION MODULE | IMAGE-SEGMENT CHARACTERISTIC DISCRIMINATION MODULE | ... | IMAGE ZOOMING MODULE | IMAGE COMPRESSION MOUDLE | DATA FORMAT CONVERSION MODULE | IMAGE EDITING MODULE | IMAGE OUTPUT MOUDLE |

FIG. 56B

| DIRECTORY INFORMATION | ... | IMAGE INPUT MODULE | REDUCED-IMAGE CREATION MOUDLE | REDUCED-IMAGE IMAGE-SEGMENT EXTRACTION MOUDLE | INPUT-IMAGE IMAGE-SEGMENT EXTRACTION MODULE | IMAGE-SEGMENT COMPONENT DISCRIMINATION MOUDLE | ... | IMAGE ZOOMING MODULE | IMAGE COMPRESSION MOUDLE | DATA FORMAT CONVERSION MODULE | IMAGE EDITING MODULE | IMAGE OUTPUT MOUDLE | ... |

IMAGE PROCESSING APPARATUS AND METHOD

This application is a division of application Ser. No. 08/579,358, filed on Dec. 27, 1995, now U.S. Pat. No. 5,848,185.

BACKGROUND OF THE INVENTION

1. Field of the Invention

This invention relates to an image processing apparatus and method. More particularly, the invention relates to an image processing method and apparatus for extracting image segments having different characteristics from an input color image and judging each of the characteristics of these image segments.

2. Description of the Related Art

Apparatuses for inputting and outputting color images have begun to find wider use in the field of office automation. This has been accompanied by greater opportunities for handling color images obtained by using an input device such as a scanner to read an original of a color image the greater part of which is occupied by a black-and-white portion or a portion wherein the number of colors is limited. Such a color image shall be referred to as a "document image". A feature of a document image is that, unlike other images, a document image includes a mixture of image segments (such as character image segments and photographic image segments) having different properties. There are cases in which an image having good picture quality is not obtained even if use is made of processing techniques utilized in other fields, such as a technique for zooming or a technique for reducing the quantity of data. Further, there is increasing demand for re-utilizing digital data obtained by structuring the color image of an original. More specifically, this entails inputting, into a computer, characters and photographs from the original in the form of character codes and image data, respectively, whereby the inputted information can be re-utilized in, say, desktop publishing (DTP).

Next, a technique for subjecting an image to zoom processing, a technique for reducing the quantity of data and a technique for image segmentation (inclusive of a technique for structuring a document image) will be described.

[Zoom Processing]

Methods of zooming an image (inclusive of converting pixel density) include selective processing conversion (SPC), in which each pixel of an original image is periodically eliminated in dependence upon the zoom ratio (this is image reduction) or in which each pixel is repeated in dependence upon the zoom ratio (this is image enlargement) (see Matsumoto, Kobayashi: "Study on the Effect of the Resolution Conversion on Picture Quality", *The Journal of the Institute of Image Electronics Engineers of Japan*, Vol. 12, No. 5, pp. 354–362, 1983), and a method of obtaining the value of a pixel of interest by interpolation from neighboring pixels following a coordinate transformation (an affine transformation, etc.).

Further, a method proposed by the present applicant is available as a method of zooming a binary image. This method relates to an apparatus for extracting, smoothing and zooming outline information of a binary image and involves extracting outline vectors from a binary image, creating outline vectors that have been smoothly zoomed to a desired magnification (arbitrary) in the state of the extracted outline vector expression, and reproducing the binary image from the smoothing zoomed outline vectors, thereby obtaining a high-quality digital image zoomed to the desired magnification (arbitrary).

[Reduction of Data Quantity]

An example of an available method of reducing the quantity of image data when the image is stored or communicated is a coding method using a discrete cosine transform (DCT) according to the Joint Photographic Experts Group (JPEG). In another proposed method, a color image is converted to a uniform color space, after which the image is split up using color difference. The shape of a segment is subjected to chain coding, hue is coarsely quantized segment by segment using stored colors, saturation is subjected to a polynomial approximation and lightness is subjected to adaptive DCT coding, whereby the image data is coded. (See *The Transactions of the Institute of Electronics, Information and Communication Engineers*, B-I, Vol. J75-B-I, No. 6, pp. 422–430, 1992, June, 1992.)

Further, an example of a method of reducing the quantity of data in a binary image is MR/MMR coding or coding in accordance with the Joint Bi-Level Image Group (JBIG).

[Image Segmentation (Inclusive of Structuring of a Document Image)]

An example of a method of segmenting a color image is a recursive threshold-value method (see "Structuring of Color Image Information by Area Partition Processing", *Journal of Information Processing Society of Japan*, Vol. 19, No. 12, pp. 1130–1136, Dec. 1987). According to this method, processing for deciding a threshold value for area partitioning from the value of a histogram in RGB, HSI, YIQ color features and then extracting an area is recursively repeated with regard to each extracted area. Another reported method is the limited-color expression method. This utilizes a color quantizing technique in which a color distribution is partitioned repeatedly until attainment of a number of colors in which a color error cannot be visually recognized by the human eye (see *The Institute of Electronics, Information and Communication Engineers*, 1990, Spring, All-Japan Convention, D146 7–168).

Examples of a method of segmenting image segments applied to a document image is one in which areas are judged pixel by pixel using the information possessed by neighboring pixels (see Tetsuya, Ochi: "Bilevel Rendition Method for Documents Including Gray-Scale and Bilevel Image", *The Transactions of the Institute of Electronic and Communication Engineers*, Vol. J67-B, No. 7, pp. 781–788, 1984), and one in which an image segment is segmented by utilizing the background of a document image based upon the property that an image segment is partitioned by the background, after which the area is subjected to judgment (see Ito, et al: "Parallel Field Segmentation of Free-Format Documents", 1979 *Information Processing Society of Japan*, 20th All-Japan Convention, pp. 453–454). Some of these papers also propose applying the results obtained by image segmentation to the structuring of document images. (For example, see Yamata, et. al: "Multimedia Document Structuring Processing System", *The Journal of the Institute of Image Electronics Engineers of Japan*, Vol. 19, No. 5, pp. 286–295, 1990).

However, the problems described below arise in the techniques described above.

[Problems with Zoom Processing]

The SPC zoom method is capable of forming a zoomed image in simple fashion but problems such as jaggies arise in terms of image quality.

Further, a zoom method using coordinate transformation is effective for natural images, such as images of scenery.

However, when this method is applied to document images, the edges of character or line drawing portions such as characters and graphs become blurred owing to interpolation processing.

Further, the method of zooming a binary image proposed by the present applicant is very effective as a method of extracting, smoothing and zooming the outline information of a binary image. However, this method cannot be applied directly to zooming of a color image or grayscale image.

[Problem with Data-quantity Reduction]

The method of reducing the quantity of data by coding using a DCT is effective for a natural image. However, when a document image is compressed and reproduced, image quality markedly deteriorates at character or line-drawing portions such as characters and graphs.

The method of segmentation and coding a segment is also for application to natural images and lightness is therefore subjected to adaptive DCT coding. As a result, the lightness information comes to occupy a major part of the total quantity of information. Accordingly, this method is useful with regard to continuous tone portions of a color image. However, coding efficiency is poor with regard to documents, in which black-and-white portions or limited-color portions occupy the major part of the document and the importance of lightness information is low.

The coding method based upon MR/MMR or JBIG is effective when reducing the amount of data in a binary image. However, this method cannot be directly applied when reducing the amount of data in a color image or grayscale image.

[Problem with Image Segmentation]

The method of image segmentation using the recursive threshold-value method or limited-color expression method can be applied to portion segmenting of a natural image. However, the method cannot be directly applied to a document image having image segments whose properties differ from those of a natural image (because the definition of a character segment is different from that of a natural image).

Further, the image segmentation method (inclusive of document structuring) for application to a character image is for the purpose of processing a binary image or a grayscale image. It is difficult to apply this method to a color image in which there is much overlapping of image segments.

Thus, the proposed zoom method, data reducing method and image segmentation method are often suitable for natural images but satisfactory results cannot be expected when these methods are applied to a document image. Further, the proposed methods for application to document images are suitable for binary images and grayscale images but cannot be directly applied to color images.

SUMMARY OF THE INVENTION

An object of the present invention is to solve the aforementioned problems and provide an image processing apparatus and method in which excellent processing is applied to a color image in which image segments having different characteristics are mixed.

According to a preferred embodiment of the present invention, the foregoing object is attained by providing an image processing method comprising an input step of inputting a color image, an extraction step of extracting image segments, which have characteristics different from a background image segment of the inputted color image, from the color image, and a discrimination step of discriminating the characteristics of each image segment extracted at the extraction step.

The invention further discloses an image processing method for extracting each image segment from a color image in which image segments having different components are mixed, comprising a creation step of creating a reduced image from an input color image, a first extraction step of extracting an image segment from the reduced image, and a second extraction step of extracting an image segment from the input color image using data of the image segment extracted at the first extraction step.

The invention further discloses an image processing apparatus comprising input means for inputting a color image, extraction means for extracting image segments, which have characteristics different from a background image segment of the input color image, from the color image, and discrimination means for discriminating the characteristics of each image segment extracted by the extraction means.

The invention further discloses an image processing apparatus for extracting each image segment from a color image in which image segments having different components are mixed, comprising creation means for creating a reduced image from an input color image, first extraction means for extracting an image segment from the reduced image, and second extraction means for extracting an image segment from the input color image using data of the image segment extracted by the first extraction means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5A is a diagram showing an overview of image-segment data;

FIG. 5B is a diagram showing data representing nodes illustrated in FIG. 5A;

FIG. 19 is a block diagram showing the construction of a data holding unit depicted in FIG. 17;

FIG. 24 is a diagram illustrating a sequence of image segments which undergo zooming;

FIGS. 30A and 30B are diagrams showing the form of image-segment data contained in compressed image-segment data;

FIG. 54 is a diagram showing the form of processing of the input-image image-segment extraction step depicted in FIG. 53;

FIG. 55 is a diagram for describing a group of image segments of the same level; and FIGS. 56A and 56B are diagrams showing an example of the memory map of a storage medium storing program code means according to the present invention.

DESCRIPTION OF THE PREFERRED EMBODIMENTS

Figure 1:
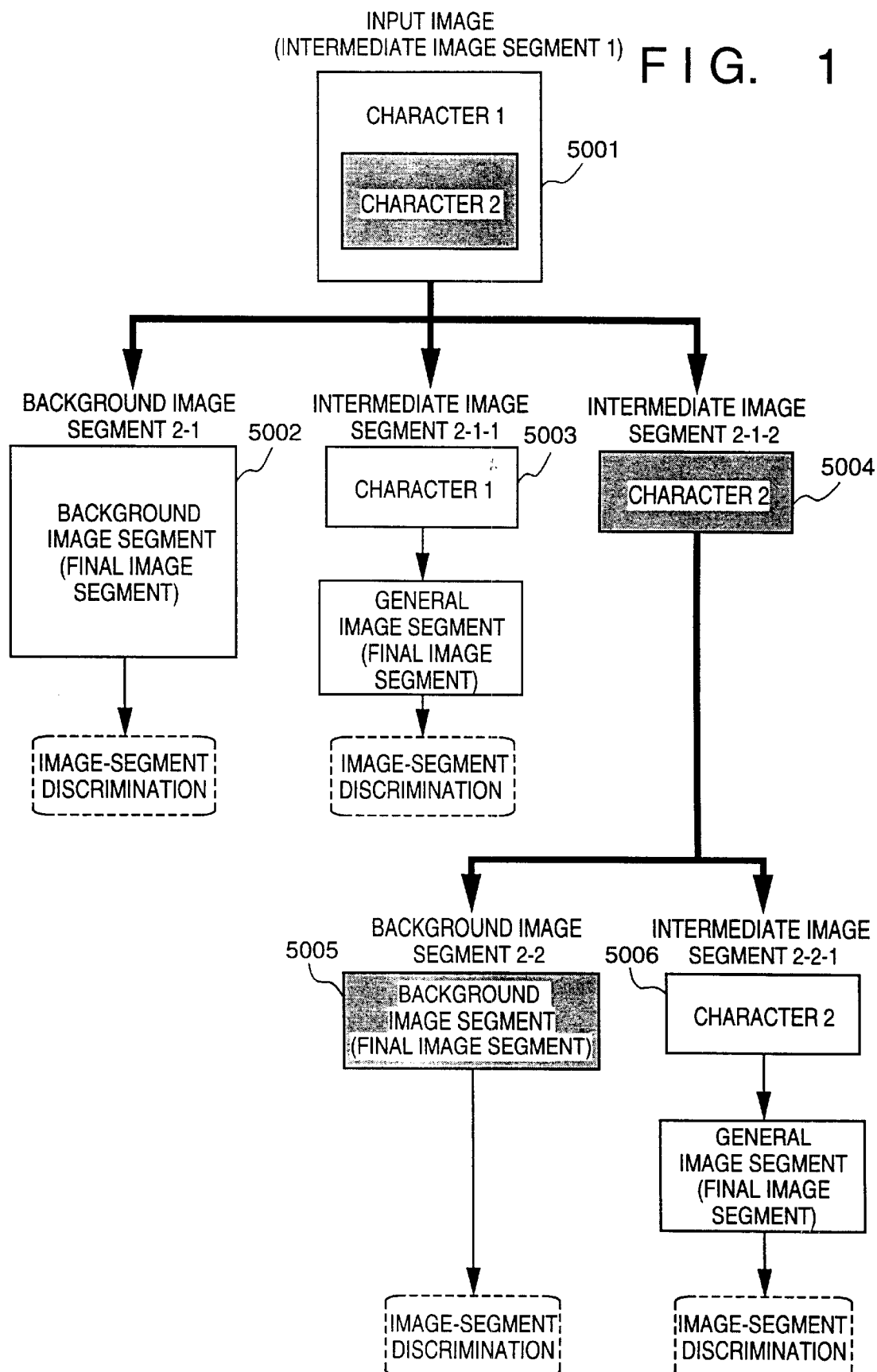
FIG. 1 is a diagram showing a procedure for segmenting image segments in the present invention.

According to the gist of the present invention, a color document image in which image segments having different components (segmentation components) are mixed undergoes image-segment extraction and discrimination of components. An "image-segment" is a linked portion having the same characteristic in an image. By focusing on an image segment which becomes the background, image segments contained in an image are extracted and the components of each image segment (hereinafter referred to as "image-segmentation components") are discriminated.

An image-segmentation component indicates the properties of an image segment, such as whether an image segment is one comprising a character or a line drawing, one comprising a photograph or one which is a color image segment. Examples of image-segment components are described below. Specifically, an image segment of a document image is described as having any of the following image-segment components, for example: a "continuous color tone", a "limited-color character or line drawing", a "limited-color pseudo-halftone", a "continuous monochromatic tone" a "limited-value character or line drawing" and a "limited-value pseudo-halftone". Though the details of these image-segment components will be set forth below, it is of course possible to use image-segment components based upon a simpler or more detailed classification.

Continuous color tone: an image segment in which the original is a color photograph Limited-color character or line drawing: an image area in which the original is a character or line drawing in a color other than black Limited-color pseudo-halftone: an image segment in which the original is a colorized photograph that has been subjected to pseudo-halftone processing Continuous monochromatic tone: an image segment in which the original is a black-and-white grayscale photograph Limited-value character or line drawing: an image area in which the original is a black-and-white character or line drawing Limited-value pseudo-halftone: an image segment in which the original is a black-and-white photograph that has been subjected to pseudo-halftone processing The segmentation of image segments in a color document image at the center of the present invention will now be described in simple terms.

An image segment having an image-segment component in a document image is considered to be one delimited by the background. In other words, image segments can be extracted by partitioning an input image at portions delimited by the background. However, while a black-and-white original generally has a "white" background color, the background color of a color original is not necessarily white. In the case of a color original, moreover, a certain background often is overlapped by backgrounds of other colors. Accordingly, in the present invention, extraction of background and the partitioning of image segments based upon the background are repeated recursively with respect to image segments (initially the input image), whereby segmentation of images areas is achieved.

FIG. 1 is a diagram showing a procedure for segmenting image segments according to the present invention.

First, a background 5002 is extracted from an input image 5001, then image segments 5003 and 5004, which can be segmented using the background 5002, are extracted. Since no further extraction of background can be performed with regard to the image segment 5003, segmentation of image segments is concluded for this image segment. With regard to area 5004, however, a background 5005 can be extracted and image segmentation is continued for this image segment. Image-segment components are discriminated with regard to each image segment thus segmented from the input image.

An image segment indicative of background shall be referred to as a "background image segment", and an image segment indicative of something other than background shall be referred to as a "general image segment". Further, an image segment currently being processed, namely an image segment containing an image segment for which judgment as to whether or not it includes background is incomplete and an image segment containing a plurality of image segments shall be referred to as an "intermediate image segment", and an image segment (inclusive of a background image segment) for which partitioning processing has been completed shall be referred to as a "final image segment". It should be noted that an input image is also an intermediate image segment.

An image processing apparatus according to embodiments of the present invention will now be described in detail with reference to the drawings.

The image processing apparatus and method described below can be utilized in pixel-density conversion or zoomed output in a device, such as a color printer, which handles a color document image, in pixel-density conversion at the time of enlargement/reduction and output in a DTP system, and in pixel-density conversion and zoomed output in a color facsimile. Further, the image processing apparatus and method can be utilized in reducing quantity of data at the time of image communication in a color facsimile or in the network equipment of a LAN or the like, and when storing a color image in a storage device such as a magnetic disk device.

<First Embodiment>

[Processing Procedure]

Figure 2:
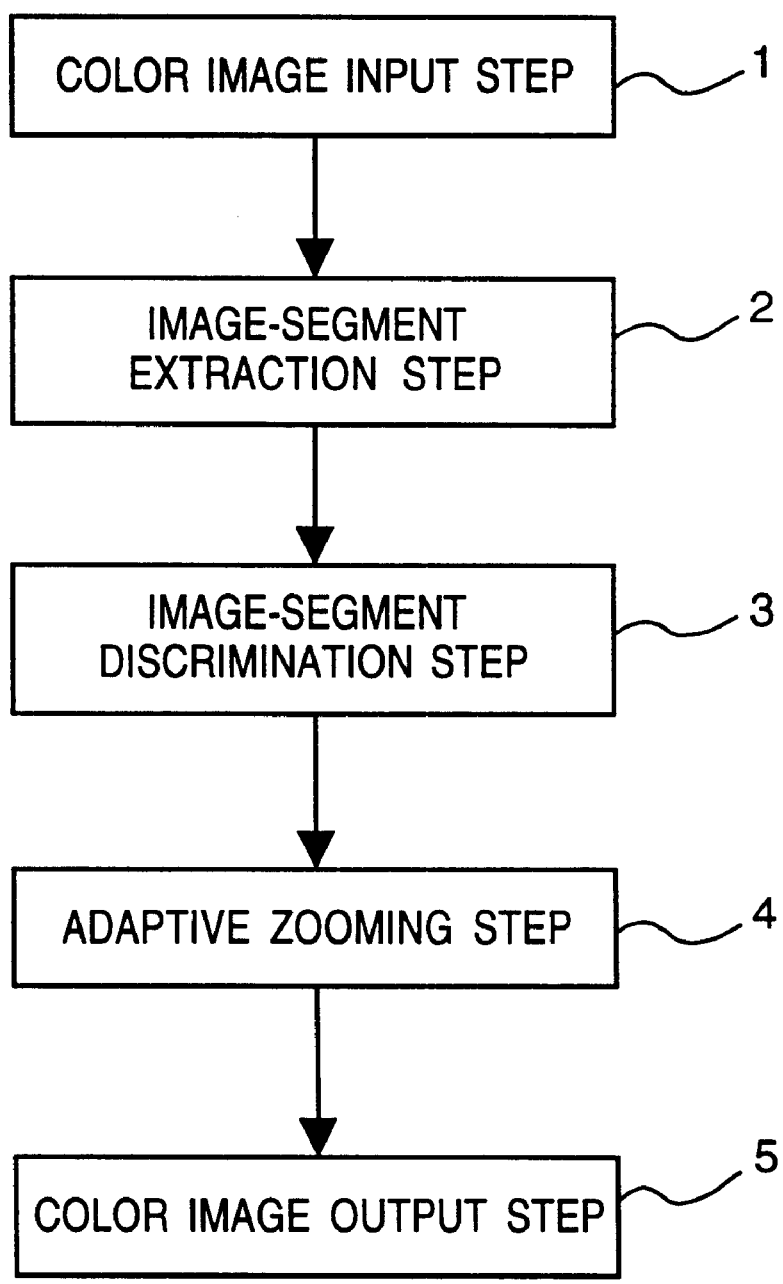
FIG. 2 is a diagram showing a processing procedure for a case in which the present invention is applied to color image zoom processing in an image processing apparatus.

FIG. 2 is a diagram showing a processing procedure for a case in which the present invention is applied to color image zoom processing in an image processing apparatus.

As shown in FIG. 2, a digital color image to be processed is inputted at a color image input step 1 and image segments are extracted from the input color image at an image-segment extraction step 2, thereby creating data representing the extracted image segments (this data shall be referred to as "image-segment data"). Next, each extracted image segment is discriminated for image-segment components at an image-segment discrimination step 3 and each extracted image segment is subjected to zoom processing conforming to the discriminated image-segment component at an adaptive zooming step 4, thereby creating a zoomed image of the input image. Then, at a color image output step 5, the created zoomed image is displayed, outputted as a hard copy or outputted to a communication line.

[Construction of Apparatus]

Figure 3:
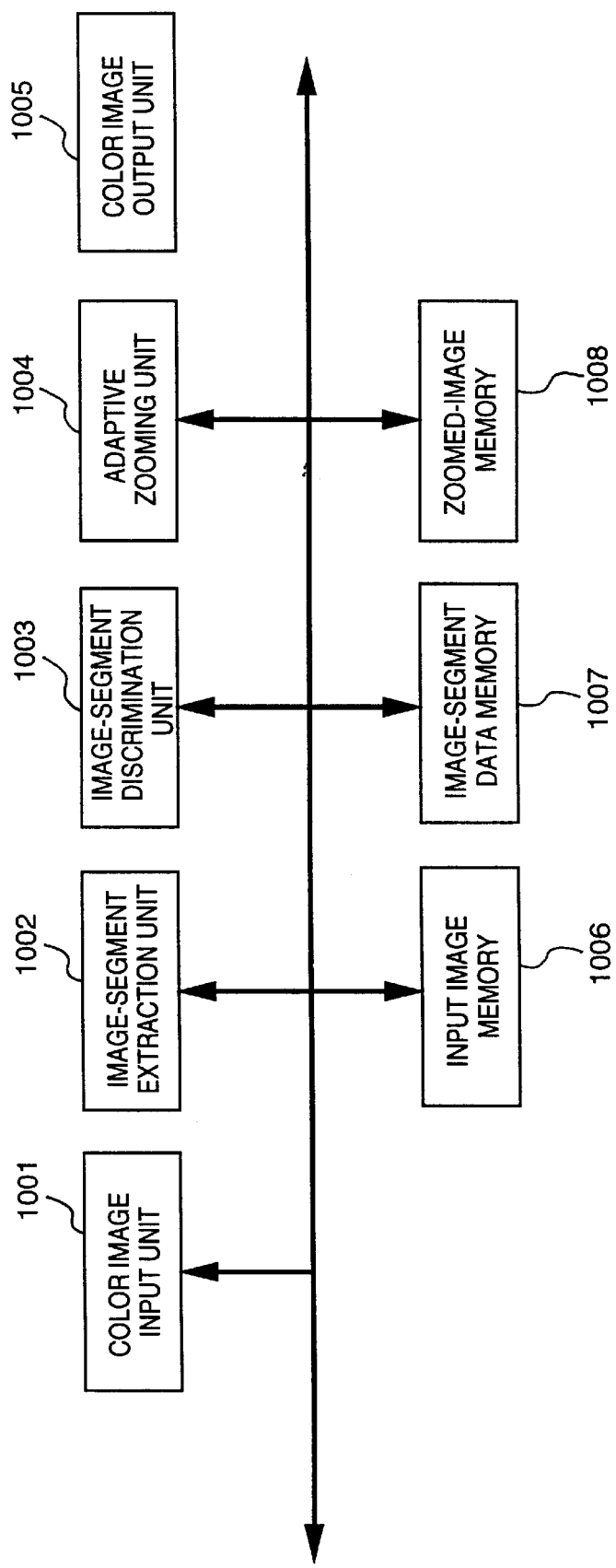
FIG. 3 is a block diagram showing an example of the construction of an image processing apparatus which executes the processing shown in FIG. 2.
Figure 4:
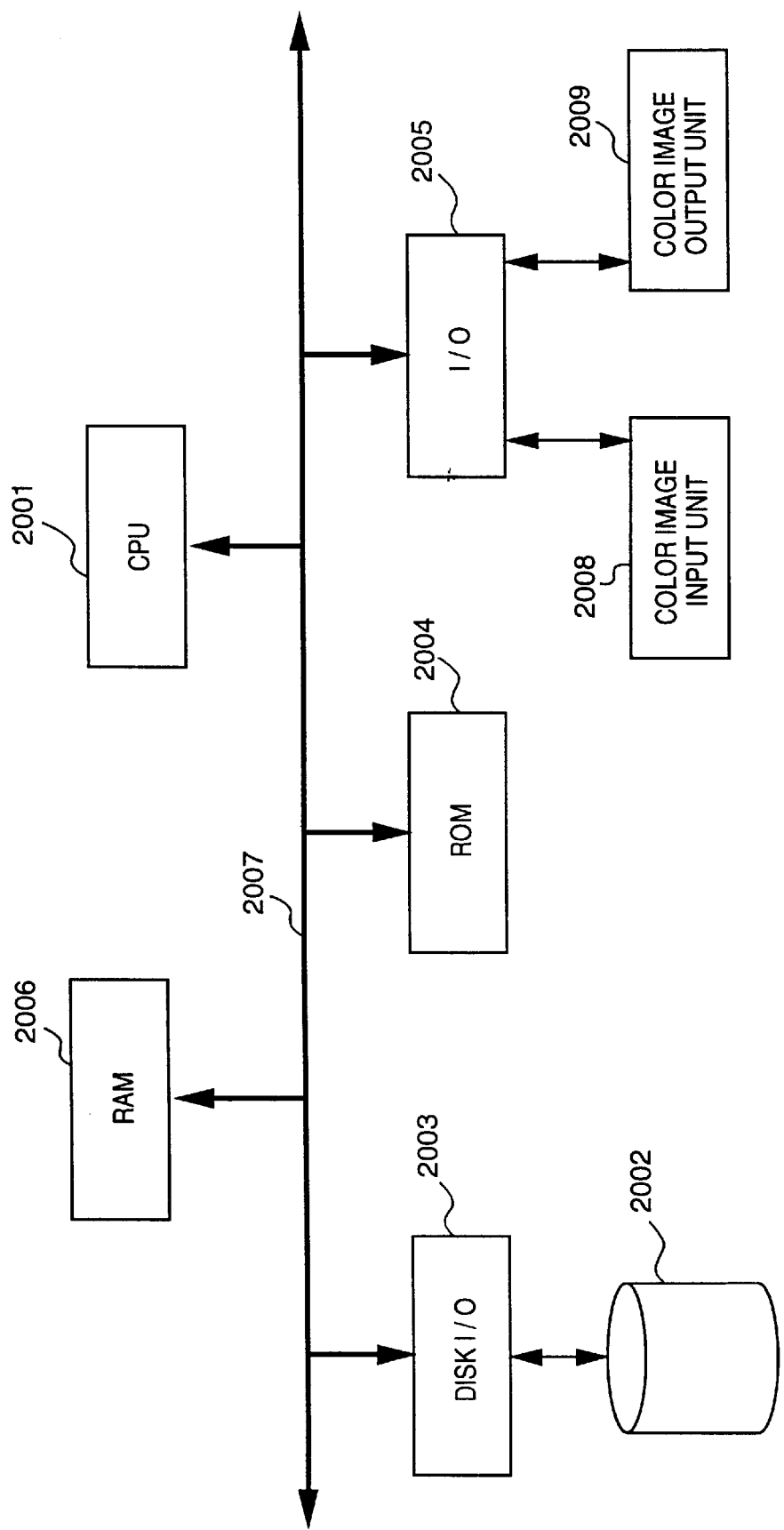
FIG. 4 is a block diagram showing hardware for implementing the arrangement of FIG. 3.

FIG. 3 is a block diagram showing the construction of an image processing apparatus which executes the processing shown in FIG. 2, and FIG. 4 is a block diagram showing hardware for implementing the arrangement of FIG. 3.

The hardware shown in FIG. 4 will be described first. The hardware includes a CPU 2001, a bus 2007 for interconnecting the CPU 2001 and other components mentioned below, a ROM 2004 in which programs executed by the CPU and data are stored in advance, a RAM 2006 utilized as the working memory of the CPU 2001, a storage device 2002 such as a hard disk or magneto-optical disk for storing programs and image data, a disk input/output unit 2003 for data input/output with respect to the storage device 2002, a color image input unit 2008, a color image output unit 2009, and an input/output port 2005 for input/output of data with respect to the color image input/output units 2008, 2009.

In accordance with a program stored beforehand in the ROM 2004 or storage device 2002, the CPU 2001 controls each of the aforementioned components via the bus 2007 and provides the color image output unit 2009 with results obtained by applying processing to color image data inputted from the color image input unit 2008 or color image data stored in the storage device 2002, wherein the RAM 2006 is used as a working area.

As shown in FIG. 3, a color image input unit 1001 inputs digital color image data to be processed and stores this data in an input image memory 1006. Under the control of the CPU 2001 which operates in accordance with the program stored in the ROM 2004 or storage device 2002, the color image input unit 1001 inputs the color image data using the color image output unit 2009 and stores the color image data in the RAM 2006 or storage device 2002. It should be noted that the color image input unit 1001 may be an input unit for reading in an image by a color image scanner, an input unit which receives color image data from a communication line, an input unit for reading in color image data that has been stored in an image storage device or a combination of these input units.

An image-segment extraction unit 1002 extracts image segments from the image that has been stored in an input image memory 1006 and stores the extracted image-segment data in an image-segment data memory 1007. An image-segment discrimination unit 1003 discriminates image-segment components in each image segment extracted by the image-segment extraction unit 1002 and stores the image-segment components in the image-segment data memory 1007. An adaptive zoom unit 1004 subjects each image segment extracted by the image-segment extraction unit 1002 to zoom processing conforming to the image-segment component discriminated by the image-segment discrimination unit 1003, thereby creating an image obtained by zooming the input image, and stores the image data representing the zoomed image in a zoomed-image memory 1008. It should be noted that information indicating the attribute of each image segment is stored in the image-segment data memory 1007.

The image-segment extraction unit 1002, image-segment discrimination unit 1003 and adaptive zoom unit 1004 can be constructed by the CPU 2001, which operates in accordance with the program stored in the ROM 2004 or storage device 2002, and the RAM 2006 used as the working area or the storage device 2002. It goes without saying that the units 1002, 1003 and 1004 may also be constructed of there own CPUs, RAMs and storage devices and may be implemented by their own hardware.

A color image output unit 1005 outputs the zoomed image data created by the adaptive zoom unit 1004 and stored in the zoomed-image memory 1008. The destination of this output is a display, a printer or copier for making hard copies, a communication line or an image storage device. An arrangement can be adopted in which, under the control of the CPU 2001 which operates in accordance with the program stored in the ROM 2004 or storage device 2002, the color image output unit 1005 outputs the zoomed image data, which has been stored in the RAM 2006 or storage device 2002, to the color image output unit 2009.

The input image memory 1006, the image-segment data memory 1007 and the zoomed-image memory 1008 can also be realized by the RAM 2006 or storage device 2002. It goes without saying that these memories can be realized by their own storage devices.

[Details of Processing]

The main steps shown in FIG. 2 will now be described in detail while using the arrangement of FIG. 3.

Image-segment Extraction Step

At the image-segment extraction step 2, image segments are extracted from the color image that has been stored in the input image memory 1006 at the color image input step 1, data representing the extracted image segment is created and the data is stored in the image-segment data memory 1007.

The image-segment image data will now be described.

FIG. 5A is a diagram showing an overview of the image-segment data. The image-segment data expresses a group of image segments in an input image by a tree structure in which each image segment is adopted as a node. The parent-child relationship of the tree structure represents the image-segment inclusion relationship. A node representing an intermediate image segment has child nodes which represent one background image segment and several intermediate image segments or general image segments contained in an intermediate image segment.

FIG. 5B is a diagram illustrating items of data representing each node, namely each individual image segment. Each item of image-segment data is composed of "image-segment type", "image-segment position", "image-segment shape", "image-segment component", "image-segment color", "parent node" and "child node". The details are as follows:

Image-segment type: indicates the type of image segment (background image segment, general image segment, intermediate image segment)

Image-segment position: indicates the coordinates (upper-left xy coordinates, width, height) of a circumscribed rectangle enclosing the image segment Image-segment shape: the shape of the image segment expressed by a binary image Image-segment component: indicates which image-segment component the image segment has been discriminated as Image-segment color: stores the average RGB value in case of a limited-color or limited-value image-segment component Parent node: a pointer indicating a parent node Child nodes: a plurality of pointers indicating child nodes It should be noted that a black pixel (pixel value ="1") of a binary image representing the shape of an image segment indicates an image segment, and that the size of the binary image and positions on the input image correspond to the position of a rectangle indicated at the position of image segment.

Figure 6:
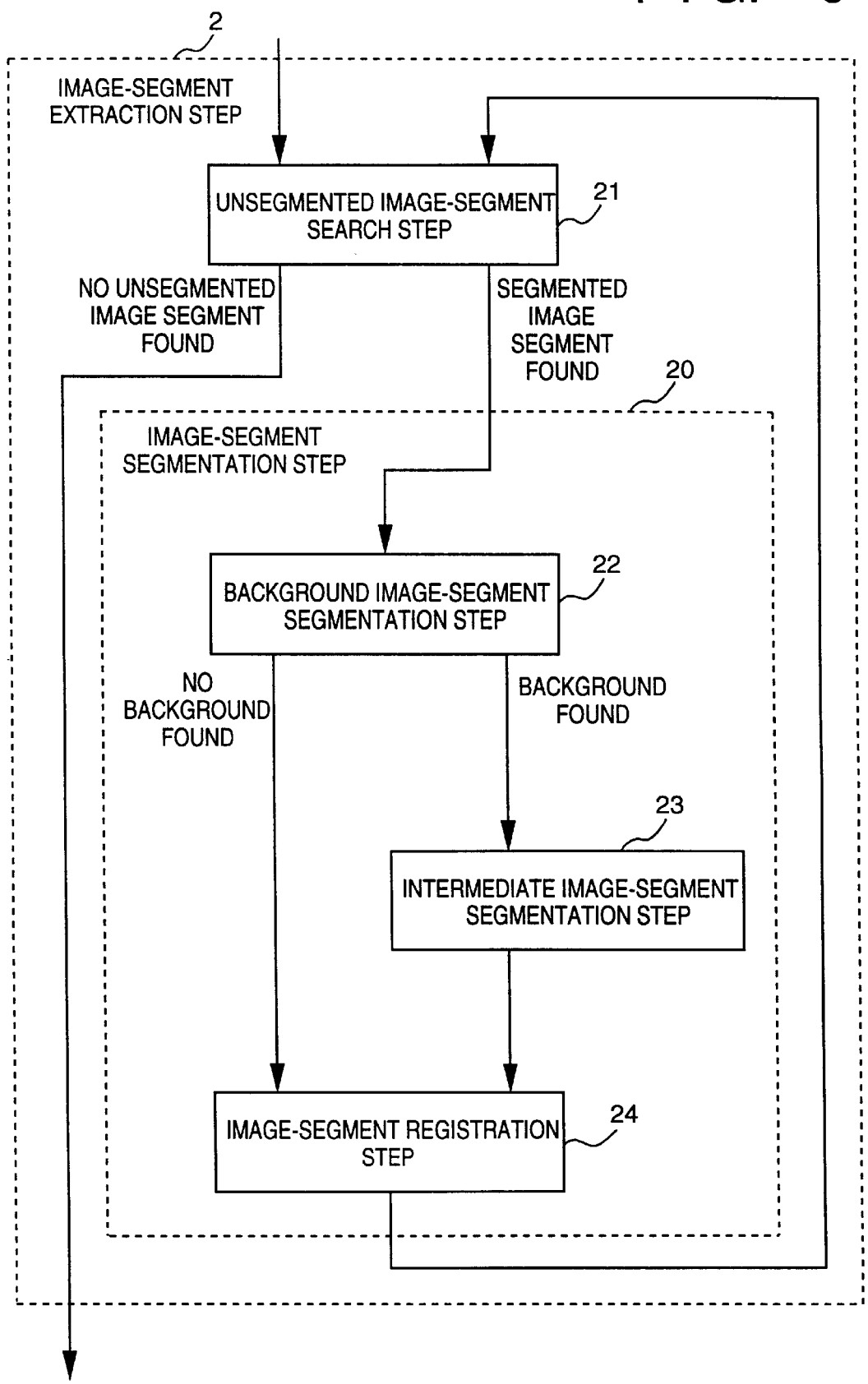
FIG. 6 is a diagram showing the detailed procedure of an image-segment extraction step depicted in FIG. 1.

FIG. 6 is a diagram showing the detailed procedure of the image-segment extraction step 2. According to the image-segment extraction step 2, as described above, an image segmentation step 20, through which an intermediate image segment (inclusive of the input image) contained in an image is further segmented into a background image segment and an intermediate image segment, is recursively repeated until completion of the image segmentation step 20 has been determined by an unsegmented image-segment search step 21. The result is extraction of image segments.

The unsegmented image-segment search step 21 searches for image-segment data stored in the image-segment data memory 1007 and searches for intermediate image segments for which segmentation is incomplete, namely intermediate image segments not having any child nodes. In a case where the image-segment data has an intermediate image segment for which segmentation is incomplete, the image segmentation step 20 is performed using this intermediate image segment as an input intermediate image segment. In a case where the image-segment data does not have an intermediate image segment for which segmentation is incomplete, the image-segment extraction step 2 is terminated.

The image segmentation step 20 inputs an intermediate image segment (inclusive of the input image) and judges whether the inputted intermediate image segment can be further segmented into a background image segment and several intermediate image segments. If it is judged that further segmentation is impossible, the inputted intermediate image segment is determined to be a final image segment and this information is registered in the image-segment data of this image segment stored in the image-segment data memory 1007. If it is judged that further segmentation is possible, then the inputted intermediate image segment is segmented into a background image segment and several intermediate image segments and this information is registered in the image-segment data of this image segment stored in the image-segment data memory 1007.

More specifically, if, by way of example, the image segment 5003 shown in FIG. 1 is an input intermediate image segment and it is judged that an intermediate image segment cannot be segmented from the image segment 5003, the image segment 5003 is determined to be a final image segment. Further, if the image segment 5004 shown in FIG. 1 is an input intermediate image segment and it is judged that an intermediate image segment can be segmented from the image segment 5004, the background image segment 5005 and the intermediate image segment 5006 are segmented from the image segment 5004.

A background image segmentation step 22 determines whether the inputted intermediate image segment has a background image segment. If the background image segment is judged to be present, the background image segment is segmented. According to an intermediate image segmentation step 23, an image segment other than the image segment segmented as the background image segment at the background image segmentation step 22 is segmented into several intermediate image segments using a geometrical relationship. More specifically, connected pixels or connected pixels which are nearly geometrical are adopted as being one intermediate image segment. According to an image-segment registration step 24, image segments segmented at the background image segmentation step 22 and intermediate image segmentation step 23 are registered in the image-segment data memory 1007. The details of the background image segmentation step 22, intermediate image segmentation step 23 and image-segment registration step 24 will be described below.

Figure 7:
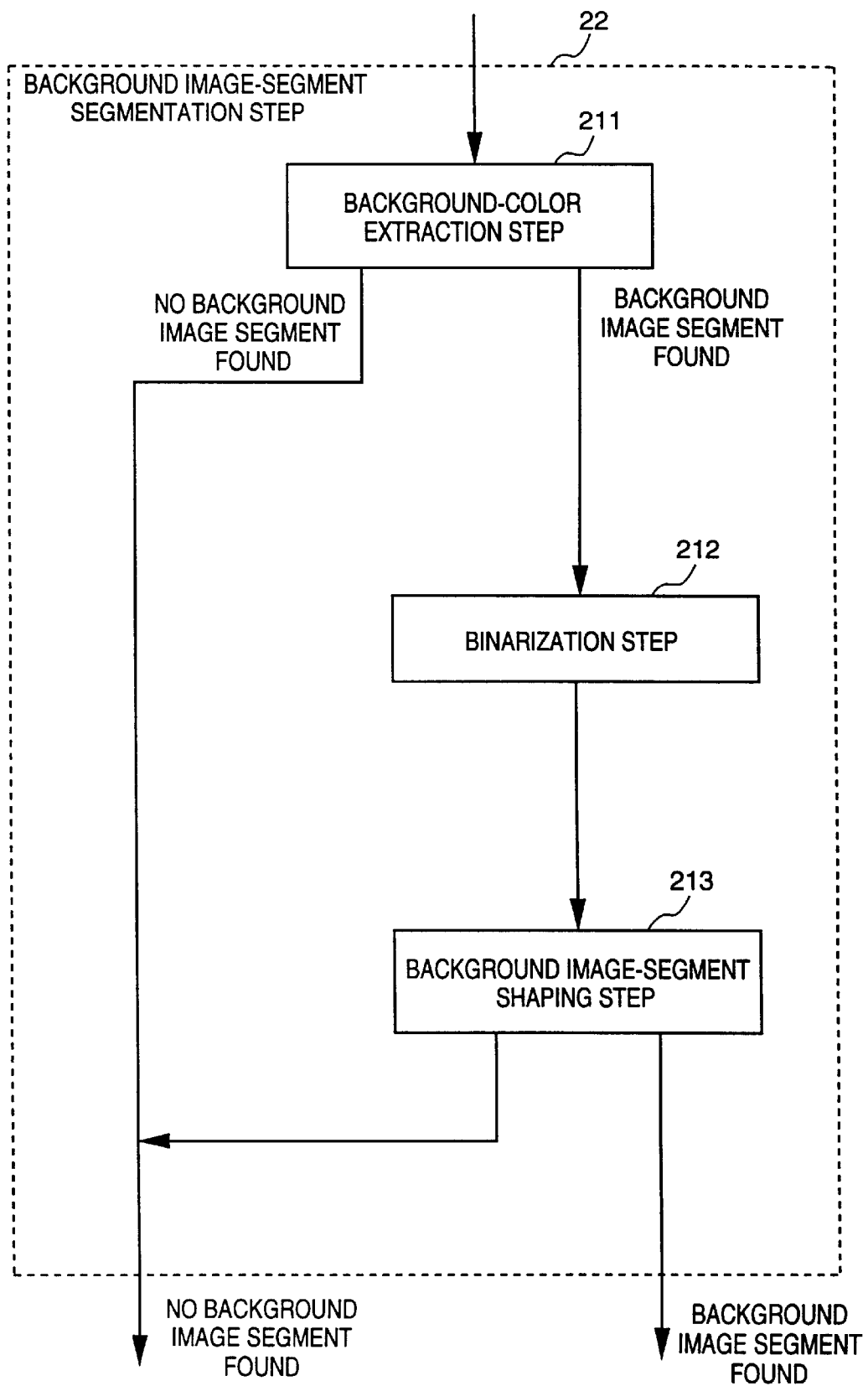
FIG. 7 is a diagram showing the detailed procedure of a background image segmentation step depicted in FIG. 6.

FIG. 7 is a diagram showing the detailed procedure of the background image segmentation step 22. A background color extraction step 211 analyzes the colors of the inputted intermediate image segment and judges whether the inputted intermediate image segment contains a color indicative of a background image segment. More specifically, the judgment is performed on the basis of whether pixels having a color in a specific range occupy the major part of the inputted intermediate image segment. A binarization step 212 creates a binary image indicative of the background image segment using the color indicating the background image segment extracted at the background color extraction step 211. A background image-segment shaping step 213 removes noise and small image segments from the binary image representing the background image segment created at the binarization step 212, shapes the background image segment and verifies, by the processing for removing small areas, whether the background image segment will vanish.

Figure 8:
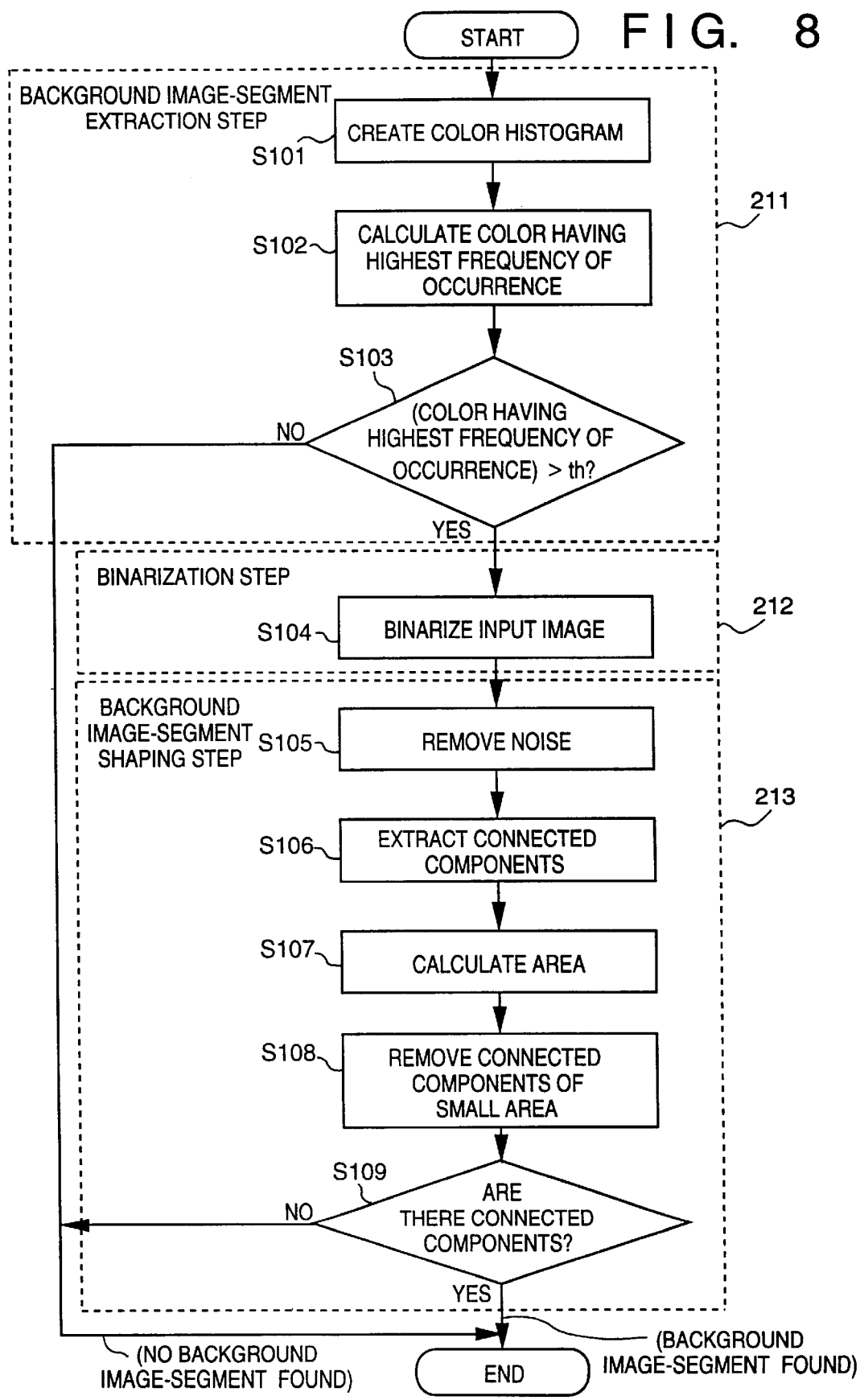
FIG. 8 is a flowchart illustrating a procedure for implementing the background image segmentation step by processing executed by a CPU shown in FIG. 4.

FIG. 8 is a flowchart illustrating a procedure for implementing the background image segmentation step 22 by the processing executed by the CPU 2001.

Steps S101 from S103 correspond to the background color extraction step 211.

More specifically, a color histogram is created in the working memory (RAM 2006 or storage device 2002) at step S101. For example, in a case where the input image is expressed in an RGB colorimetric system, the color histogram is three-dimensional data of RGB representing the frequency of occurrence of the color of each pixel in the intermediate image segment, namely the ratio of the number of pixels having a certain RGB value to the number of pixels of the intermediate image segment. It should be noted that quantization may be performed again when the color histogram is created. For example, in a case where an image of eight bits per R, G, B has been inputted, creating a color histogram while re-quantizing to four bits or seven bits results in a more complicated process. However, the memory size for storing the histogram can be reduced. An additional effect is that even if the color of the background image segment is uneven, a background image segment can be segmented in stable fashion.

Further, the colorimetric system of the image to be processed need not be an RGB colorimetric system. For example, a color histogram is created by transforming the input image to another colorimetric system in advance, e.g., an L*a*b* colorimetric system, an L*u*v* colorimetric system or an HSI colorimetric system. In case the dimensions of the color histogram also use the dimensions of the three components of the converted colorimetric system. For example, in case of the L*a*b* colorimetric system, the three-dimensional data of L*a*b* is used. Though the process becomes more complicated by using another colorimetric system such as the L*a*b* system, an advantage is that a background image segment close to human vision can be segmented. A case in which a color histogram is created in the RGB colorimetric system will be described below.

Next, the color having the high frequency of occurrence (namely a color which is a candidate for the background color) is obtained at step 102. This is followed by step S103, at which it is determined whether the maximum frequency obtained is greater than a threshold value th. If the maximum frequency is less than the threshold value th, then it is decided that the inputted intermediate image segment does not contain a background image segment and the background image segmentation step 22 is terminated. If the maximum frequency is greater than the threshold value th, then it is decided that the inputted intermediate image segment contains a background image segment and the program proceeds to step S104. The threshold value th, which is decided upon taking the properties of the input image into account, is 0.5 (50%), by way of example.

Step S104, which corresponds to the binarization step 212, creates, in the working memory, a binary image of the intermediate image segment binarized to the pixel having the color of maximum frequency and the pixels other than this pixel. For example, the binary image created is one in which the pixel having the color of maximum frequency is made "1" and the other pixels are made "0"s.

Steps S105 through S109 correspond to the background image-segment shaping step 213.

Specifically, noise in the created binary image is removed at step S105 by applying well-known reduction/enlargement processing, and small areas are removed from the noise-free binary image at steps S106 through S108. First, with regard to the noise-free binary image, a label image is created in the working memory and connected components are extracted by well-known labeling processing at step S106. The label image is one in which a unique number is assigned to each connected component and the numbers are made the pixel values of the connected components. Next, the number of pixels (the area) of each connected component is obtained and stored in the working memory at step S107. Next, at step S108, connected components for which the numbers of pixels is less than the threshold value (namely connected components of small area) are eliminated. In other words, the values of pixels corresponding to these connected components of the binary image are made "0"s.

Next, it is determined at step S109 whether there are any remaining connected components (background image segments). If the answer is "YES", then it is determined that there is a background image segment; otherwise, it is determined that there are no background image segments. In a case where there is a background image segment, a binary image indicative of a background image segment remains in the working memory.

Figure 9:
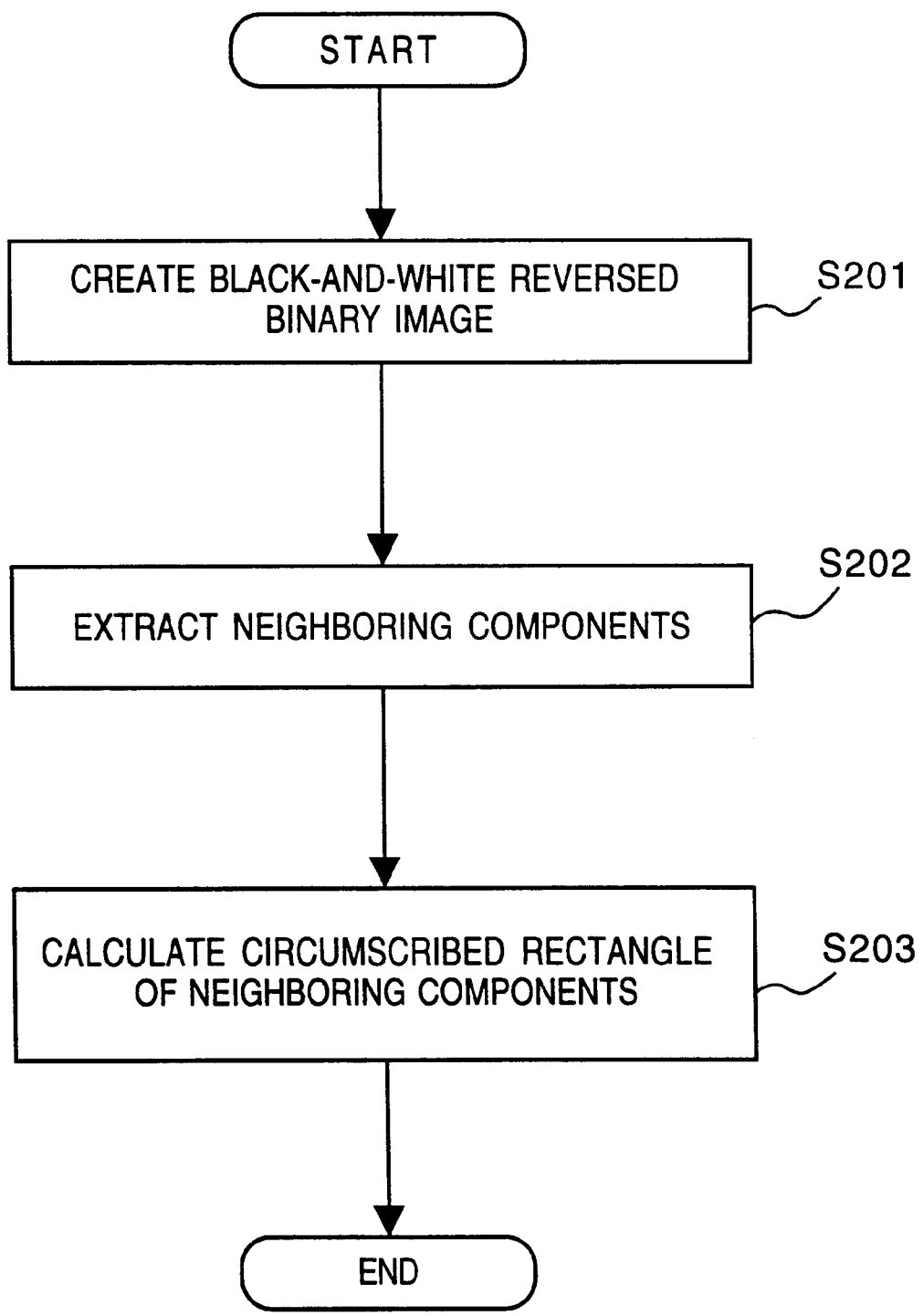
FIG. 9 is a flowchart illustrating a procedure for implementing an intermediate image segmentation step by processing executed by the CPU shown in FIG. 4.

FIG. 9 is a flowchart illustrating a procedure for implementing the intermediate image segmentation step 23 by processing executed by the CPU 2001.

Step S201 creates an image segment other than a background image segment obtained by reversing the blacks and whites of the binary image segment indicating the background image segment created at the background image segmentation step 22, namely by changing "1" pixels to "0" pixels and changing "0" pixels to "1" pixels. In other words, a binary image indicating an intermediate image segment in the inputted intermediate image segment is created. This binary image is stored in a working memory.

Next, at step S202, the binary image that has undergone the black-white reversal is segmented into intermediate image segments and neighboring components are extracted. "Neighboring components" are a set of closely adjacent (connection is not required) black pixels adopted as one component in a binary image. These neighboring components are adopted as an intermediate image segment. In a document image, for example, neighboring components" refers to a column comprising a collection of characters that are not connected but are closely adjacent. A method of extracting neighboring components is that reported by Ito et al. (see "Parallel Field Segmentation of Free-Format Documents", 1979 *Information Processing Society of Japan*, 20th All-Japan Convention, 2E-1).

Next, a circumscribed rectangle indicating the position of extracted neighboring components is calculated and stored in the working memory at step S203.

By virtue of the foregoing procedure, an image segment other than a background image segment can be segmented into one or a plurality of intermediate image segments from the inputted intermediate image segment and the position (circumscribed rectangle) thereof can be stored in the working memory.

Figure 10:
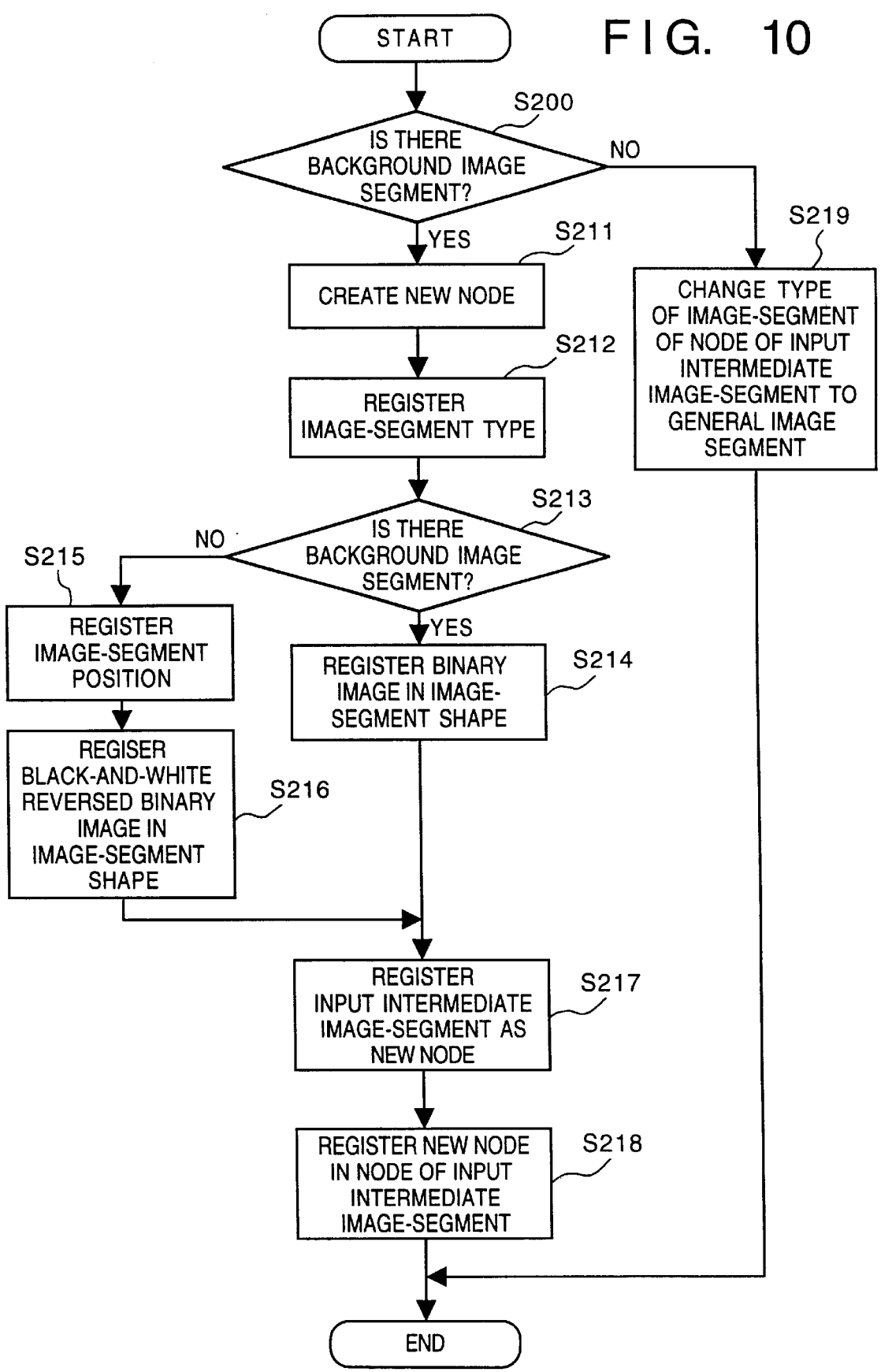
FIG. 10 is a flowchart illustrating a procedure for implementing an image-segment registration step by processing executed by the CPU shown in FIG. 4.

FIG. 10 is a flowchart illustrating a procedure for implementing the image-segment registration step 24 by processing executed by the CPU 2001. In a case where it has been determined at the background image segmentation step 22 that a background image segment is present in the inputted intermediate image segment, the segmented background image segment and the intermediate image segment are registered in the form illustrated in FIGS. 5A and 5B. If it has been determined that a background image segment is not present, the inputted intermediate image segment is registered as a general image segment. More specifically, it is determined at step S200 whether a background image segment is present. If the background image segment is not present, the program proceeds to step S219, at which the image-segment type of the node indicating the inputted intermediate image segment is changed to "general image segment" and the processing is terminated.

If a background image segment is found at step S200, a new node indicating an image segment is created at step S211, the image-segment type is registered for the new mode at step S212 and the type of image segment to be processed is discriminated at step S213. If the type of image segment is a background image segment, a binary image indicating the background image segment is registered for the shape of the image segment of the new node at step S214. If the type of image segment discriminated at step S213 is an intermediate image segment, position information obtained from the circumscribed rectangle is registered for the image-segment position of the new node at step S215. Next, step S216 registers a black-white reversed binary image, which indicates the intermediate image segment, for the shape of the image segment of the new node. It should be noted that the image-segment position of the background image segment is the same as the image-segment position of the parent node (the input intermediate image segment). Hence, the registration of this position is eliminated.

Next, the inputted intermediate image segment is registered as the parent node of the new node at step S217 and the new node is registered as a child node of the node indicating this input intermediate image segment at step S218. Processing is then terminated.

Image-segment Discrimination Step

The image-segment discrimination step 3 discriminates the type of each image segment extracted at the image-segment extraction step 2 and stores the result of discrimination in the image-segment data. An example will now be described in which it is determined whether each image segment is a "continuous color tone", a "limited-color character or line drawing", a "limited-color pseudo-halftone", a "continuous monochromatic tone", a "limited-value character or line drawing" or a "limited-value pseudo-halftone".

Figure 11:
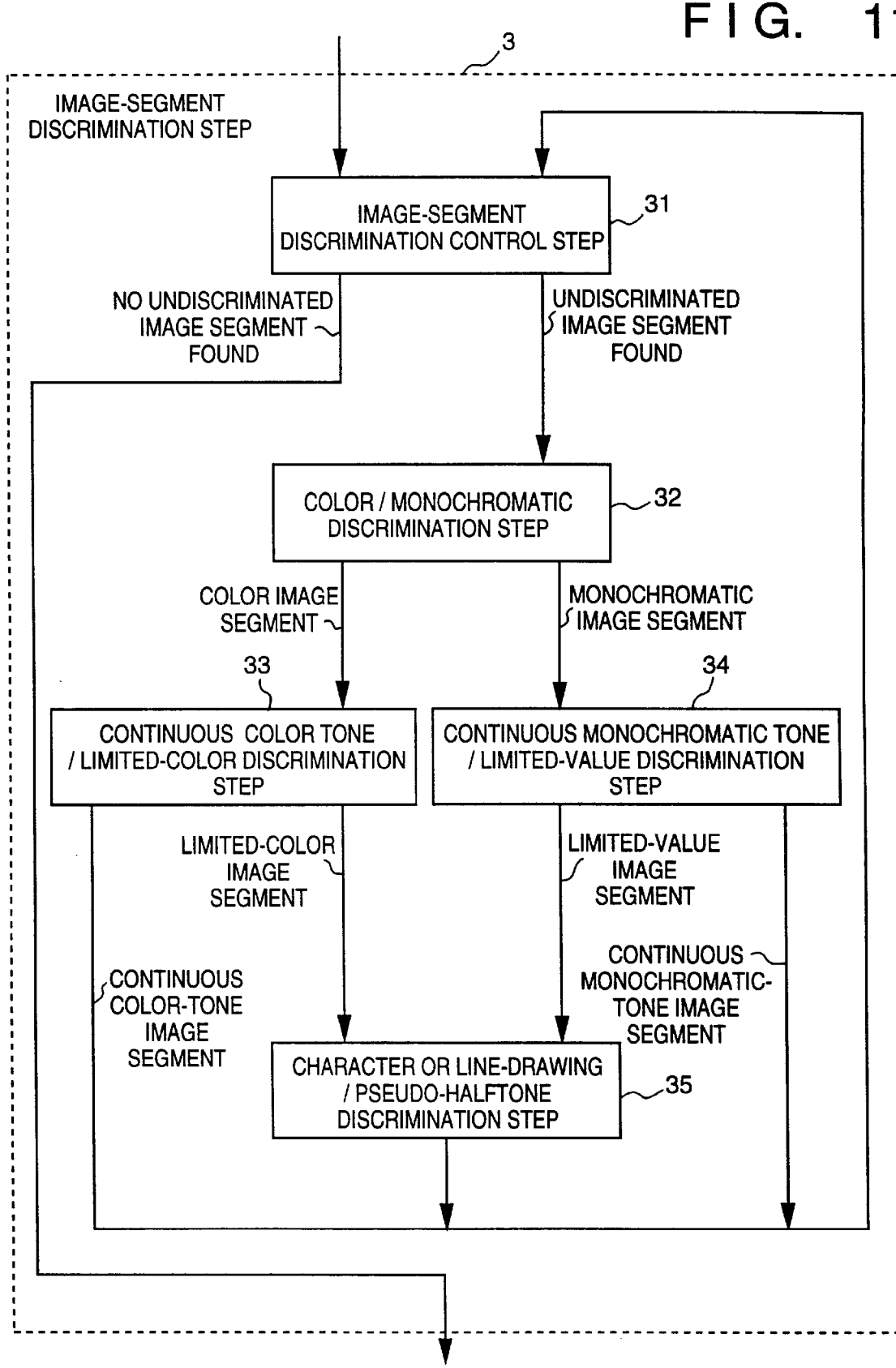
FIG. 11 is a diagram illustrating the detailed procedure of an image-segment discrimination step depicted in FIG. 1.

FIG. 11 is a diagram illustrating the detailed procedure of the image-segment discrimination step 3. According to the image-segment discrimination step 3, it is determined by a color/monochromatic discrimination step 32 whether an image segment of interest is color or monochromatic (grayscale or black and white), then it is determined whether a color image segment is a continuous color tone or a limited color at a continuous color tone/limited-color discrimination step 33, and it is determined whether a monochromatic image segment is a continuous color tone or a limited value by a continuous monochromatic tone/limited-value discrimination step 34. With regard to an image segment discriminated as being a limited color or limited value, it is determined whether the image segment is the image segment of a character or line drawing or the image segment of a pseudo-halftone by a character or line-drawing/pseudo-halftone discrimination step 35. Under the control of an image-segment discrimination control step 31, the foregoing steps are repeated until there are no longer any undiscriminated image segments. As a result, image-segment components of each image segment are discriminated.

Figure 12:
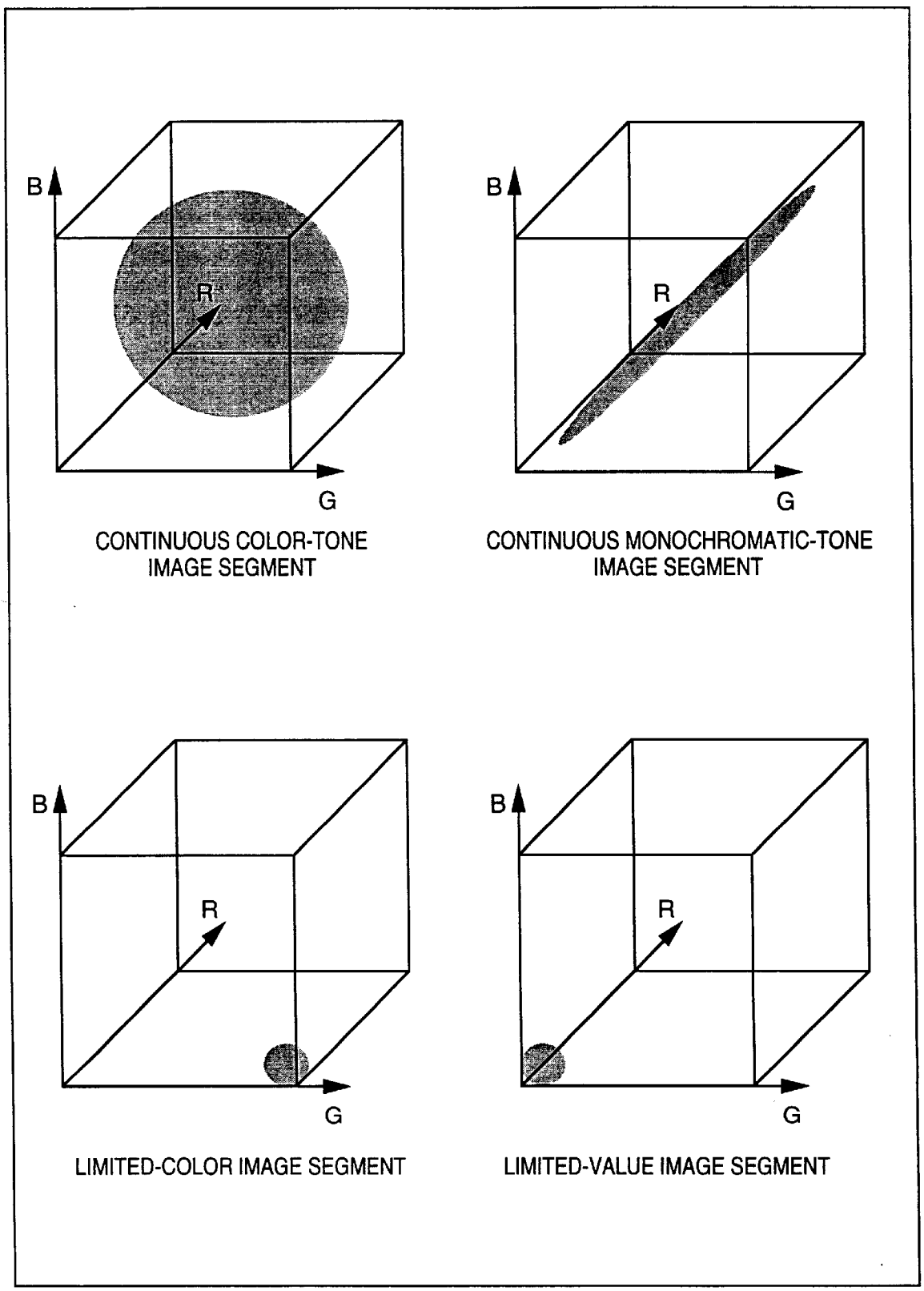
FIG. 12 is a diagram showing examples of distributions of RGB values in four image-segment components.

FIG. 12 is a diagram showing examples of distributions of RGB values in four image-segment components. FIG. 12 illustrates examples of RGB value distributions of the following image segments shown clockwise from the upper left: a "continuous color tone" image segment, a "continuous monochromatic tone" image segment, a "limited-color" image segment, and a "limited-value" image segment.

The color/monochromatic discrimination step 32 discriminates whether an image segment of interest is color (an image segment of a continuous color tone or a limited-color image segment) or monochromatic (an image segment of a continuous monochromatic tone or a limited-value image segment). More specifically, as shown in FIG. 12, by utilizing the fact that the saturation of each pixel in case of a monochromatic image segment takes on a value near zero (R=G=B in an RGB colorimetric system), a monochromatic image is judged to be an image segment wherein there is a single saturation, at which the frequency in the saturation histogram of the image segment indicates a peak, in the vicinity of zero and, moreover, wherein there is little variance in the histogram.

Figure 13:
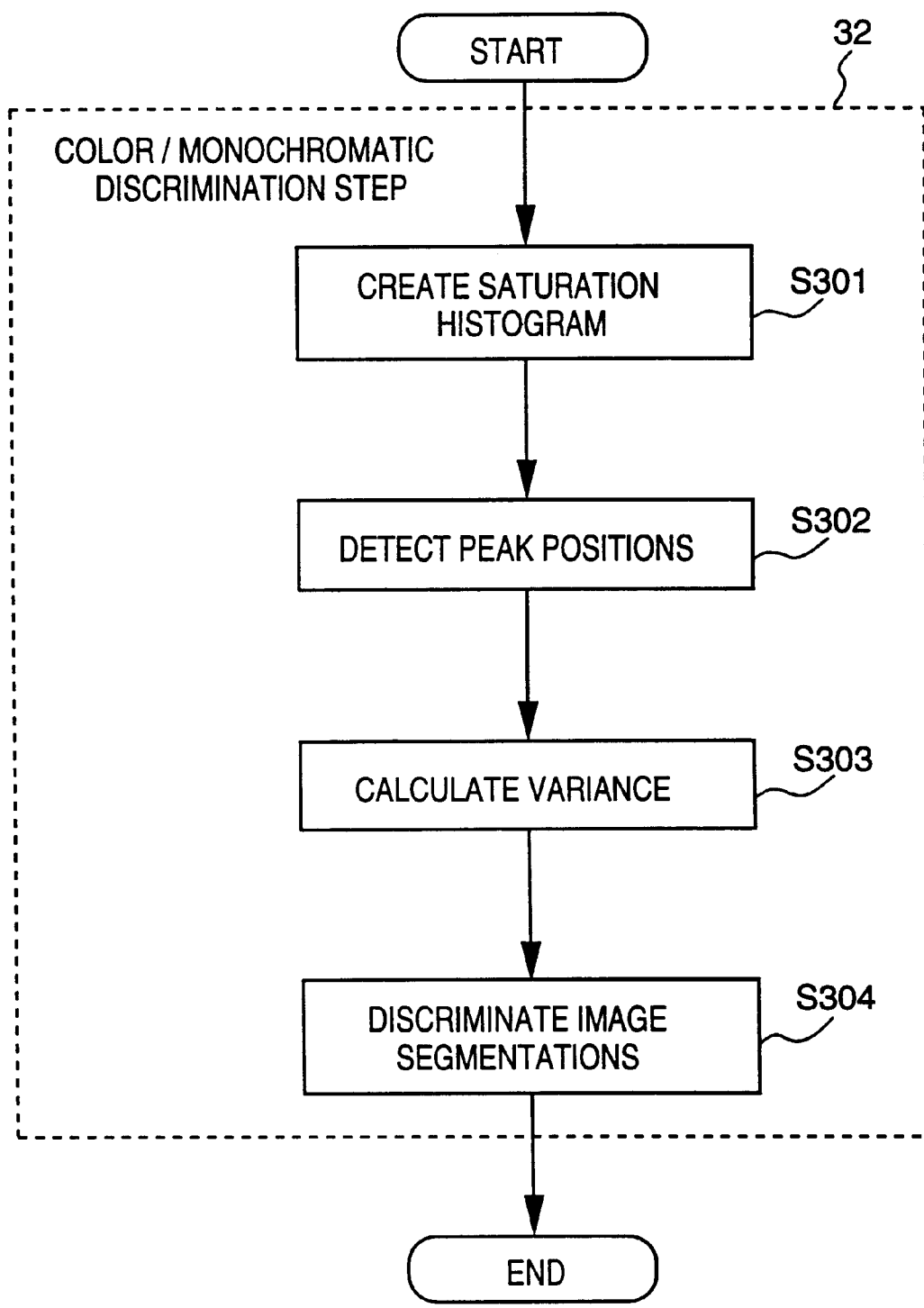
FIG. 13 is a flowchart illustrating a procedure for implementing a color/monochromatic discrimination step by processing executed by the CPU shown in FIG. 4.

FIG. 13 is a flowchart illustrating a procedure for implementing the color/monochromatic discrimination step 32 by processing executed by the CPU 2001.

At step S301, saturation is calculated from the pixel values (e.g., RGB values) in the image segment, a saturation histogram is created and the histogram is stored in the working memory. In a case where this is expressed in a colorimetric system which already includes a saturation component (S in case of HSI), as in an HSI colorimetric system, for example, the saturation histogram can be directly created using the saturation component. Next, the saturation at which the frequency of the saturation histogram peaks is detected at step S302, the variance of the saturation histogram is calculated at step S302 and image segment discrimination is performed at step S304 using the saturation and variance obtained. This discrimination involves judging that the image segment is a monochromatic image segment if there is a single saturation, which is located in the vicinity of zero (i.e., which is below a predetermined threshold value), at which the frequency peaks and, moreover, the variance is less than a predetermined threshold value. The image segment is judged to be a color image segment in all other cases.

Figure 14:
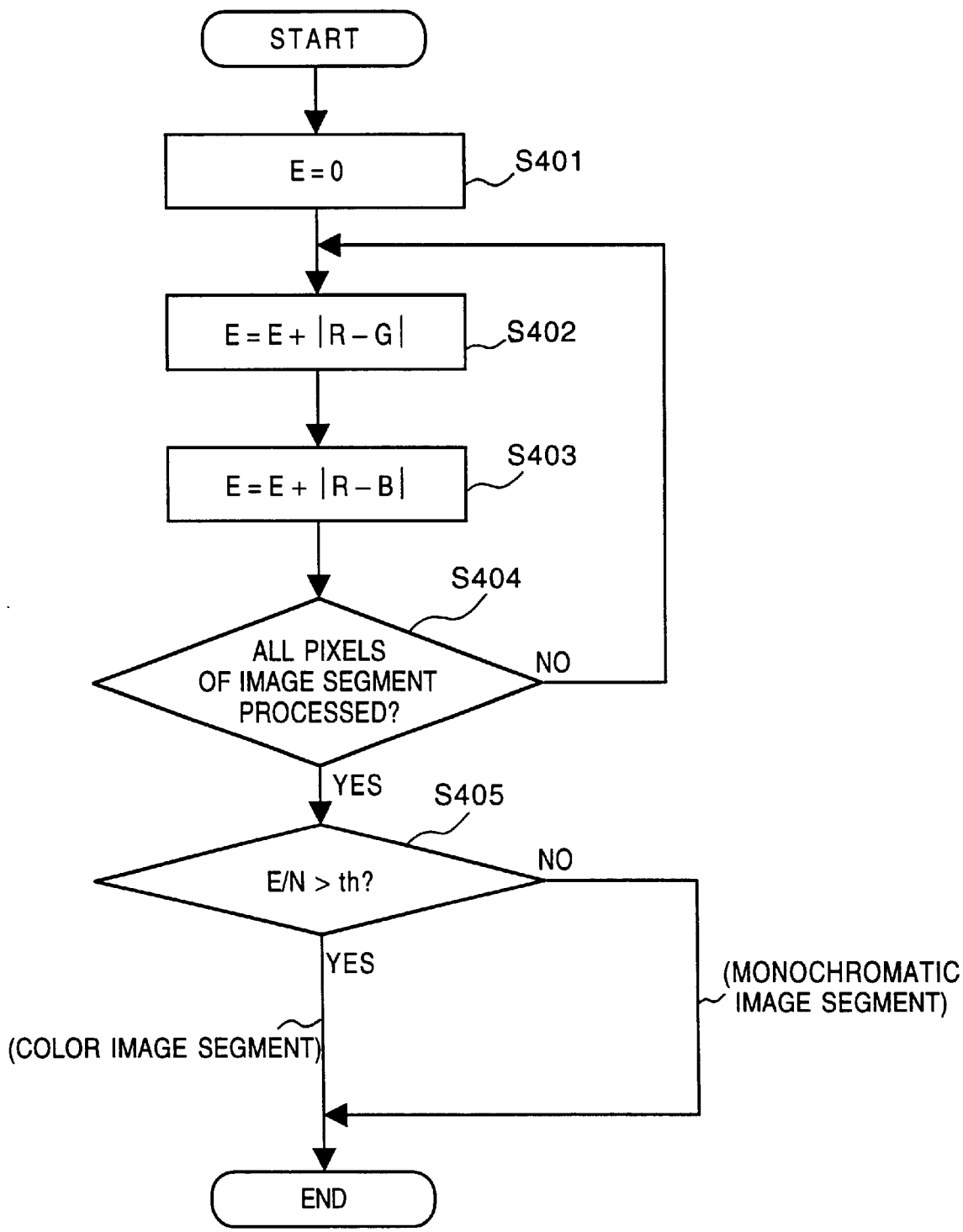
FIG. 14 is a flowchart illustrating another example of a procedure for implementing a color/monochromatic discrimination step by processing executed by the CPU shown in FIG. 4.

FIG. 14 is a flowchart illustrating another example of a procedure for implementing the color/monochromatic discrimination step by processing executed by the CPU 2001. Though the precision of discrimination is inferior in comparison with the procedure of FIG. 13, discrimination can be performed in a simpler fashion.

A variable E is reset to zero at step S401, the absolute value (|R−G|) of the difference between the R and G values of a pixel of interest in the image segment of interest is added to the variable E at step S402, and the absolute value (|R−B|) of the difference between the R and B values of a pixel of interest in the image segment of interest is added to the variable E at step S403. The processing of steps S402 and S403 is repeatedly executed for all pixels of the image segment. This is judged at step S404. If the processing of all of these pixels is finished, a value (E/N) which is the result of dividing the variable E by the number N of pixels in the image segment of interest is compared with a predetermined threshold value th at step S405. The image segment is judged to be a color image segment if E/N>th holds and to be a monochromatic image segment in all other cases. In other words, according to this method, whether the image segment is judged to be a color image segment or a monochromatic image segment depends upon the average value of the sum of the absolute values of R-G and R-B of all pixels of the image segment.

Next, as shown in FIG. 12, the continuous color tone/limited-color discrimination step 33 makes use of the fact that, in a case where the image segment is a limited-color image segment, the pixel values of the area concentrate in specific values. Based upon this fact, an image segment wherein there is a single color at which the frequency in the color histogram of the image segment indicates a peak and, moreover, there is little variance in the color histogram, is judged to be a limited-color image segment.

Figure 15:
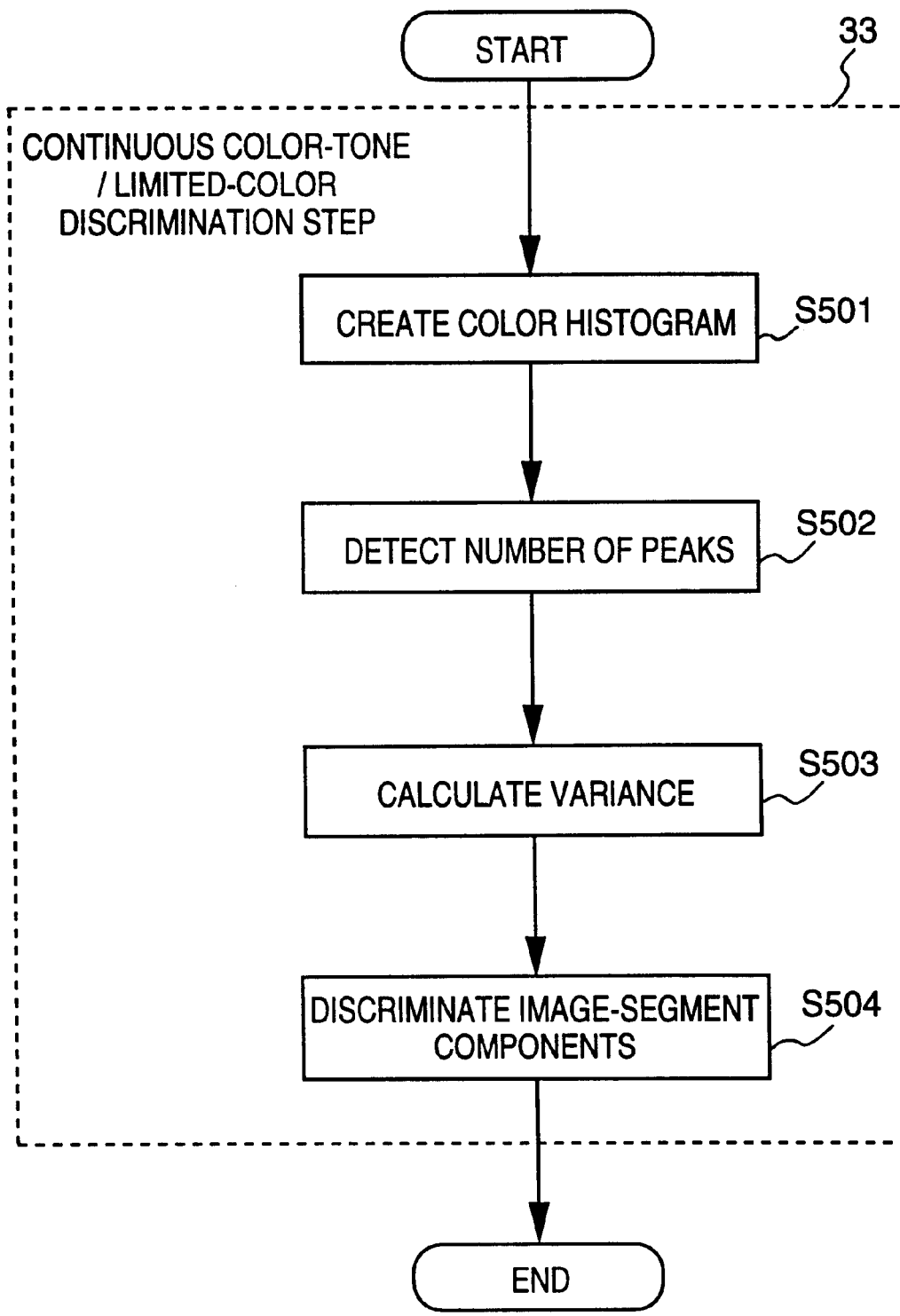
FIG. 15 is a flowchart illustrating a procedure for implementing a continuous color tone/limited-color discrimination step by processing executed by the CPU shown in FIG. 4.

FIG. 15 is a flowchart illustrating a procedure for implementing the continuous color tone/limited-color discrimination step 33 by processing executed by the CPU 2001.

At step S501, a color histogram is created from the pixel values (e.g., the RGB values) of the image segment and the histogram is stored in the working memory. Next, the number frequency peaks of the color histogram is detected at step S502. Though the number of colors for which the frequency is greater than a predetermined threshold value is adopted as the number of peaks, neighboring peaks in the histogram are counted as one peak. Next, the variance of the color histogram is calculated at step S503, and the image-segment component is discriminated at step S504 from the obtained number of peaks and variance. This discrimination involves judging that the image segment is a limited-color image segment if the number of peaks is one and, moreover, the variance is less than a predetermined threshold value. The image segment is judged to be an image segment of a continuous color tone in all other cases.

Next, as shown in FIG. 12, the continuous monochromatic tone/limited-value discrimination step 34 makes use of the fact that, in a case where the image segment is a limited-value image segment, the pixel values of the area concentrate in specific values. Based upon this fact, an image segment wherein there is a single lightness at which the frequency in the lightness histogram of the image segment indicates a peak and, moreover, there is little variance in the lightness histogram, is judged to be a limited-value image segment.

Figure 16:
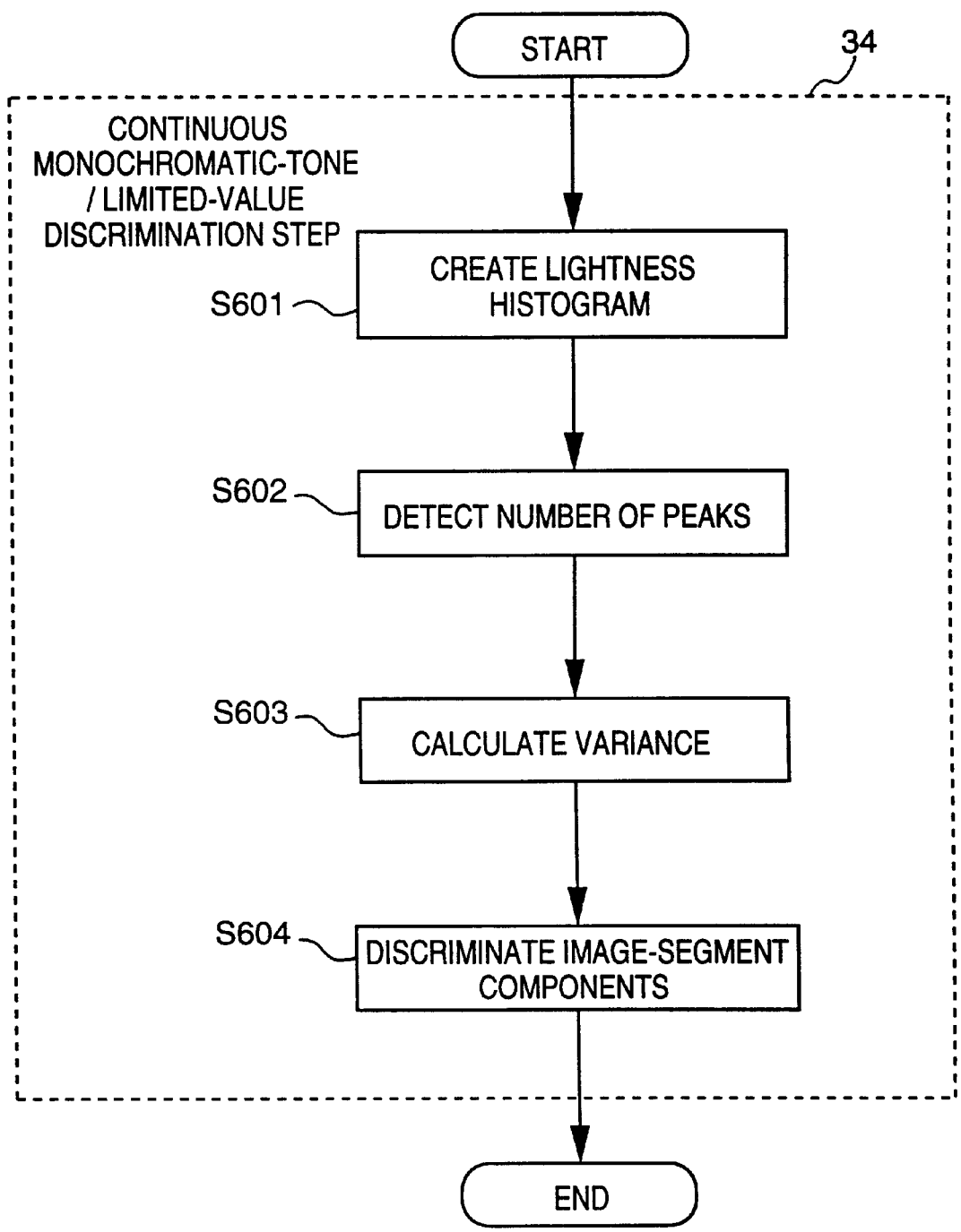
FIG. 16 is a flowchart illustrating a procedure for implementing a continuous monochromatic tone/limited-value discrimination step by processing executed by the CPU shown in FIG. 4.

FIG. 16 is a flowchart illustrating a procedure for implementing the continuous monochromatic tone/limited-value discrimination step 34 by processing executed by the CPU 2001.

At step S601, lightness is calculated from the pixel values (e.g., RGB values) in the image segment, a lightness histogram is created and the histogram is stored in the working memory. In a case where this is expressed in a colorimetric system which already includes lightness, as in the case of an HSI colorimetric system, the lightness histogram can be directly created. Next, the number frequency peaks of the lightness histogram is detected at step S602. Though the number of lightnesses for which the frequency is greater than a predetermined threshold value is adopted as the number of peaks, neighboring peaks in the histogram are counted as one peak. Next, the variance of the lightness histogram is calculated at step S603, and the image-segment component is discriminated at step S604 from the obtained number of peaks and variance. This discrimination involves judging that the image segment is a limited-value image segment if the number of peaks is one and, moreover, the variance is less than a predetermined threshold value. The image segment is judged to be an image segment of a continuous monochromatic tone in all other cases.

The character or line-drawing/pseudo-halftone discrimination step 35 will now be described.

Many techniques for discriminating between characters or line drawings and pseudo-halftone image segments have been proposed as image segmentation techniques applied to binary images or multivalued images. Here such a technique proposed by the present applicant will be described as one example.

In this embodiment, as set forth above, a binary image indicating the shape of an input image segment is crated at the intermediate image segmentation step 3 and the binary image is stored as image-segment data of the form illustrated in FIGS. 5A and 5B. In the character or line-drawing/ pseudo-halftone discrimination step 35, the image-segment shape (binary image) of an image segment to be discriminated is inputted and it is determined whether this is the image segment of a character or line drawing or the image segment of a pseudo-halftone.

Figure 17:
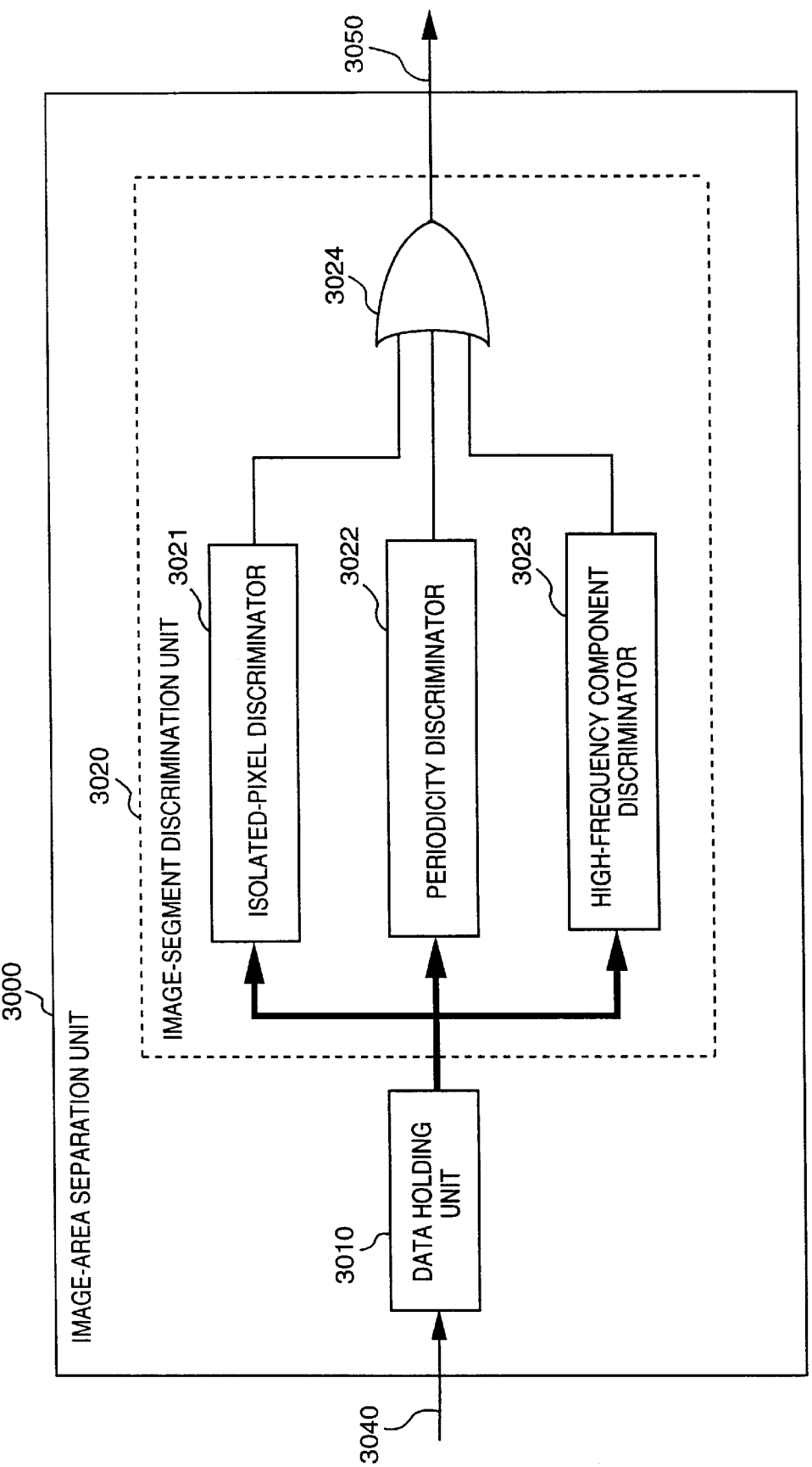
FIG. 17 is a block diagram showing the construction of an image segmentation unit for discriminating between a character/line-drawing image segment and a pseudo-halftone image segment.

FIG. 17 is a block diagram showing the construction of an image segmentation unit 3000 for implementing the discrimination processing described above. Though the image segmentation unit in FIG. 17 is implemented by its own hardware, it goes without saying that it can also be implemented by software and the CPU 2001 of the apparatus shown in FIG. 4.

Figure 18:
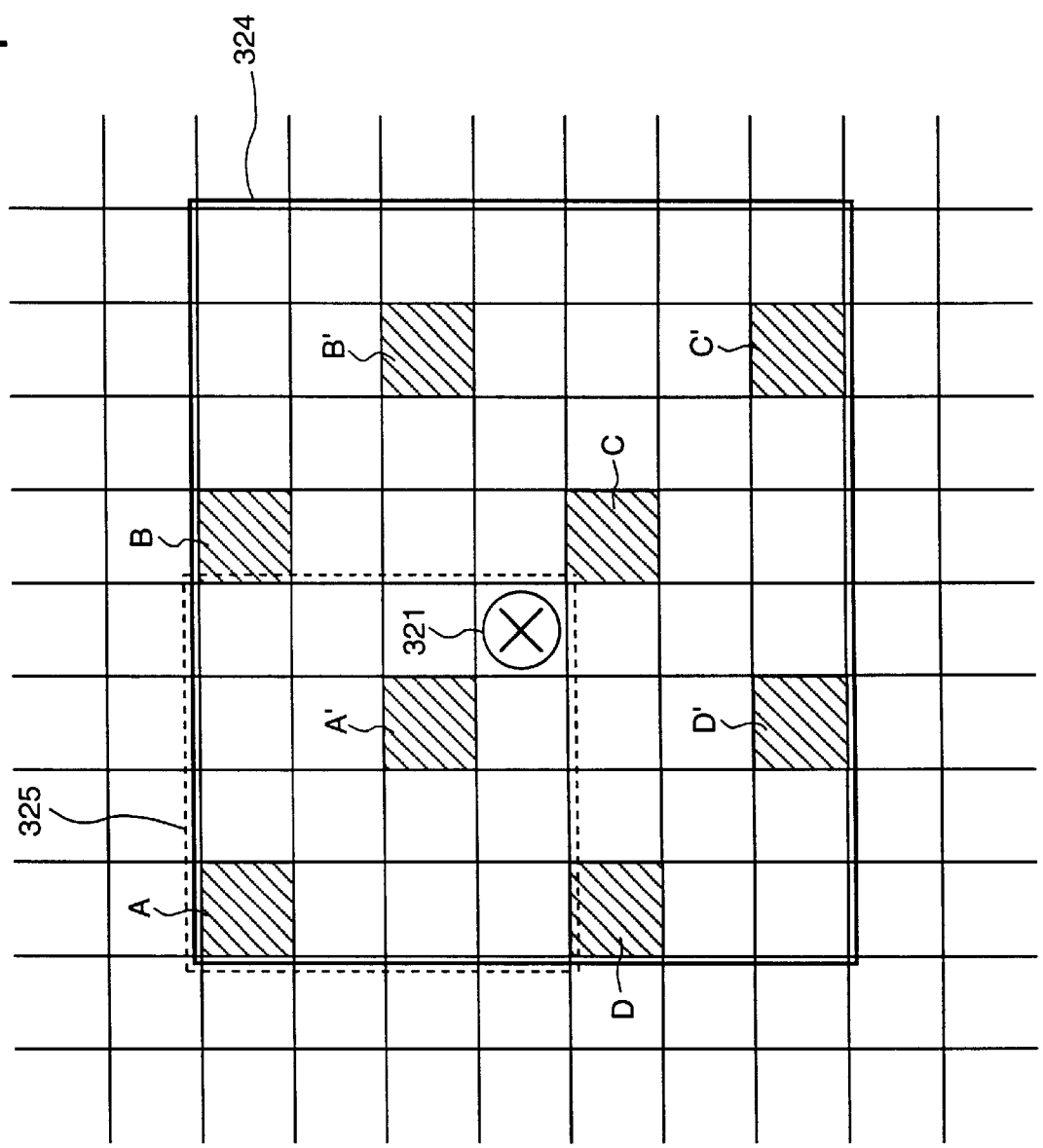
FIG. 18 is a diagram for describing processing executed by the image segmentation unit shown in FIG. 17.

As shown in FIG. 17, numeral 3010 denotes a data holding unit for sequentially updating and holding each pixel value in a small area necessary for image-segment discrimination processing. The data holding unit 3010 receives digital binary image data 3040 that is inputted in a raster scanning format. As shown in FIG. 18, the data holding unit 3010 holds data of a total of 64 pixels in an area 324 of a maximum of 8×8 pixels neighboring a pixel of interest 321. The data held is updated to data of the corresponding area in sync with the updating (sequential movement by raster scanning) of the position of the pixel of interest 321.

FIG. 19 is a block diagram showing the construction of the data holding unit 3010. Numeral 3011 denotes a line buffer, which is constituted by FIFO memories or the like, for holding data equivalent to seven lines immediately preceding the line currently being inputted. Numeral 3012 denotes a latch group for holding eight pixels of data per line, for a total of 64 items of data.

With reference again to FIG. 17, numeral 3020 denotes an image-segment discriminator for discriminating whether the pixel of interest 321 is a pixel in a pseudo-halftone area based upon data of a pixel group which includes the pixel of interest 321 forming the small area 324 outputted by the data holding unit 3010. The image-segment discriminator 3020 includes an isolated-pixel discriminator 3021, a periodicity discriminator 3022 and a high-frequency component discriminator 3023. These three discriminators judge whether conditions that differ from one another are satisfied. If any one of the conditions is satisfied, an OR gate 3024 outputs a signal 3050 indicating that the pixel of interest 321 is a pixel in a pseudo-halftone area. More specifically, the OR gate 3024 outputs the signal 3050, which is indicative of the pseudo-halftone area, if the pixel of interest 321 is an isolated point or a pixel contained in an isolated-pixel area, a periodic-pixel area or a high-frequency component area.

Figure 21:
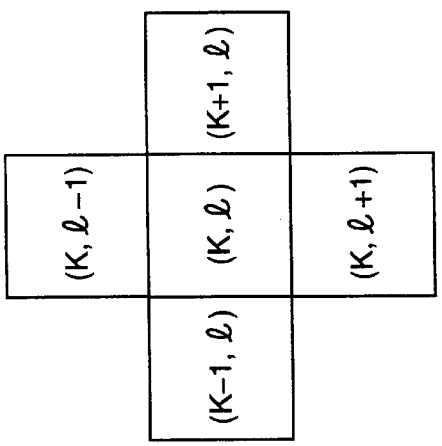
FIG. 21 is a diagram for describing processing executed by the image segmentation unit shown in FIG. 17.
Figure 20:
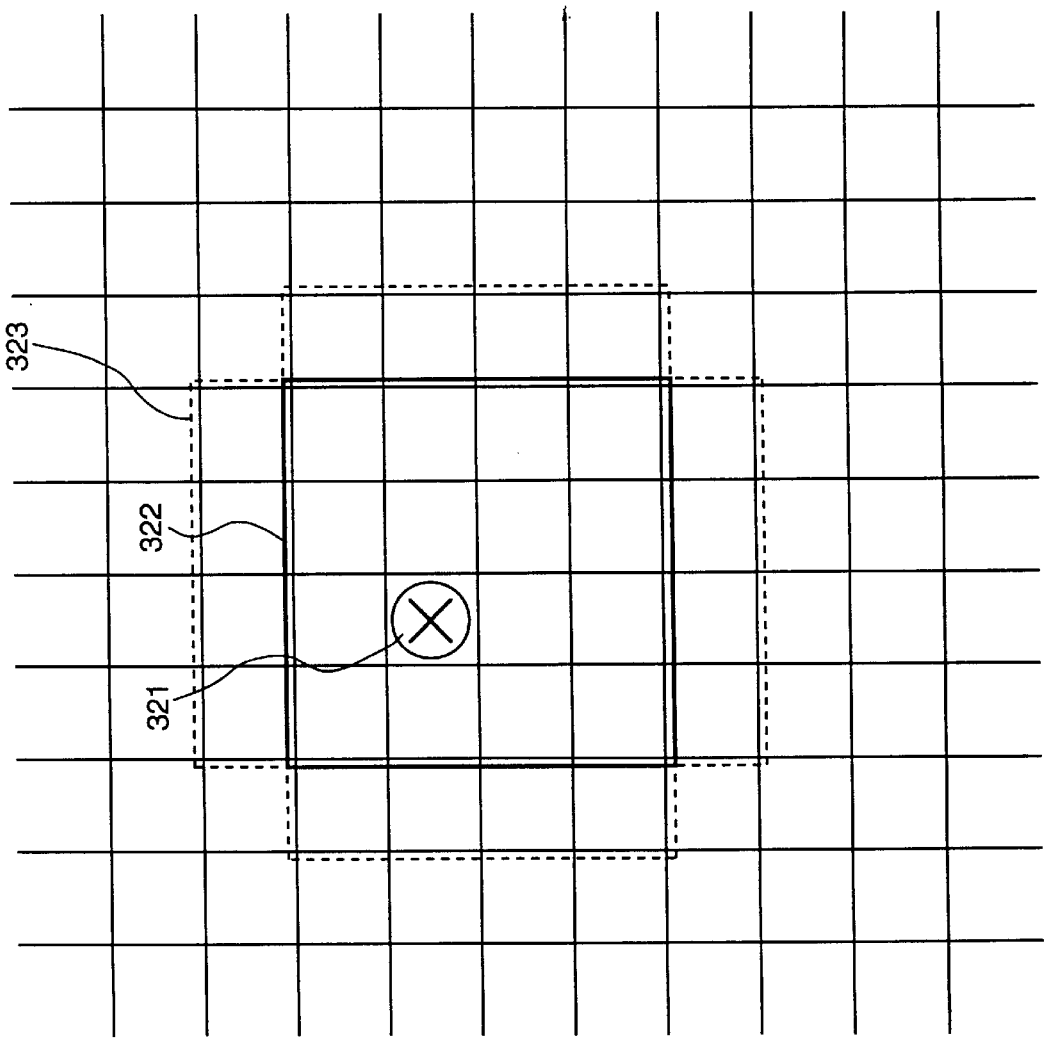
FIG. 20 is a diagram for describing processing executed by the image segmentation unit shown in FIG. 17.

The isolated-pixel discriminator 3021 determines whether the pixel of interest 321 resides in an isolated-pixel area. More specifically, with regard to each of 16 pixels in a 4×4 pixel area 322 shown in FIG. 20, it is determined by detection whether four pixels (FIG. 21), namely the pixels above, below and to the left and right, are all pixels of identical value (all white pixels or all black pixels) and whether the values of these four pixels differ from the value of the center pixel (k,l). If the results of detecting the 16 pixels are obtained and two or more of these pixels satisfy the above-mentioned condition, then it is decided that the pixel of interest 321 in the 4×4 pixel area 322 resides in an isolated-pixel area. In other words, among the 16 pixels in the pixel area 322 neighboring the pixel of interest 321, it is determined whether isolated pixels (black pixels or white pixels not connected at the top, bottom, left or right) are two or more in number. If isolated pixels are two or more, then the pixel of interest 321 is judged to reside in an isolated-pixel area.

The periodicity discriminator 3022 determines whether a pixel value is repeated at a predetermined pixel period. More specifically, with the exception of a case in which the 64 pixels in the 8×8 pixel area 324 in FIG. 18 are all white pixels or all black pixels, it is determined whether pixel values of four pixels segmented from each other by four pixels in the main-scan direction and/or by four pixels in the sub-scan direction, e.g., the pixel values of pixels A, B, C, D indicated by the hatching in FIG. 18, are all the same or not. It should be noted that, in the 8×8 pixel area 324, it is possible to define 16 sets of four pixels in the relative positional relationship of the kind indicated by the pixels A, B, C, D. In each of these 16 sets, it is determined whether the pixel values of the four pixels are all equal or not. If they are, say, 14 sets in which the four pixels are all equal, it is determine that the portion is a periodic portion, namely a dither portion, with the exception of a case where all 64 pixels are white pixels or black pixels.

Figure 22:
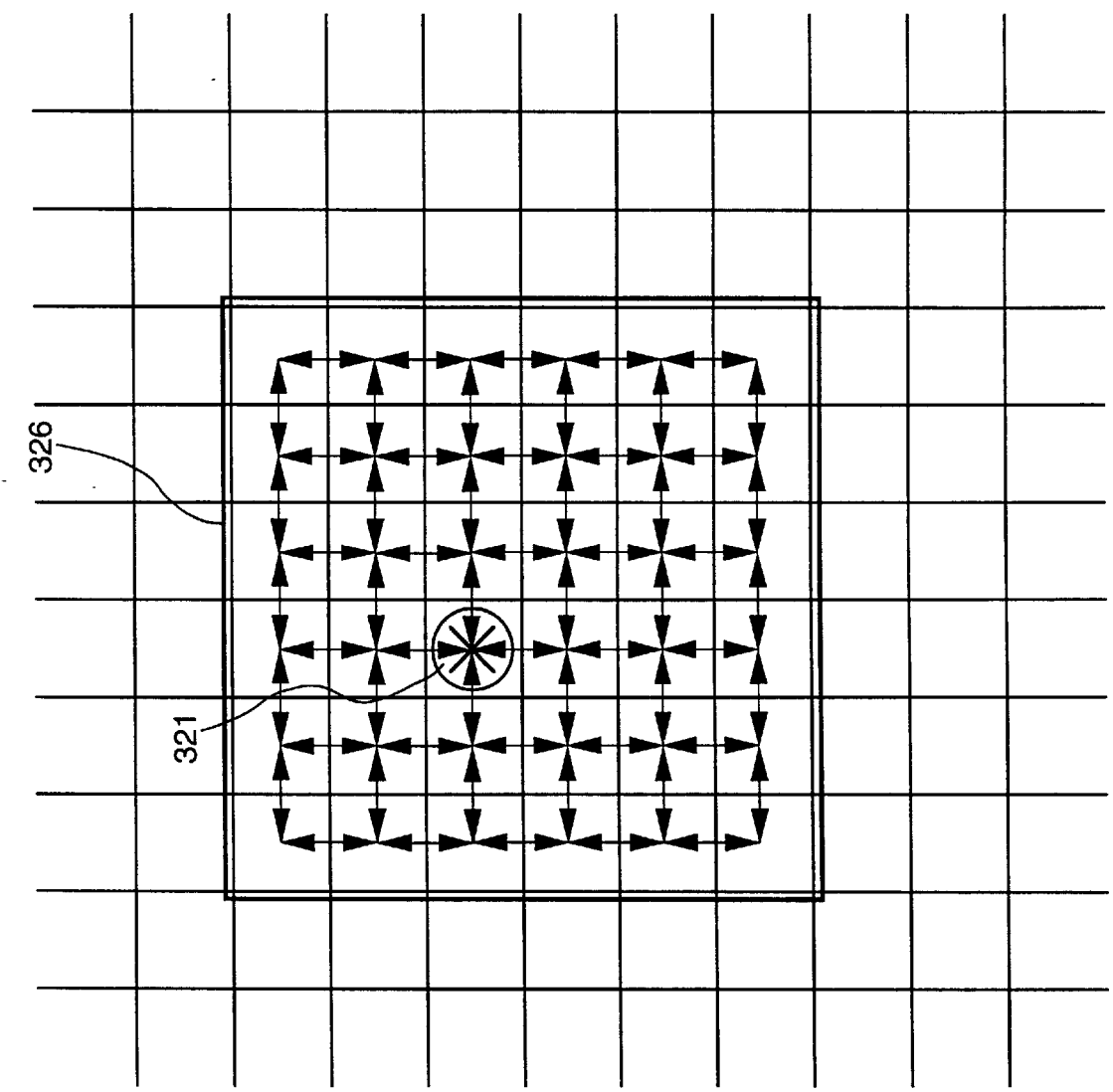
FIG. 22 is a diagram for describing processing executed by the image segmentation unit shown in FIG. 17.

The high-frequency component discriminator 3023 determines whether a change is density occurs frequently between adjacent pixels. More specifically, in a 6×6 pixel area shown in FIG. 22, the discriminator 3023 determines whether there is a difference between the pixel values of two mutually adjacent pixels in 60 sets thereof obtained by combining 30 combinations (indicated by the horizontal bidirectional angles in FIG. 22) between two mutually adjacent pixels of 36 pixels in the horizontal (main-scan) direction and 30 combinations (indicated by the vertical bidirectional angles in FIG. 22) between two mutually adjacent pixels of 36 pixels in the vertical (sub-scan) direction. Further, if there are, say, 28 or more sets of mutually different combinations, the discriminator 3023 judges that a pixel resides in a high-frequency component area.

The results of discrimination (the image-segment components of each image segment) at the image-segment discrimination step 3 are stored, as image-segment components of each image segment, in the image-segment data memory 1007. With regard to an image segment judged as being each image-segment component of a limited-color character or line drawing, a limited-color pseudo-halftone, a limited-value character or line drawing or a limited-value pseudo-halftone, the mean color in the image segment (e.g., the average pixel value of each of the colors RGB) is calculated and this is stored, as the mean color of the image segment, in the image-segment data in the image-segment data memory 1007.

Adaptive Zooming Step

The adaptive zooming step 4 subjects each image segment extracted at the image-segment extraction step 2 to zoom processing conforming to the image-segment component discriminated at the image-segment discrimination step 3, thereby creating a zoomed image of the input image.

Figure 23:
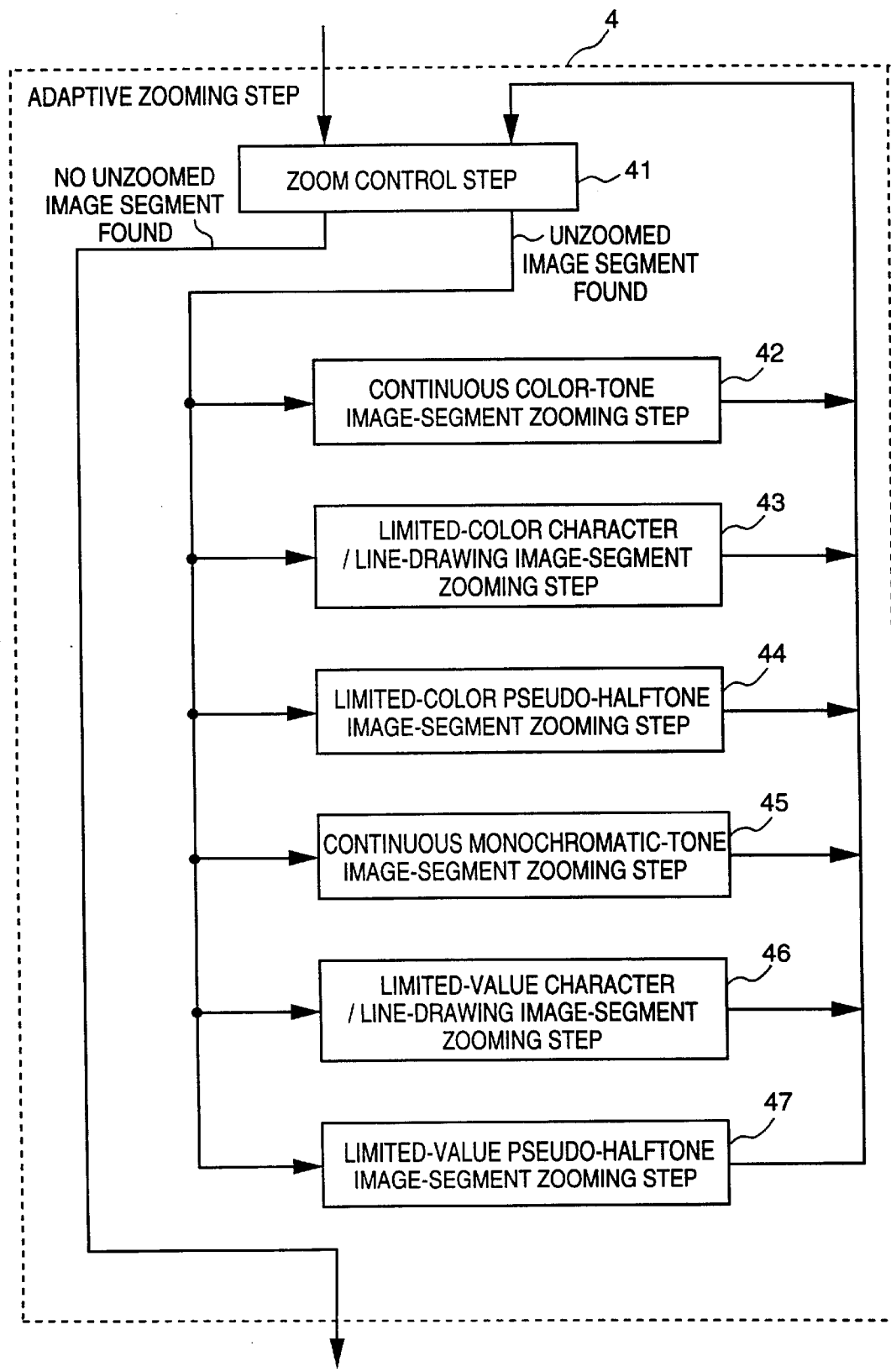
FIG. 23 is a diagram illustrating the detailed procedure of an adaptive zooming step shown in FIG. 1.

FIG. 23 is a diagram illustrating the detailed procedure of the adaptive zooming step 4. The adaptive zooming step 4 adapts the zooming step, which conforms to the image-segment component, for every image segment and then combines the zoomed images of the respective image segments, thereby creating a zoomed image of the input image. This is performed under the control of a zoom control step 41. More specifically, the image segment of a continuous color tone is zoomed at a continuous color-tone image-segment zooming step 42, the image segment of a limited-color character or line drawing is zoomed at a limited-color character/line-drawing image-segment zooming step 43, the image segment of a limited-color pseudo-halftone is zoomed at limited-color pseudo-halftone image-segment zooming step 44, the image segment of a continuous monochromatic tone is zoomed at a continuous monochromatic-tone image-segment zooming step 45, the image segment of a limited-value character or line drawing is zoomed at a limited-value character/line-drawing image-segment zooming step 46, the image segment of a limited-value pseudo-halftone is zoomed by a limited-value pseudo-halftone image-segment zooming step 47, and the resulting zoomed image segments are combined into a single zoomed image. Each of these steps will now be described.

The zoom control step 41 adaptively applies the zoom process conforming to an image-segment component to each and every image segment until there are no longer any image segments for which zooming has not been completed. FIG. 24 is a diagram illustrating a sequence of image segments which undergo zooming. Zooming is performed while pursuing image-segment nodes, which are described in image-segment data (having the tree structure), from route nodes (the most significant nodes). However, the zooming of each image segment must not be carried out ahead of a background image segment which is one rank below a node superior to the image segment itself. In other words, in a case where an image segment inferior to one intermediate image segment is zoomed, zooming must be performed from the background image segment.

The continuous color-tone image-segment zooming step 42 zooms an inputted image segment as by a color image zooming method using linear interpolation and writes the data of the zoomed image in the zoomed-image memory 1008. Though the writing of the zoomed-image data in the zoomed-image memory 1008 is the same as in other steps, this is performed based upon the position of the zoomed image segment calculated from the image-segment position of the inputted image segment.

According to the limited-color character/line drawing image-segment zooming step 43, the binary image stored as the image-segment shape data of the inputted image segment is zoomed by a well-known binary-image zooming method suited to a character or line-drawing image, such as the method in Japanese Patent Application No. 3-345062 already filed by the applicant, and the data of this zoomed image is written in the zoomed-image memory 1008. According to the limited-color pseudo-halftone image-segment zooming step 44, the binary image stored as the image-segment shape data of the inputted image segment is zoomed by a binary-image zooming method such as the SPC zooming method and the data of this zoomed image is written in the zoomed-image memory 1008. In the limited-color character/line drawing image-segment zooming step 43 and the limited-color pseudo-halftone image-segment zooming step 44, the writing of the zoomed image data is performed by writing the pixel value of the input image in a case where the pixel value of the zoomed binary image is "1" and not writing a pixel for which the pixel value is "0". A value written need not be a pixel value in the input image but may be an image-segment color of the inputted image segment. If such is the case, noise contained in the input image can be removed.

According to the continuous monochromatic-tone image-segment zooming step 45, an inputted image segment is zoomed as by a color-image zooming method using linear interpolation and the data of the zoomed image is written in the zoomed-image memory 1008.

According to the limited-value character/line drawing image-segment zooming step 46, the binary image stored as the image-segment shape data of the inputted image segment is zoomed by the well-known binary-image zooming method suited to a character or line-drawing image, such as the method in Japanese Patent Application No. 3-345062 already filed by the applicant, and the data of this zoomed image is written in the zoomed-image memory 1008. According to the limited-value pseudo-halftone image-segment zooming step 47, the binary image stored as the image-segment shape data of the inputted image segment is zoomed by a binary-image zooming method such as the SPC zooming method and the data of this zoomed image is written in the zoomed-image memory 1008. In the limited-value character/line drawing image-segment zooming step 46 and the limited-value pseudo-halftone image-segment zooming step 47, the writing of the zoomed image data is performed by writing the pixel value of the input image in a case where the pixel value of the binary image, which is obtained by SPC zooming of the binary image stored as the image-segment shape data of the inputted image segment, is "1" and not writing a pixel for which the pixel value is "0". A value written need not be a pixel value in the input image but may be an area color of the inputted image segment or the color black (e.g., in a case where the output image consists of eight bits per each of the colors R, G, B, all pixel values of RGB are zero). If such is the case, noise contained in the input image can be removed.

Further, the zoom ratio employs a value stored in the ROM 2004 in advance or a value designated by the user from a keyboard or DIP switch.

Thus, in accordance with this embodiment as described above, a document image inputted as a color image and consisting of a mixture of image segments having different components is subjected to image segmentation based upon the features of the color document image, whereby it is possible to segment image segments from the document image in excellent fashion even if the document image is one having a plurality of backgrounds whose colors are other than white. A segmented image segment is subjected to zoom processing that conforms to the characteristics of this area, as a result of which a zoomed color image having excellent image quality can be obtained.

<Second Embodiment>

An image processing apparatus according to a second embodiment of the present invention will now be described. Components in the second embodiment similar to those of the first embodiment are designated by like characters and need not be described in detail again.

[Processing Procedure]

Figure 25:
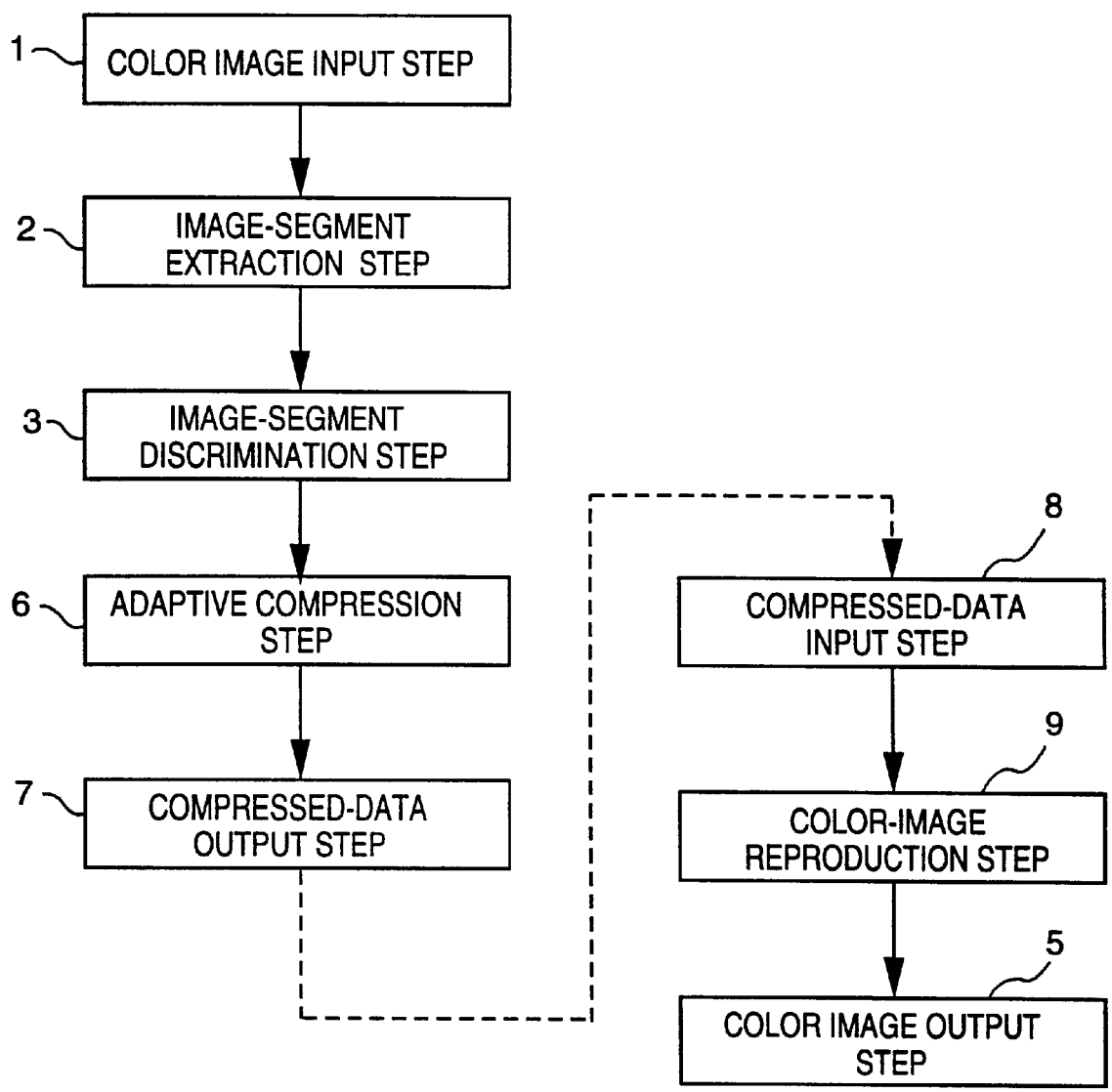
FIG. 25 is a diagram illustrating processing in a case where the present invention is applied to processing for compressing a color image in an image processing apparatus.

FIG. 25 is a diagram showing a processing procedure for a case in which the present invention is applied to processing for compressing a color image in an image processing apparatus. Steps from the color image input step 1 to the image-segment discrimination step 3 and the color image output step 5 are the same as in the first embodiment and a detailed description thereof is omitted.

In FIG. 25, an adaptive compression step 6 creates compressed data indicative of input image data by applying each image segment extracted at the image-segment extraction step 2 to compression processing that conforms to the image-segment component of the image segment discriminated by the image-segment discrimination step 3. According to a compressed-data output step 7, the compressed data created at the adaptive compression step 6 is outputted to a communication line or image storage device, which are not shown. The data compressed at the adaptive compression step 6 inputs from a communication line or image storage device at a compressed-data input step 8. The data compressed at the adaptive compression step 6 is reproduced as a color image at a color image reproduction step 9. It should be noted that the steps from the color image input step 1 to the compressed-data output step 7 are executed when the color image data is compressed. The steps from the compressed-data input step 8 to the color image output step 5 are executed when the compressed data is reproduced.

[Construction of Apparatus]

Figure 26:
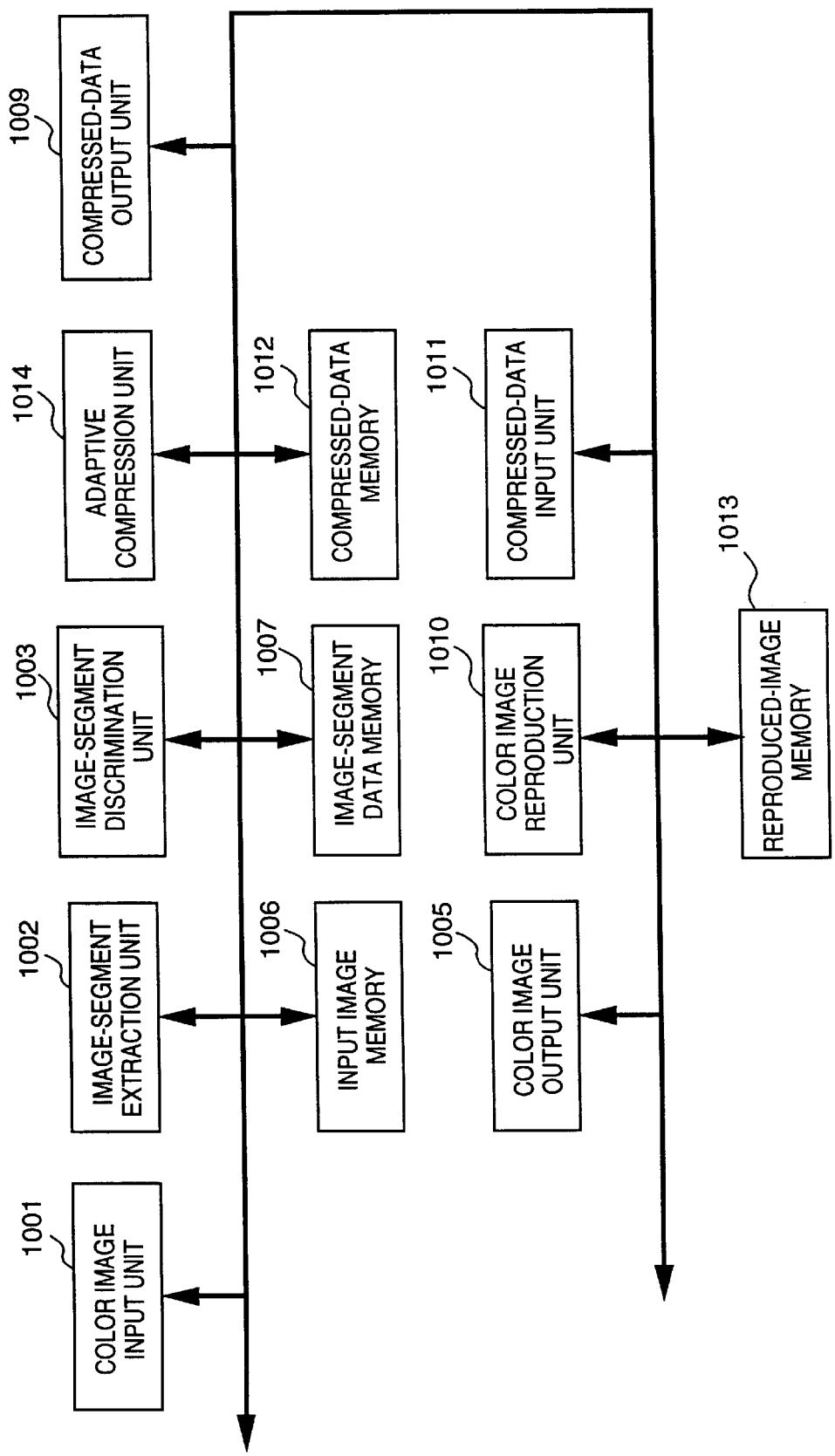
FIG. 26 is a block diagram showing the construction of an image processing apparatus which executes the processing shown in FIG. 25.
Figure 27:
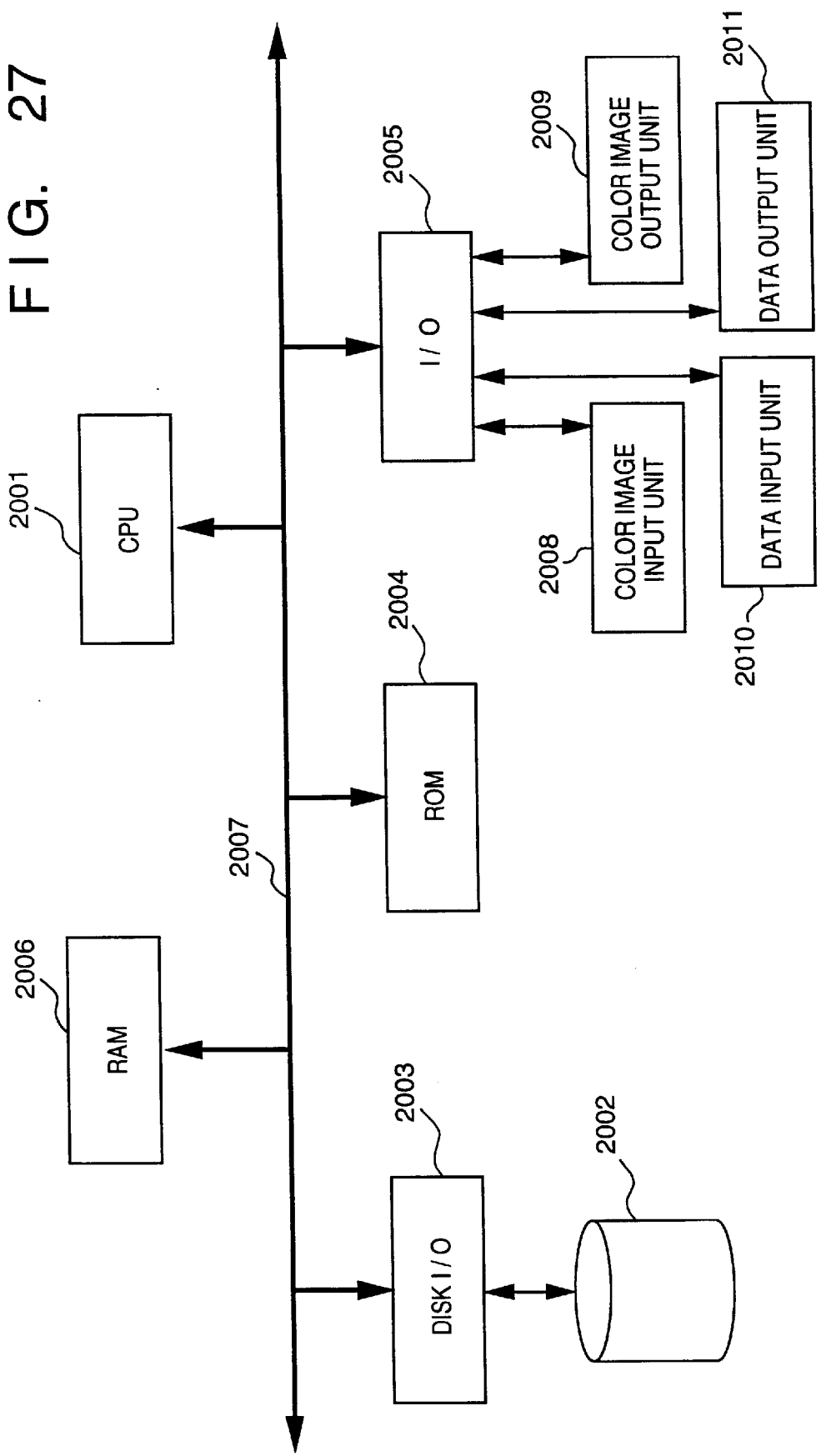
FIG. 27 is a block diagram showing hardware for implementing the arrangement of FIG. 26.

FIG. 26 is a block diagram showing the construction of an image processing apparatus which executes the processing shown in FIG. 25, and FIG. 27 is a block diagram showing hardware for implementing the arrangement of FIG. 26.

As shown in FIG. 27, this embodiment is further provided with a data input unit 2010 and a data output unit 2011, both of which are connected to the I/O port 2005.

As shown in FIG. 26, the color image input unit 1001 inputs digital color image data to be processed and stores this data in the input image memory 1006. The image-segment extraction unit 1002 extracts image segments from the image that has been stored in an input image memory 1006 and stores the extracted image-segment data in an image-segment data memory 1007. The image-segment discrimination unit 1003 discriminates image-segment components in each image segment extracted by the image-segment extraction unit 1002 and stores the image-segment components in the image-segment data memory 1007. An adaptive compression unit 1014 creates compressed data indicative of input image data by applying each image segment extracted by the image-segment extraction unit 1002 to compression processing that conforms to the image-segment component of the image segment discriminated by the image-segment discrimination unit 1003. The compressed data is stored in a compressed-data memory 1012.

A compressed-data output unit 1009 outputs compressed data compressed by the adaptive compression unit 1014 and stored in the compressed-data memory 1012. The destination of this output is a communication line or an image storage device. An arrangement can be adopted in which, under the control of the CPU 2001 which operates in accordance with a program stored in the ROM 2004 or storage device 2002, the data output unit 2011 outputs the compressed data that has been stored in the RAM 2006 or storage device 2002.

The compressed-data input unit 1011 inputs the compressed data from the communication line or image storage device and stores the compressed data in the compressed-data memory 1012. An arrangement can be adopted in which, under the control of the CPU 2001 which operates in accordance with the program stored in the ROM 2004 or storage device 2002, compressed data sent via the communication line or compressed data stored in the image storage device is inputted by the data input unit 2010.

A color image reproduction unit 1010 reproduces color image data from the compressed data that has been stored in the compressed-data memory 1012 and stores the color image data in a reproduced-image memory 1013. The reproduced color image data stored in the reproduced-image memory 1013 is outputted by the color image output unit 1005. The destination of this output is a display, a printer or copier for making hard copies, a communication line or an image storage device.

It should be noted that the adaptive compression unit 1014 and color image reproduction unit 1010 can be realized by the CPU 2001, which operates in accordance with the program stored in the ROM 2006 or storage device 2002, and the RAM 2006 or memory device 2002 used as a working memory. It goes without saying that these can also be realized by their own CPUs, RAMs and memories or by their own hardware. Further, the compressed-data memory 1012 and the reproduced-image memory 1013 can be realized by the RAM 2006 or memory device 2002. It goes without saying that these memories can be realized by their own storage devices.

Figure 28:
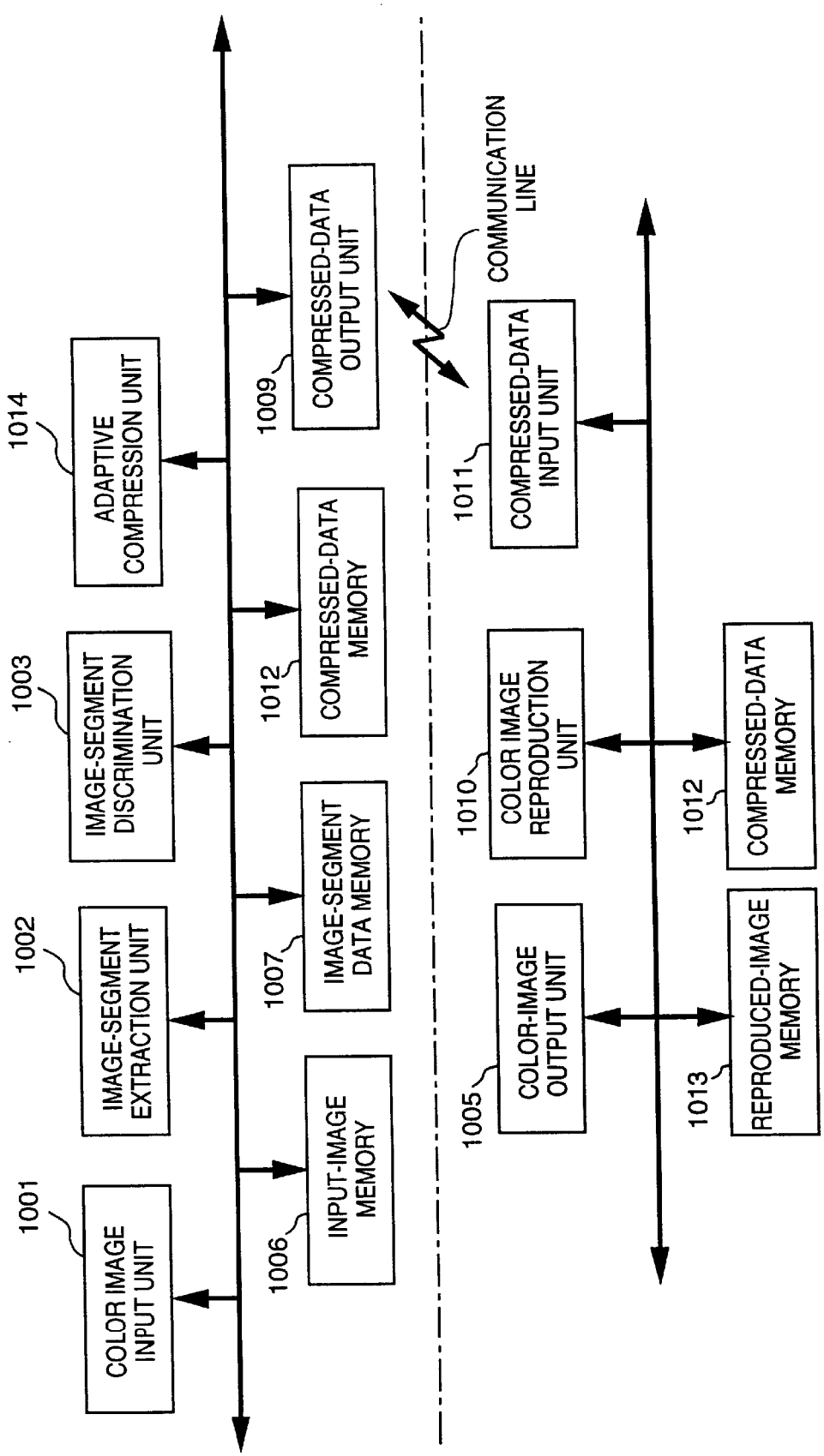
FIG. 28 is a block diagram showing another construction of an image processing apparatus which executes the processing shown in FIG. 25.

Furthermore, in a case where compression of the data and reproduction of the data are carried out in segment units, as when compressed data is sent and received via a communication line, this can be realized using two devices, such as a device which performs data compression and a device which reproduces compressed data, as illustrated in FIG. 28.

[Form of Compressed Data]

The form of the compressed data will be described next. A tree structure in which the image segments shown in FIG. 5A serve as nodes is retained also after the image data has been compressed.

Figure 29:
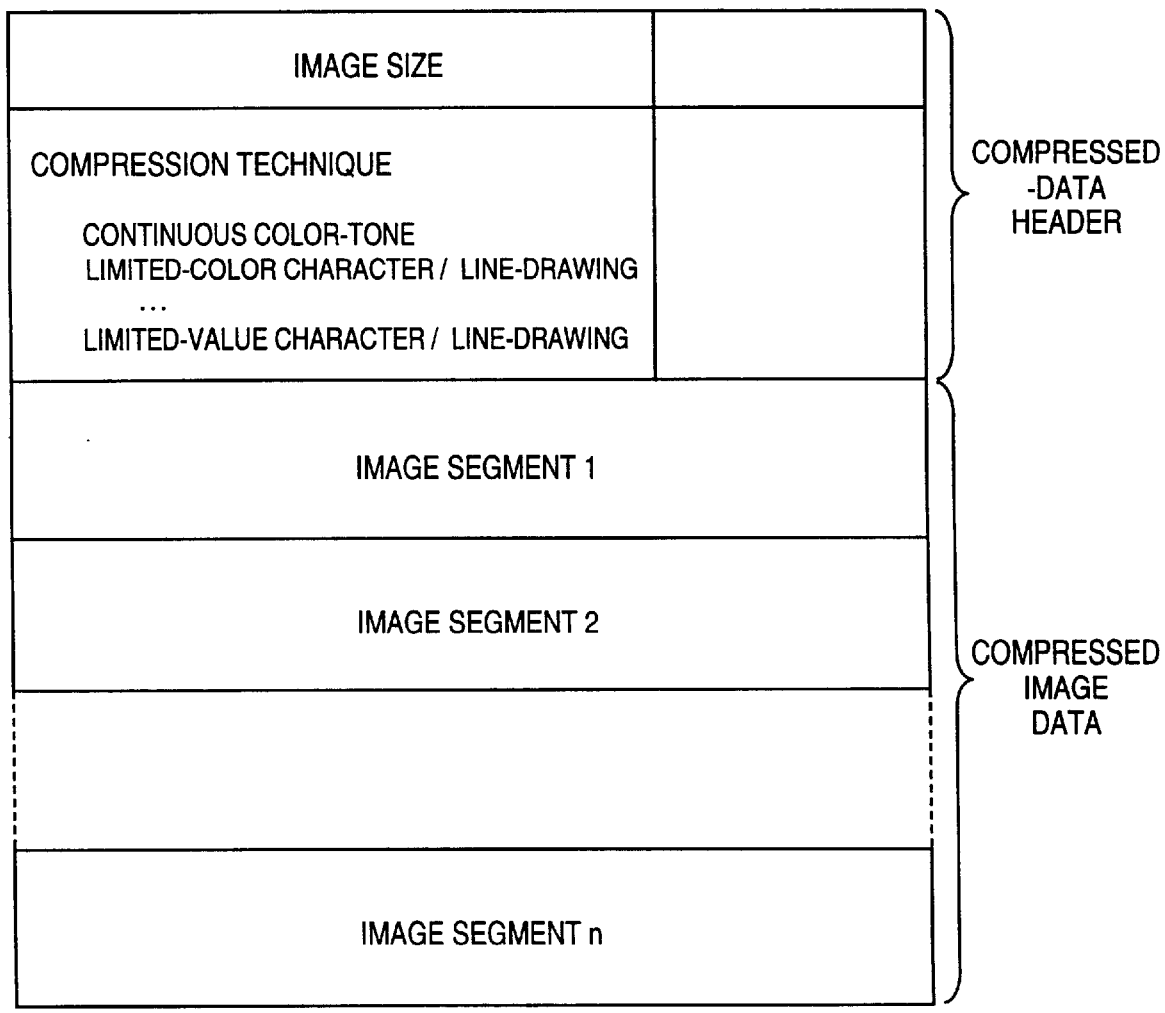
FIG. 29 is a diagram showing the structure of compressed data.

FIG. 29 is a diagram showing the structure of the compressed data. The compressed data is composed of a header (referred to as a "compressed-data header" below), in which are registered the image size and the compression method for the type of image-segment component, and the compressed data (referred to as "compressed image-segment data" below) of each image segment. The compressed image-segment data contains the image-segment data of the image segment.

FIGS. 30A and 30B are diagrams showing the form of image-segment data contained in compressed image-segment data. Image-segment data whose form is either of two types is held in dependence upon the image-segment component. More specifically, in case of a "limited-color character or line-drawing image segment", a "limited-color pseudo-halftone image segment", a "limited-value character or line-drawing image segment" or a "limited-value pseudo-halftone image segment", image-segment data of the form shown in FIG. 30A is held. Each element shown in FIG. 30A corresponds to a respective ones of the elements shown in FIG. 5B. In the first embodiment, a binary image indicative of the shape of an image segment is registered as "image-segment shape". In the second embodiment, however, a binary image compressed by a compression method stored in the compressed-data header is registered as "image-segment shape".

In the case of a "continuous color-tone image segment" or a "continuous monochromatic-tone image segment", image-segment data of the form shown in FIG. 30B is held. It should be noted that elements other than "image-segment shape" and "image-segment image data" correspond to respective ones of the elements shown in FIG. 5B, data compressed by a compression method registered in the compressed-data header is registered as "image-segment image data" and a binary image compressed by a method of compressing a limited-value character or line-drawing image segment is registered as "image-segment shape".

[Details of Processing]

The main steps shown in FIG. 25 will now be described in detail while using the arrangement of FIG. 26. However, steps from the color image input step 1 to the image-segment discrimination step 3 and the color image output step 5 are the same as in the first embodiment and a detailed description thereof is omitted.

Adaptive Compression Step

The adaptive compression step 6 creates compressed data indicative of input image data by applying each image segment extracted at the image-segment extraction step 2 to compression processing that conforms to the image-segment component discriminated by the image-segment discrimination step 3.

Figure 31:
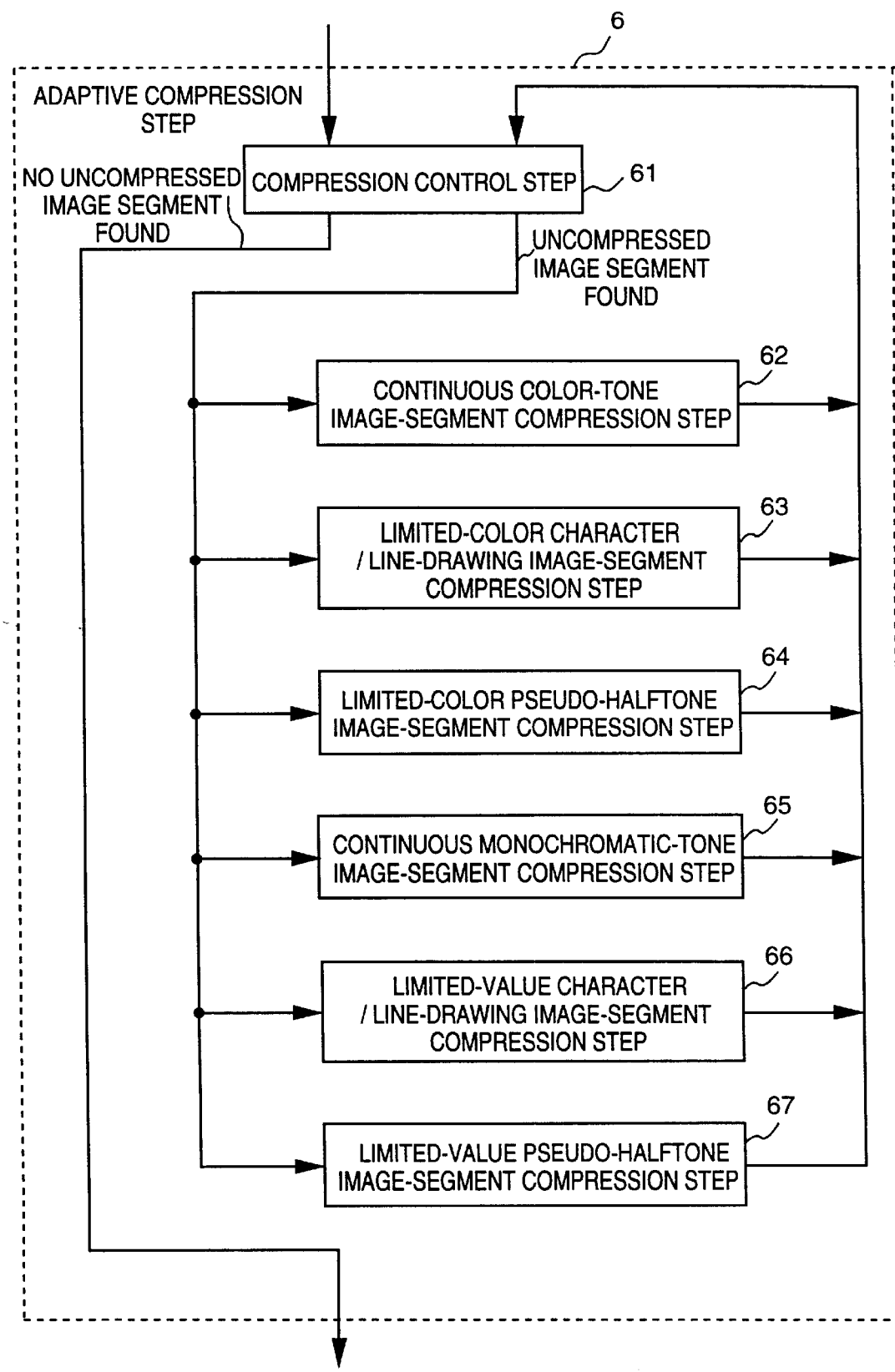
FIG. 31 is a diagram showing the detailed procedure of an adaptive compression step depicted in FIG. 25.

FIG. 31 is a diagram showing the detailed procedure of the adaptive compression step 6. In accordance with a compression control step 61, the adaptive compression step 6 adapts the compression step, which conforms to the particular image-segment component, for every image segment, thereby creating compressed data for each image segment, and stores the compressed data in the compressed-data memory 1012. More specifically, the image segment of a continuous color tone is compressed at a continuous color-tone image-segment compression step 62, the image segment of a limited-color character or line drawing is compressed at a limited-color character/line drawing image-segment compression step 63, the image segment of a limited-color pseudo-halftone is compressed at a limited-color pseudo-halftone image-segment compression step 64, the image segment of a continuous monochromatic tone is compressed at a continuous monochromatic-tone image-segment compression step 65, the image segment of a limited-value character or line drawing is compressed at a limited-value character/line-drawing image-segment compression step 66, and the image segment of a limited-value pseudo-halftone is compressed by a limited-value pseudo-halftone image-segment compression step 67. Each of these steps will now be described.

The compression control step 61 adaptively applies the compression process conforming to an image-segment component to each and every image segment until there are no longer any image segments that have not been compressed.

The continuous color-tone image-segment compression step 62 compresses a continuous color-tone image segment and stores the created compression data in the compressed-data memory 1012. More specifically, an image portion corresponding to the image-segment position of node to be processed is compressed by a coding method suited to a continuous color tone and the compressed data is registered as the "image-segment image data" shown in FIG. 30B. Further, the "image-segment shape" in the image-segment data stored in the image-segment data memory 1007 is compressed by the compression method of a limited-value character or line-drawing image segment, the compressed data is registered in the "image-segment shape" shown in FIG. 30B, and values the same as the image-segment data are registered as the other elements. It should be noted that JPEG coding using DCT, for example, is utilized as the coding method suited to the continuous color tone.

The limited-color character/line drawing image-segment compression step 63 compresses a limited-color character or line-drawing image segment and stores the created compressed data in the compressed-data memory 1012. More specifically, a binary image stored as the image-segment shape of a node to be processed is compressed by coding suited to a limited-color character or line drawing, the compressed data is registered as "image-segment shape" shown in FIG. 30A, and values the same as the image-segment data are registered as the other elements. It should be noted that MR/MMR coding, for example, is utilized as the coding method suited to the limited-color character or line drawing.

The limited-color pseudo-halftone image-segment compression step 64 compresses a limited-color pseudo-halftone image segment and stores the created compressed data in the compressed-data memory 1012. More specifically, a binary image stored as the image-segment shape of node to be processed is compressed by coding suited to a limited-color pseudo-halftone, the compressed data is registered as "image-segment shape" shown in FIG. 30A, and values the same as the image-segment data are registered as the other elements. It should be noted that JBIG coding, for example, is utilized as the coding method suited to the limited-color pseudo-halftone.

The continuous monochromatic-tone image-segment compression step 65 compresses a continuous monochromatic-tone image segment and stores the created compressed data in the compressed-data memory 1012. More specifically, an image portion corresponding to the image-segment position of a node to be processed is compressed by coding suited to a continuous monochromatic tone and the compressed data is registered as "image-segment image data" shown in FIG. 30B. Further, "image-segment shape" in the image-segment data stored in the image-segment data memory 1007 is compressed by a compression method for a limited-value character or line-drawing image segment and the compressed data is registered as "image-segment shape" shown in FIG. 30B, and values the same as the image-segment data are registered as the other elements. It should be noted that JPEG coding, for example, is utilized as the coding method suited to the continuous monochromatic tone.

The limited-value character/line drawing image-segment compression step 66 compresses a limited-value character or line-drawing image segment and stores the created compressed data in the compressed-data memory 1012. More specifically, a binary image stored as the image-segment shape of node to be processed is compressed by coding suited to a limited-value character or line drawing, the compressed data is registered as "image-segment shape" shown in FIG. 30A, and values the same as the image-segment data are registered as the other elements. It should be noted that MR/MMR coding, for example, is utilized as the coding method suited to the limited-value character or line drawing.

The limited-value pseudo-halftone image-segment compression step 67 compresses a limited-value pseudo-halftone image segment and stores the created compressed data in the compressed-data memory 1012. More specifically, a binary image stored as the image-segment shape of node to be processed is compressed by coding suited to a limited-value pseudo-halftone, the compressed data is registered as "image-segment shape" shown in FIG. 30A, and values the same as the image-segment data are registered as the other elements. It should be noted that JBIG coding, for example, is utilized as the coding method suited to the limited-value pseudo-halftone.

Color Image Reproduction Step

The color image reproduction step 9 reproduces color image data from compressed data that has been stored in the compressed-data memory 1012.

Figure 32:
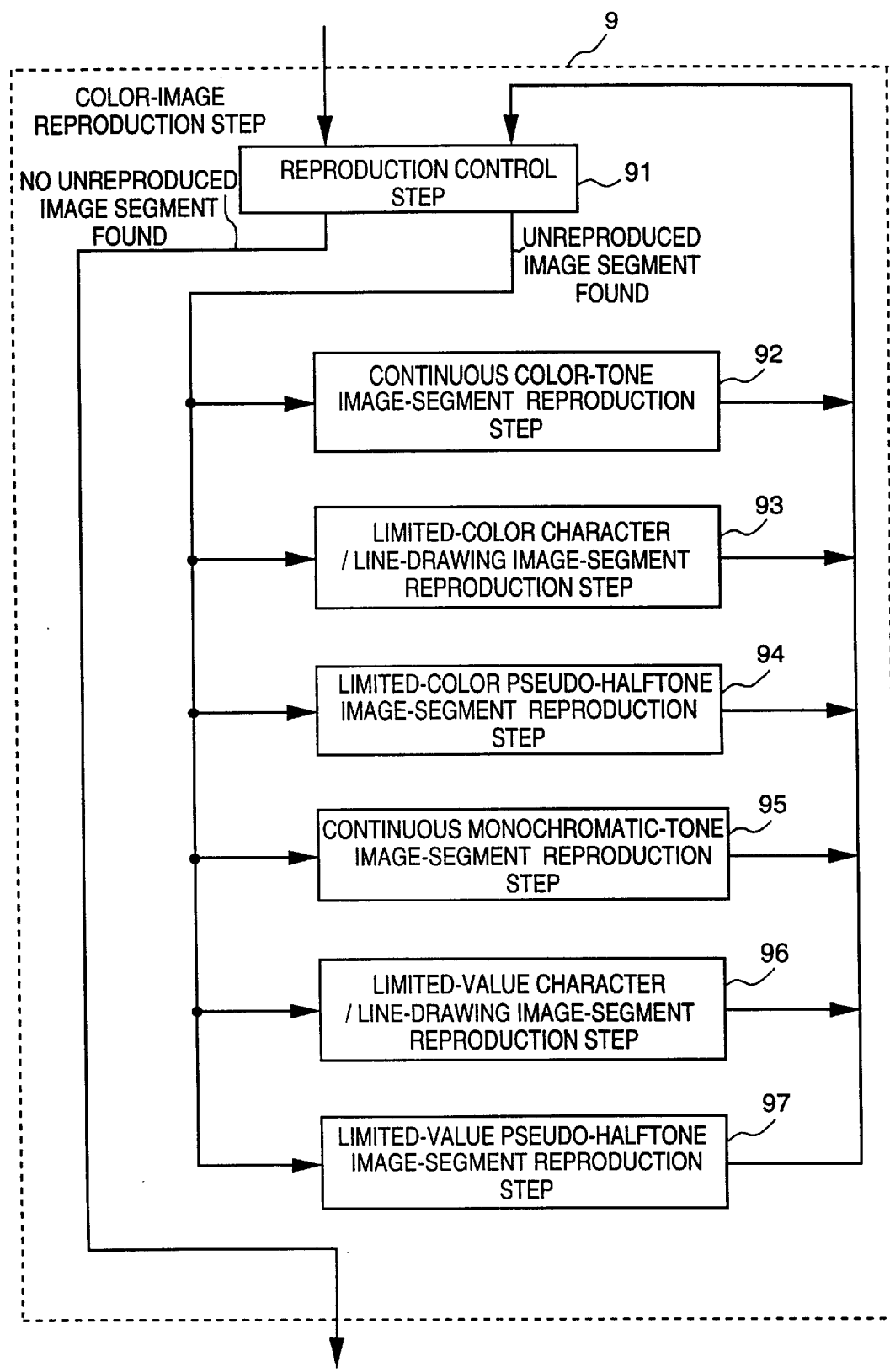
FIG. 32 is a diagram showing the detailed procedure of a color image reproduction step depicted in FIG. 25.

FIG. 32 is a diagram showing the detailed procedure of the color image reproduction step 9. In accordance with a reproduction control step 91, the color image reproduction step 9 reproduces a color image by applying, for each image segment, a reproduction process conforming to the "image-segment type" of the image-segment data contained in the compressed image-segment data, and stores this color image is stored the reproduced-image memory 1013. More specifically, reproduction is performed at a continuous color-tone image-segment reproduction step 92 in case of a continuous color tone, at a limited-color character/line drawing image-segment reproduction step 93 in case of a limited-color character or line drawing; at a limited-color pseudo-halftone image-segment reproduction step 94 in case of a limited-color pseudo-halftone; at a continuous monochromatic-tone image-segment reproduction step 95 in case of a continuous monochromatic tone; at a limited-value character/line-drawing image-segment reproduction step 96 in case of a limited-value character or line drawing; and at a limited-value pseudo-halftone image-segment reproduction step 97 in case of a limited-value pseudo-halftone. The reproduced image segments are combined into a single reproduced image. Each of these steps will now be described.

The reproduction control step 91 adaptively applies the reproduction process conforming to the image-segment type to each and every image segment until there is no longer any compressed image-segment data that has not been reproduced. The reproduction of image segments is performed in the sequence shown in FIG. 24. In other words, image-segment reproduction is performed while pursuing image-segment nodes, which are described in image-segment data (having the tree structure), from route nodes (the most significant nodes). However, the reproduction of each image segment must not be carried out ahead of a background image segment which is one rank below a node superior to the image segment itself. In other words, in a case where an image segment inferior to one intermediate image segment is reproduced, reproduction must be performed from the background image segment.

Figure 33:
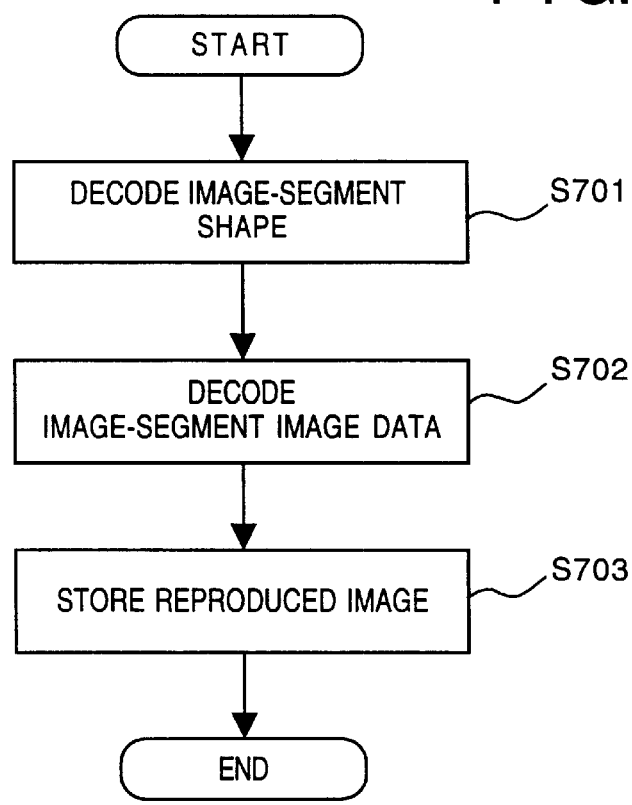
FIG. 33 is a flowchart illustrating the detailed procedure of a continuous color tone reproduction step depicted in FIG. 32.

The continuous color-tone image-segment reproduction step 92 reproduces an image segment from compressed image-segment data of a continuous color tone and stores this image segment in the reproduced-image memory 1013. FIG. 33 is a flowchart illustrating the detailed procedure of the continuous color-tone image-segment reproduction step 92. This flowchart is executed by the CPU 2001, by way of example.

First at step S701, data registered as "image-segment shape" of the compressed image-segment data is decoded by a decoding method corresponding to the method of coding of the limited-value character or line-drawing image segment registered in the compressed-data header. As a result, binary image data indicating the image-segment shape is reproduced and stored in the working memory. At step S702, data registered as "image-segment image data" of the compressed image-segment data is decoded by a decoding method corresponding to the method of coding of the continuous color-tone image segment registered in the compressed-data header. As a result, image-segment image data is reproduced and stored in the working memory. At step 703, pixels of the reproduced image-segment image data which correspond to pixels of value "1" in the reproduced binary-image data are stored in the reproduced-image memory 1013. It should be noted that the writing of reproduced image data in the reproduced-image memory 1013 is the same as in the other steps and is performed based upon position calculated from "image-segment position" of the compressed image-segment data.

Figure 34:
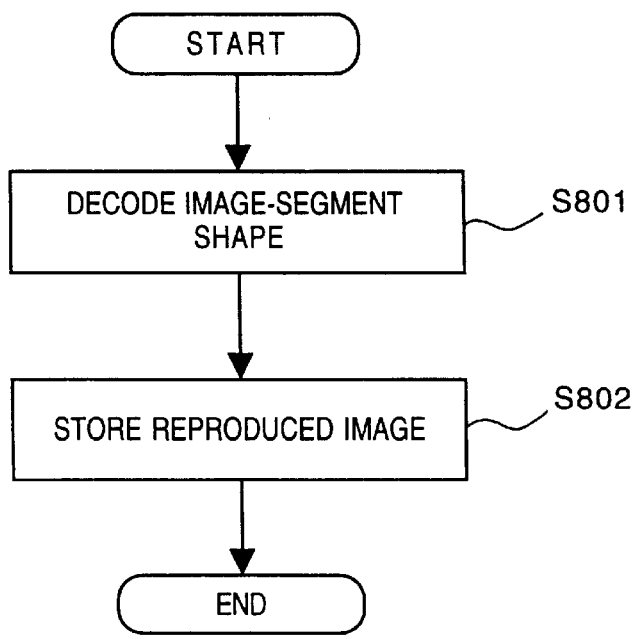
FIG. 34 is a flowchart illustrating the detailed procedure of a limited-color, character/line-drawing image segment reproduction step depicted in FIG. 32.

The limited-color character/line drawing image-segment reproduction step 93 reproduces an image segment from compressed image-segment data of a limited-color character or line drawing and stores the image segment in the reproduced-image memory 1013. FIG. 34 is a flowchart illustrating the detailed procedure of the limited-color character/line drawing image-segment reproduction step 93. This flowchart is executed by the CPU 2001, by way of example.

First at step S801, data registered as "image-segment shape" of the compressed image-segment data is decoded by a decoding method corresponding to the method of coding of the limited-color character or line-drawing image segment registered in the compressed-data header. As a result, binary image data indicating the image-segment shape is reproduced and stored in the working memory. Next, at step S802, pixels registered as the "image-segment color" of the compressed image-segment data are stored at positions in the reproduced-image memory 1013 which correspond to pixels of value "1" in the reproduced binary-image data.

The limited-color pseudo-halftone image-segment reproduction step 94 reproduces an image segment from compressed image-segment data of a limited-color pseudo-halftone and stores the image segment in the reproduced-image memory 1013. The limited-color pseudo-halftone image-segment reproduction step 94 reproduces image segments through a procedure similar to that of the limited-color character/line drawing image-segment reproduction step 93 illustrated in FIG. 34.

The continuous monochromatic-tone image-segment reproduction step 95 reproduces an image segment from compressed image-segment data of a continuous monochromatic tone and stores this image segment in the reproduced-image memory 1013. The continuous monochromatic-tone image-segment reproduction step 95 reproduces image segments through a procedure similar to that of the continuous color-tone image-segment reproduction step 92 shown in FIG. 33.

The limited-value character/line drawing image-segment reproduction step 96 reproduces an image segment from compressed image-segment data of a limited-value character or line drawing and stores the image segment in the reproduced-image memory 1013. The limited-value pseudo-halftone image-segment reproduction step 97 reproduces an image segment from compressed image-segment data of a limited-value pseudo-halftone and stores the image segment in the reproduced-image memory 1013. The limited-value character/line drawing image-segment reproduction step 96 and the limited-value pseudo-halftone image-segment reproduction step 97 reproduce image segments through a procedure similar to that of the limited-color character/line drawing image-segment reproduction step 93 shown in FIG. 34.

Thus, in accordance with this embodiment as described above, a document image inputted as a color image and consisting of a mixture of image segments having different components is subjected to image segmentation based upon the features of the color document image, whereby it is possible to segment image segments from the document image in excellent fashion even if the document image is one having a plurality of backgrounds whose colors are other than white. A segmented image segment is subjected to compression processing that conforms to the characteristics of this area, as a result of which compressed data can be obtained at an excellent compression rate. In addition, compressed image-segment data contained in this compressed data can be decompressed by a method conforming to the characteristics of the image segment, thereby making it possible to obtain a reproduced color image having an excellent image quality.

<Third Embodiment>

An image processing apparatus according to a third embodiment of the present invention will now be described. Components in the third embodiment similar to those of the first embodiment are designated by like characters and need not be described in detail again.

Next, in order to input a color original image into a DTP apparatus in the form of structured data, an embodiment will be described in which the present invention is applied to an image processing apparatus which edits a document image.

Figure 35:
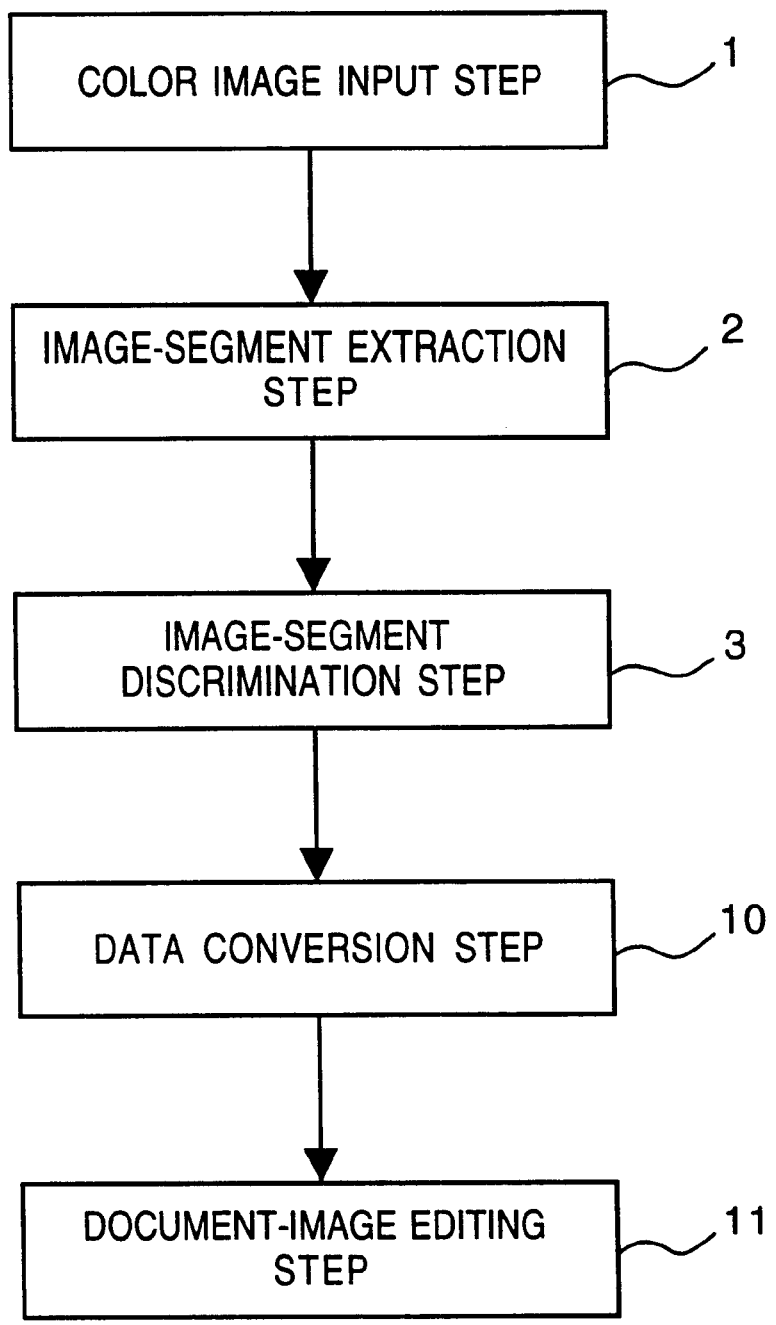
FIG. 35 is a diagram showing a processing procedure for a case in which the present invention is applied to document image editing processing in an image processing apparatus.

FIG. 35 is a diagram showing a processing procedure for a case in which the present invention is applied to document image editing processing in an image processing apparatus. Steps from the color image input step 1 to the image-segment discrimination step 3 are the same as those of the first embodiment and need not be described in detail again.

According to a data conversion step 10, image-segment data created by the process up to the image-segment discrimination step is converted, for each image segment, to image data having a data format suitable for the editing of a document image in a DTP apparatus or the like. As a result, an input image can be applied to document-image editing processing per each image segment segmented by the process up to the image-segment discrimination step 3, and this editing can also be performed per each image segment.

In the data conversion step 10, characters or symbols contained in a limited-color character of line-drawing image segment or limited-value character of line-drawing image segment can also be converted to character codes by character recognition in dependence upon a designation made by the user. Further, with regard to a limited-color character of line-drawing image segment or limited-value character of line-drawing image segment, data having a raster-scanning format can also be converted to vector data by raster-vector conversion in dependence upon a designation made by the user.

In a document image editing step 11, a character image is edited in accordance with a designation from the user and a document image representing the results of editing is outputted.

The foregoing processing can also be implemented in a DTP apparatus or in a special-purpose apparatus illustrated in the first embodiment.

Thus, in accordance with this embodiment, a document image inputted as a color image and consisting of a mixture of image segments having different components is subjected to image segmentation based upon the features of the color document image, whereby it is possible to segment image segments from the document image in excellent fashion even if the document image is one having a plurality of backgrounds whose colors are other than white. A color original image can be structured and inputted into a document-image editing apparatus such as a DTP apparatus. In addition, a segmented image segment is subjected to editing processing conforming to the characteristics of the image segment so that a color document image having excellent image quality can be obtained.

<Fourth Embodiment>

An image processing apparatus according to a fourth embodiment of the present invention will now be described. Components in the fourth embodiment similar to those of the first embodiment are designated by like characters and need not be described in detail again.

In the first embodiment, a background image segmentation step determines whether an intermediate image segment contains a background image segment and then segments the background image segment. In the example described, this step entails extracting, as the background image segment, an image segment of the same color occupying the major part of the intermediate image segment to be processed. Such method is effective in many color document images. However, in a color document image containing a continuous tone image segment such as a photographic image having portions in which there is little change in brightness or color, there are occasions where a background image segment is judged to reside in a continuous tone image segment that must properly be judged as being a single image segment, with the result that the continuous tone image segment is needlessly segmented into a continuous tone image segment and an intermediate image segment.

Accordingly, in this embodiment, a background image segmentation process is described in which, by judging whether an extracted background image segment is appropriate or not, it is possible to prevent the needless segmenting of a continuous tone image segment having a portion in which there is little change in brightness or color.

Figure 36:
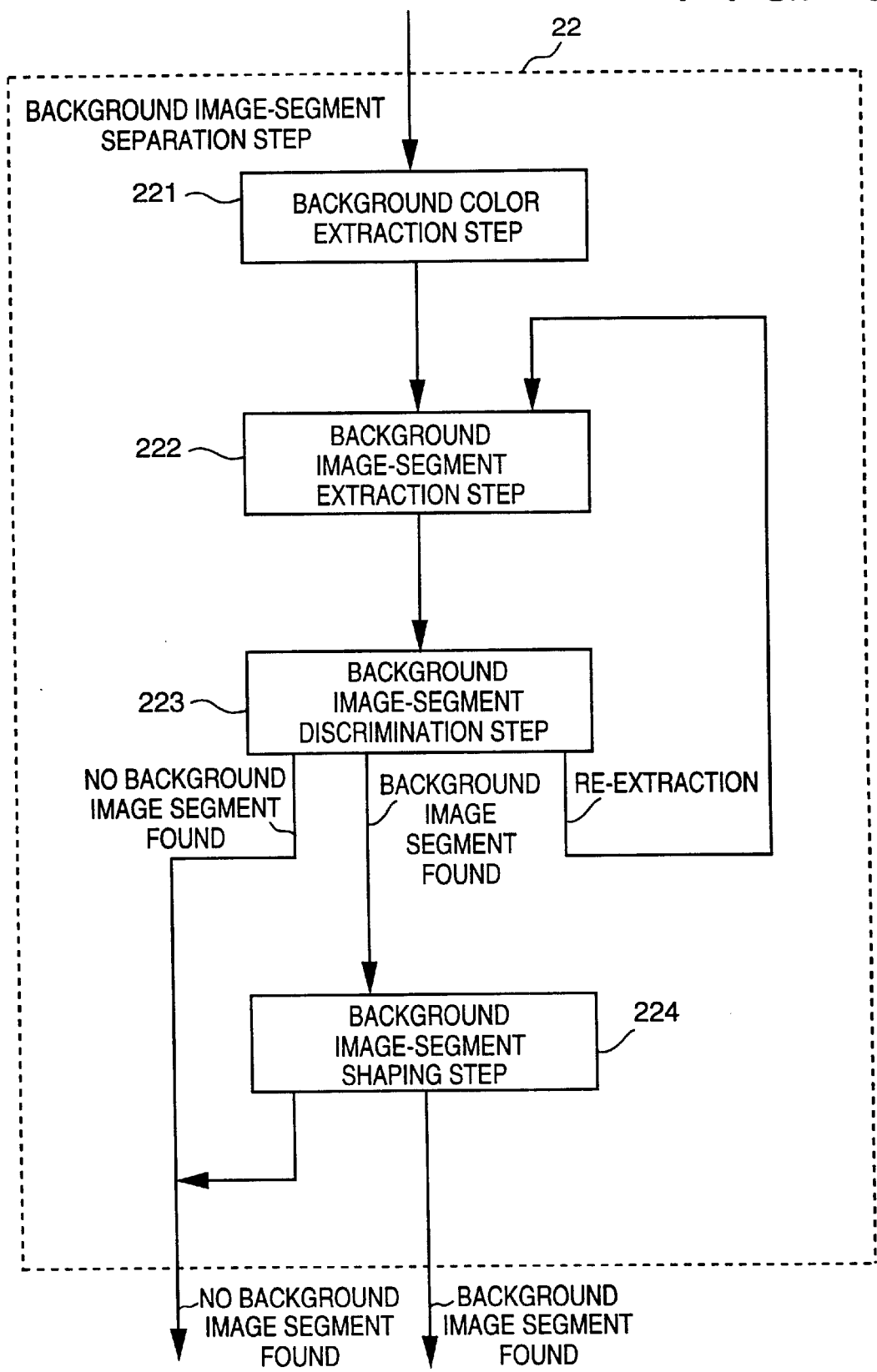
FIG. 36 is a diagram showing the detailed procedure of a background image segmentation step according to a fourth embodiment according to the present invention.

FIG. 36 is a diagram showing the detailed procedure of the background image segmentation step 22 according to this embodiment. This corresponds to FIG. 7 of the first embodiment.

In FIG. 36, a background color extraction step 221 analyzes the colors of the inputted intermediate image segment and extracts the color of the background image segment. More specifically, in the inputted intermediate image segment, a pixel having the most prevalent color or a color close to this color in comparison with the pixels of other colors has this most prevalent color extracted. A background image-segment extraction step 222 uses the extracted color of the background image segment to create a binary image of the background image segment. A background image-segment discrimination step 223 judges whether an image segment indicated by the created binary image is appropriate as a background image. If the image segment indicated is judged to be appropriate, processing proceeds to a background image-segment shaping step 224. If the image segment indicated is judged to be inappropriate, processing is terminated on the grounds that there is no background image segment or processing returns to the background image-segment extraction step 222, the processing parameters are changed and a background image segment is extracted again. The background image-segment shaping step 224 removes noise and small image segments from the binary image indicating the image segment judged as being an appropriate background image segment, shapes the background image segment and verifies, by the processing for removing small areas, whether the background image segment will vanish.

Figure 37A:
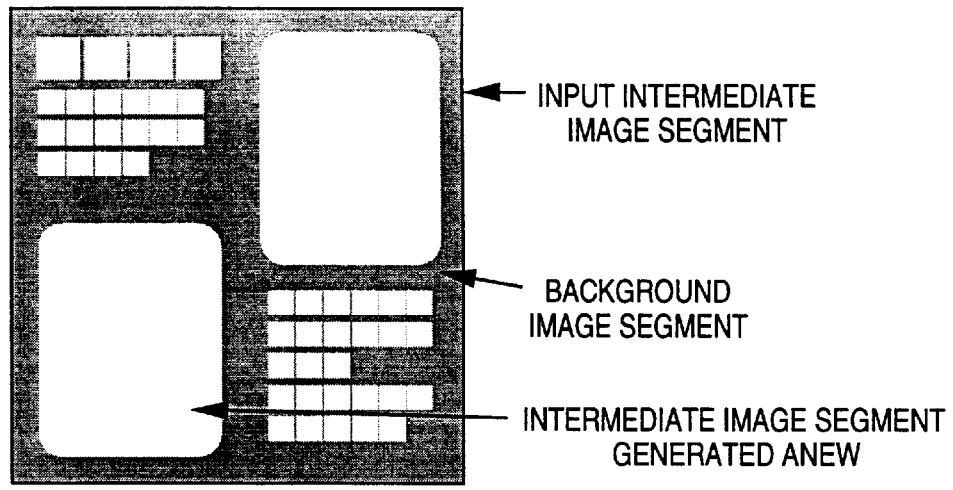
FIGS. 37A to 37C are diagrams for describing an overview of processing for judging a background image segment.
Figure 37B:
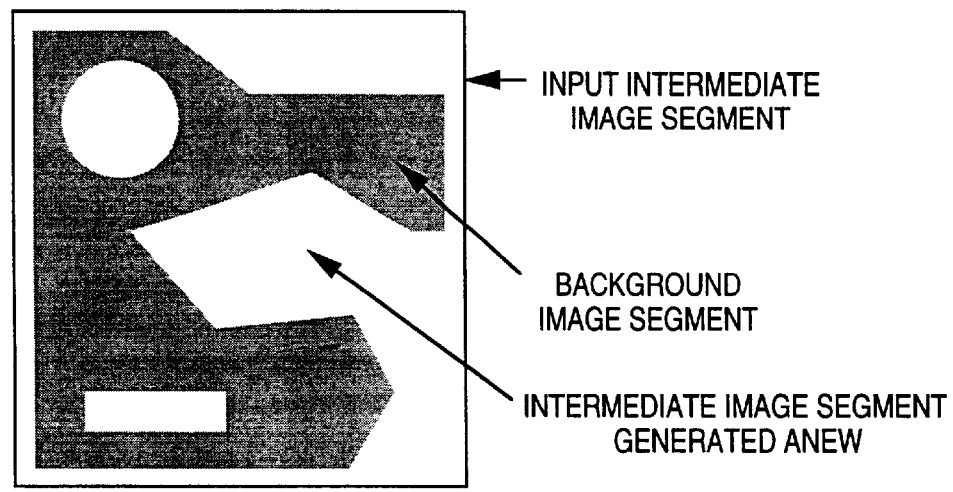
Figure 37C:
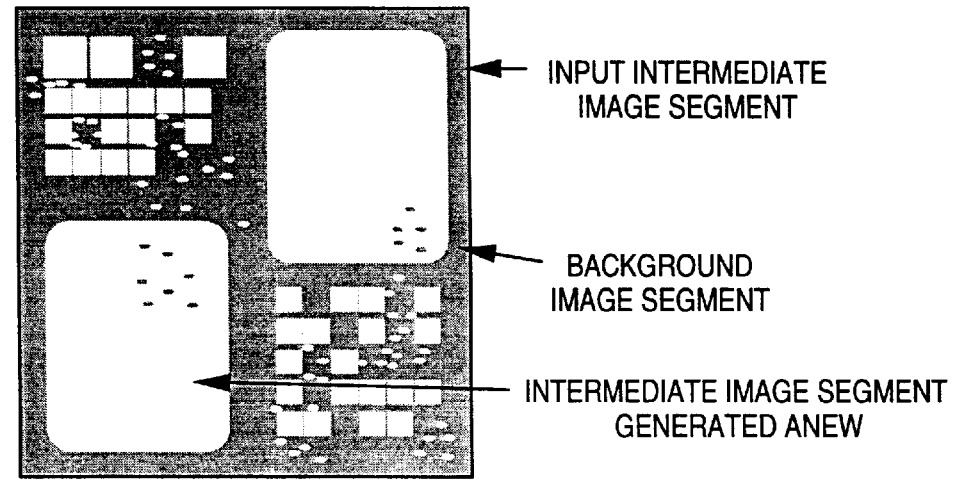

FIGS. 37A through 37C are diagrams for describing an overview of processing for judging a background image segment. FIG. 37A shows an example in which a background image segment is extracted from an intermediate image segment containing a background image segment, FIG. 37B shows an example in which a background image segment is extracted from an intermediate image segment of a continuous tone image segment such as a photograph, and FIG. 37C shows an example in which a background image segment is extracted from an intermediate image segment of a color document image having a large amount of noise. The background image-segment discrimination step 223 judges that the result of extraction shown in FIG. 37A is indicative of an appropriate background image segment and judges that the results of extraction shown in FIGS. 37B and 37C are indicative of inappropriate background image segments. In other words, in a case where the peripheral shape of an extracted image segment has been segmented from the peripheral portion of an inputted intermediate image segment, as shown in FIG. 37B, the background image-image segment discrimination step 223 determines the existence of a continuous tone portion having a small change in brightness or color and judges that the extracted image segment is inappropriate as a background image. In a case where there are many image segments of small area (these are meaningless as intermediate image segments) located in a portion contained in a newly generated intermediate image segment, namely in an image segment extracted as a background image segment, as shown in FIG. 37C, the range of color extracted as the background image segment is narrow.

Consequently, the background image-image segment discrimination step 223 determines that a background image segment has not been extracted sufficiently and judges that the extracted image segment is inappropriate as a background image.

Figure 38:
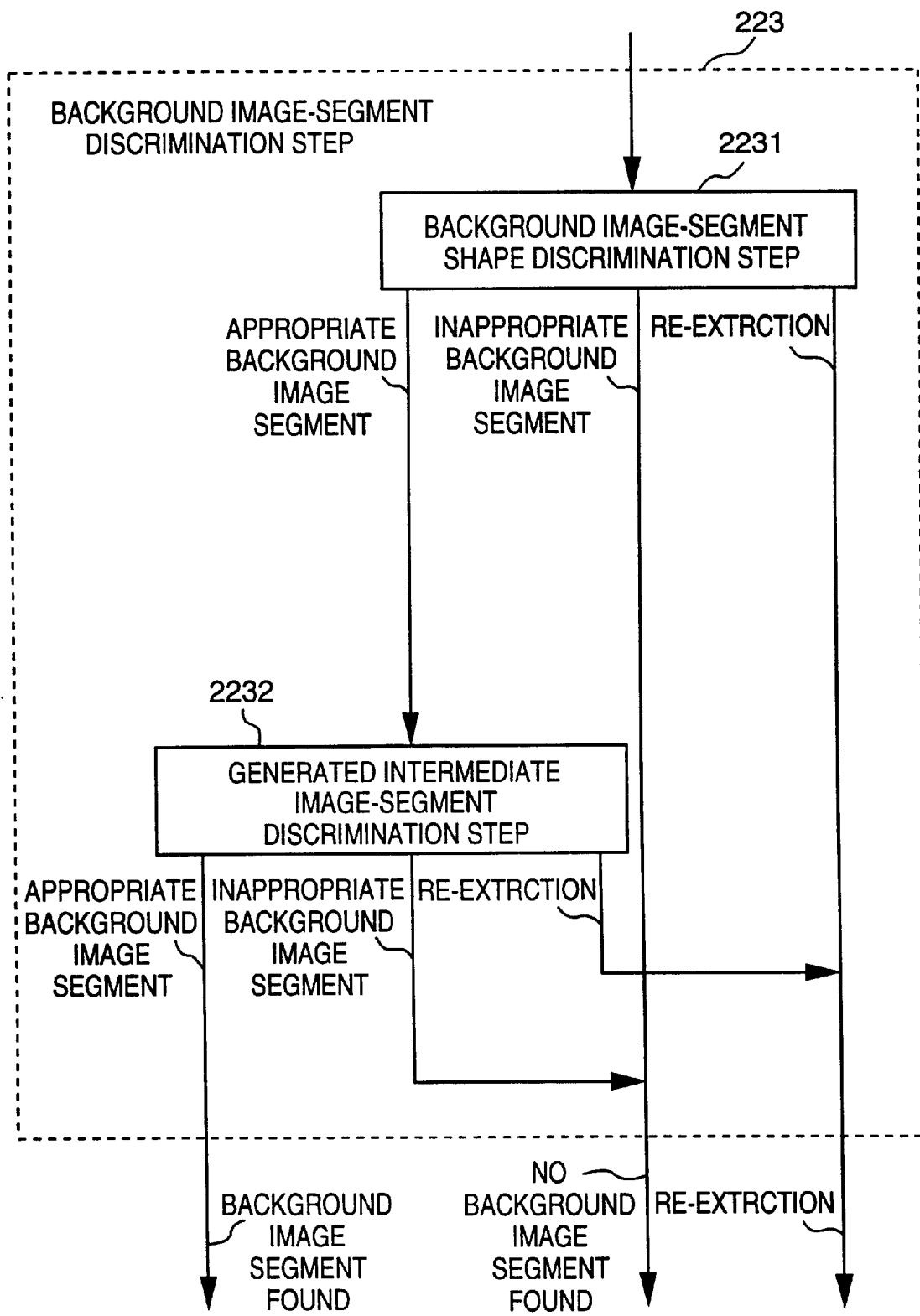
FIG. 38 is a diagram illustrating the detailed procedure of a background image-segment discrimination step shown in FIG. 36.

FIG. 38 is a diagram illustrating the detailed procedure of the background image-segment discrimination step 223. A background image-segment shape discrimination step 2231 determines whether the shape of an image segment extracted as a background image segment is broad enough in the inputted intermediate image segment. A generated intermediate image-segment discrimination step 2232 determines whether a large number of image segments of small area reside in a newly generated intermediate image segment, as described above.

Figure 39:
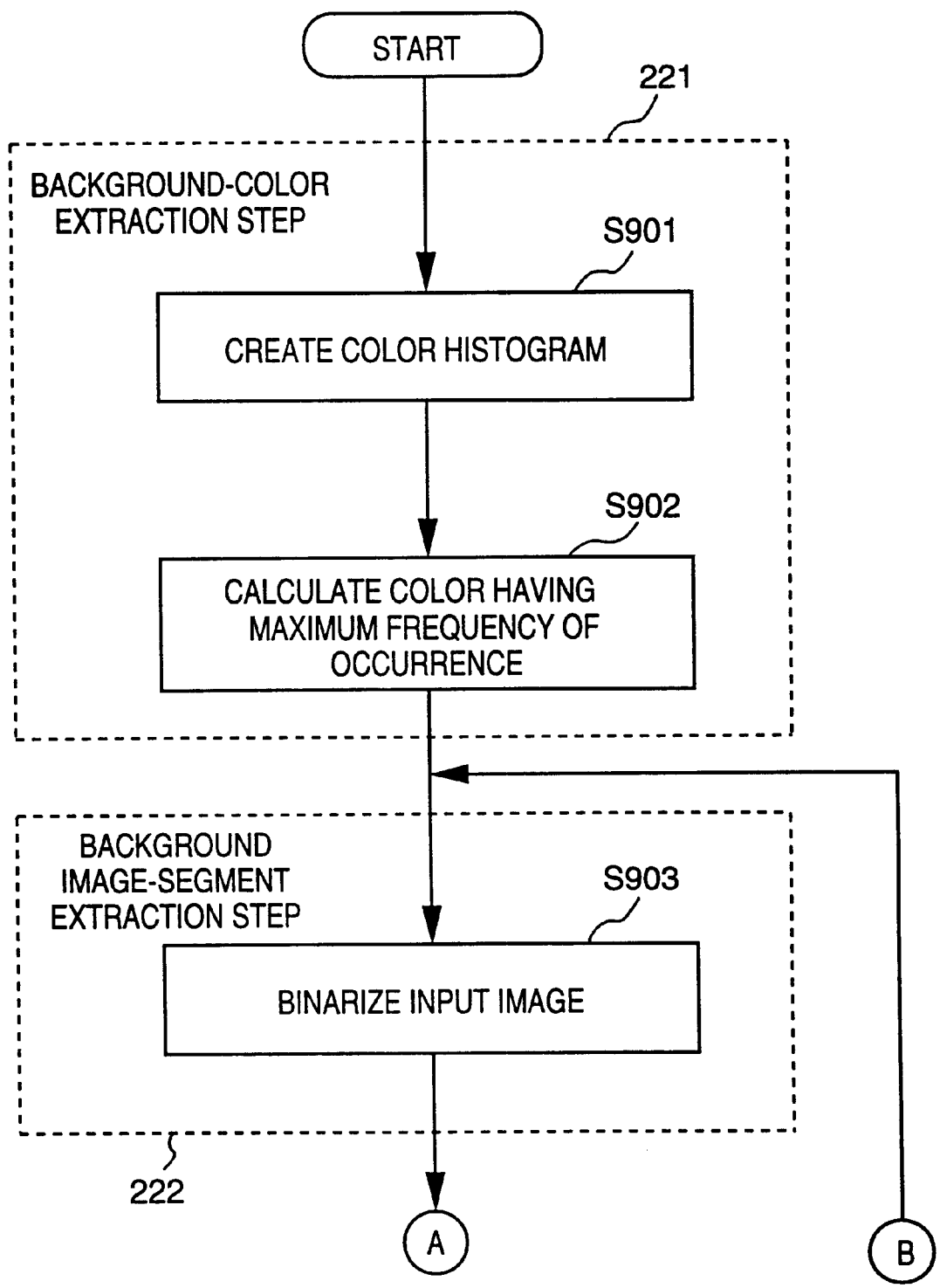
FIG. 39 is a flowchart illustrating a procedure for implementing a background image segmentation step shown in FIG. 38.
Figure 40:
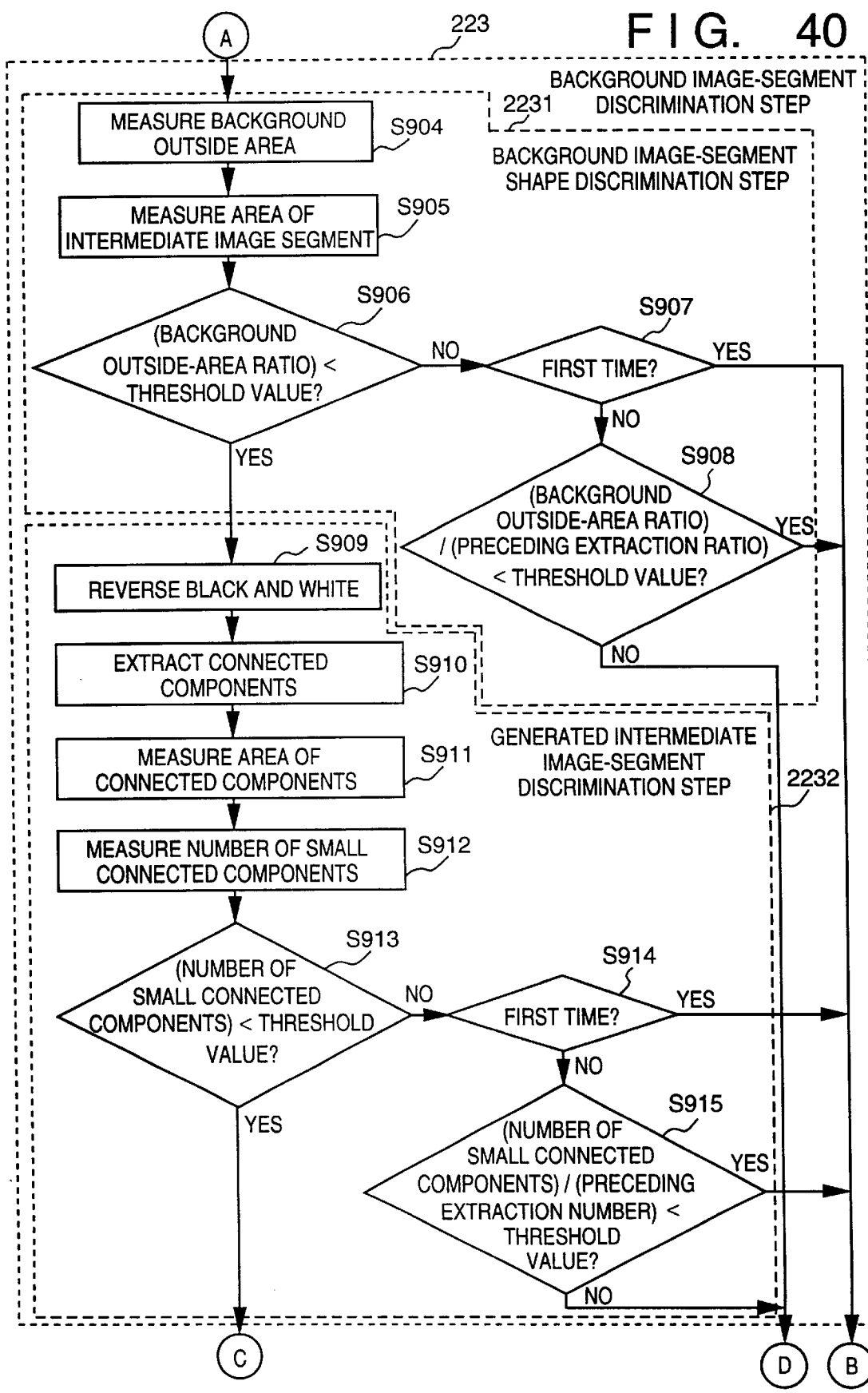
FIG. 40 is a flowchart illustrating a procedure for implementing a background image segmentation step shown in FIG. 38.
Figure 41:
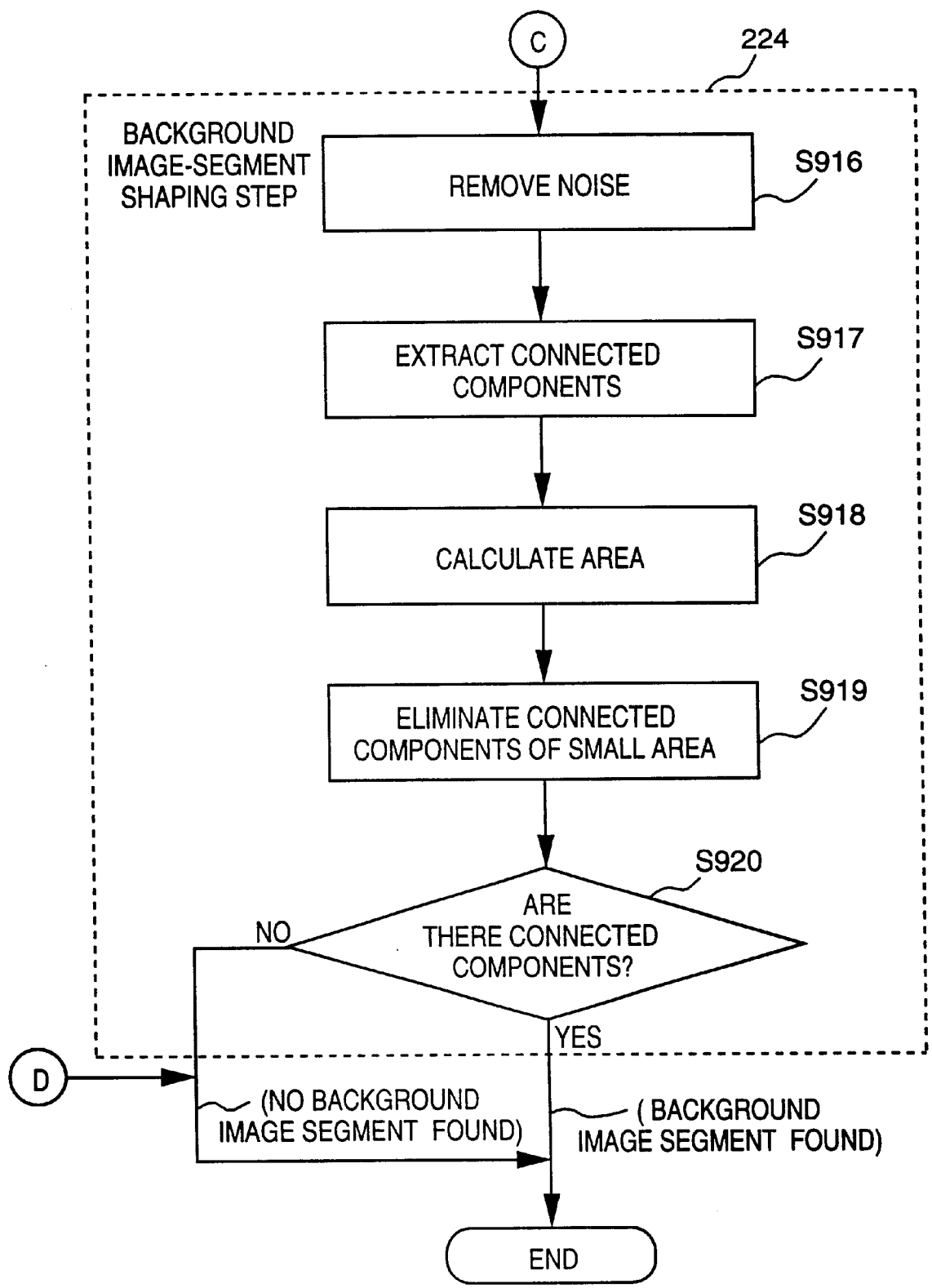
FIG. 41 is a flowchart illustrating a procedure for implementing a background image segmentation step shown in FIG. 38.

FIGS. 39 through 41 show a flowchart illustrating a procedure for implementing the background image segmentation step of this embodiment by processing executed by the CPU 2001. This corresponds to FIG. 8 of the first embodiment.

Steps S901 and S902 correspond to the background color extraction step 221. A color histogram is created in the working memory at step S901, and a color having the maximum frequency of occurrence (namely a candidate for the background color) is obtained at step S902.

Step S903, which corresponds to the background image-segment extraction step 222, creates binary image data in the working memory. This is binary image data of an intermediate image segment that has been binarized to pixels having a color close to the color of maximum frequency of occurrence and pixels other than these pixels. For example, binary image data is created in which pixels having a color close to the color of maximum frequency of occurrence are made "1"s and pixels other than these pixels are made "0"s. Whether or not a pixel of interest has a color near the color of maximum frequency is determined by obtaining the distance D in accordance with the equation shown below. In other words, it is judged that the pixel of interest has a color near the color of maximum frequency if the distance D obtained falls within a predetermined range (referred to as a "background range" below).

$$D^2=(R0-R1)^2+(G0-G1)^2+(B0-B1)^2$$

where R0, G0, B0 are R, G, B values of maximum frequency of appearance, and R1, G1, B1 are R, G, B values of the pixel of interest.

The value of the background range uses data stored in the ROM 2004 or the like as the initial value thereof but the value is changed in dependence upon the result of discrimination performed at the background image-segment discrimination step 223.

The steps from step S904 to S908 correspond to the background image-segment shape discrimination step 2231. The area (which shall be referred to as the "background outside area") on the outer side of the image segment extracted as the background image segment is measured at step S904, and the area of the inputted intermediate image segment is measured at step S905.

Figure 42:
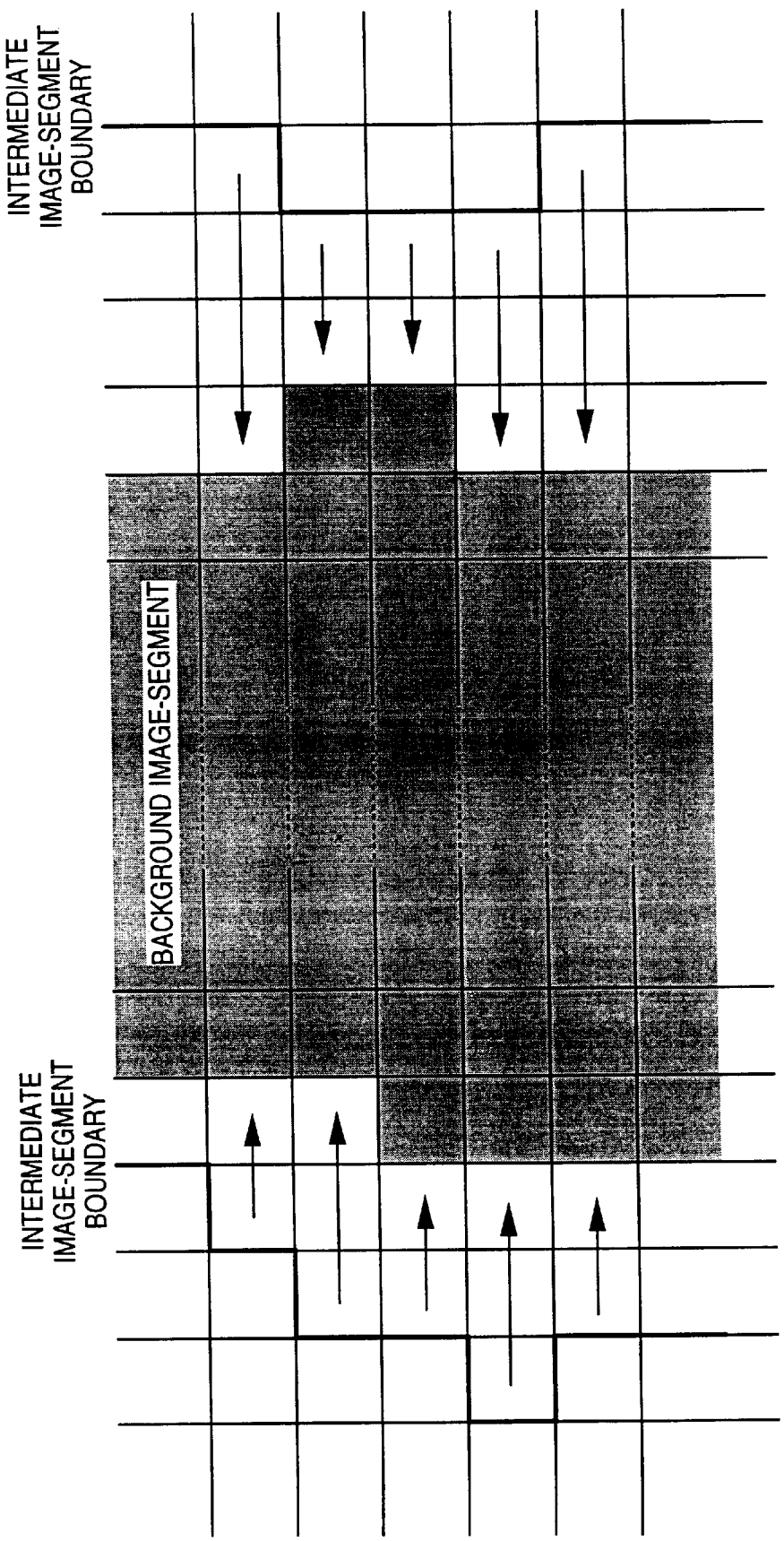
FIG. 42 is a diagram for describing a method of measuring area outside a background.

FIG. 42 is a diagram for describing a method of measuring the background outside area. First, with regard to each sub-scan of an inputted intermediate image segment, the number of pixels (representative of area) for which flags have not been raised (the pixels correspond to the arrows in FIG. 42) is measured from left and right boundaries of the intermediate image segment to the sides of the image segment extracted as the background image segment, and the flags are raised for the pixels thus measured. Next, a similar measurement is performed with regard to the main scan but pixels whose flags have been raised by the measurement in the sub-scan direction are not measured.

Next, at step S906, the ratio of the measured background outside area to the area of the intermediate image segment [=(measured background outside area)/(area of intermediate image segment), hereinafter referred to as the "background outside-area ratio"] is obtained and this ratio is compared with a predetermined threshold value. When the ratio is less than the threshold value, it is judged that the extracted image segment is appropriate as the background image segment and the program proceeds to step S909; otherwise, it is judged that the extracted image segment is inappropriate as the background image segment and the program proceeds to step S907.

Steps S907 and S908 determine whether extraction of a background image segment is to be performed again. This determination uses a re-extraction flag A, which indicates whether this is the initial discrimination of a background image-segment shape, and the background outside area ratio prevailing immediately prior to re-extraction (this ratio shall be referred to as the "preceding extraction ratio"). It should be noted that these values are stored in the RAM 2006. If the re-extraction flag A is discriminated and this is found to be the initial discrimination at step S907, then the program proceeds to step S903 and re-extraction is executed; otherwise, the program proceeds to step S908, where the value of (background outside-area ratio)/(preceding extraction ratio) is compared with a predetermined threshold value. If the threshold value is larger, the program returns to step S903 and re-extraction is executed; otherwise, it is judged that there is no background image segment and processing is terminated. It should be noted that in the case where re-extraction is performed, the background color range is widened. If the discrimination of the background image segment of the inputted intermediate image segment is finished, the re-extraction flag A and the background color range are reset.

Steps from step S909 to S915 correspond to the generated intermediate image-segment discrimination step 2232. The binary image representing background image segment undergoes a black-white reversal at step S909, connected components are extracted from the black-white reversed binary image at step S910, the area of the extracted connected components is measured at step S911, and the number of connected components for which the area is less than a predetermined threshold value (these connected components shall be referred to as "small connected components") is measured. The number of small connected components is compared with a predetermined threshold value at step S913. If the number is less than the threshold value, it is judged that the extracted image segment is appropriate as the background image segment and the program proceeds to step S916; otherwise, it is judged that the extracted image segment is inappropriate as the background image segment and the program proceeds to step S914.

Whether or not extraction of the background image segment is to be performed again is determined at steps S914 and S915. This determination uses a re-extraction flag B, which indicates whether this is the initial discrimination of a generated intermediate image-segment, and the number of a small connected components prevailing immediately prior to re-extraction (this number shall be referred to as the "preceding extraction number"). It should be noted that these values are stored in the RAM 2006. If the re-extraction flag B is discriminated and this is found to be the initial discrimination at step S914, then the program returns to step S903 and re-extraction is executed; otherwise, the program proceeds to step S915, where the value of (number of small connected components)/(preceding extraction number) is compared with a predetermined threshold value. If the threshold value is larger, the program returns to step S903 and re-extraction is executed; otherwise, it is judged that there is no background image segment and processing is terminated. It should be noted that in the case where re-extraction is performed, the background color range is widened. If the discrimination of the background image segment of the inputted intermediate image segment is finished, the re-extraction flag B and the background color range are reset.

Steps S916 through S920 correspond to the background image-segment shaping step 224. At step S916, noise is removed from the binary image, which represents the extracted background image segment, by application of well-known reduction/enlargement processing, and small image segments are removed from the noise-free binary image at steps S917 through S919. First, with regard to the noise-free binary image, a label image is created in the working memory and connected components are extracted by well-known labeling processing at step S917. The label image is one in which a unique number is assigned to each connected component and the numbers are made the pixel values of the connected components. Next, the number of pixels (the area) of each connected component is obtained and stored in the working memory at step S918. Next, at step S919, connected components for which the numbers of pixels are less than the threshold value (namely connected components of a small area) are eliminated. In other words, the values of pixels corresponding to these connected components of the binary image are made "0"s.

Next, it is determined at step S920 whether there are any remaining connected components (background image segments). If the answer is "YES", then it is determined that there is a background image segment; otherwise, it is determined that there are no background image segments. In a case where there is a background image segment, a binary image indicative of a background image segment remains in the working memory.

Thus, in accordance with this embodiment as described above, a background image segmentation step is proposed in which it is determined whether the extracted background image segment is appropriate or not, thus making it possible to avoid needless splitting of an image segment in a color document image having a portion in which there is little change in brightness and color, and in a color document image having a large amount of noise.

In accordance with each of the embodiments described above, a color document image in which image segments having different characteristic are mixed can be subjected to excellent processing (image zooming, reduction of quantity of data and structuring of data, etc.).

<Fifth Embodiment>

An image processing apparatus according to a fifth embodiment of the present invention will now be described. Components in the fifth embodiment similar to those of the first through fourth embodiments are designated by like characters and need not be described in detail again.

Each of the foregoing embodiments makes it possible to segment a color image into image segments in excellent fashion. On the other hand, since document images generally are large in size, segmentation into image segments requires a great detail of processing time. In addition, fields which utilize image segmentation methods employ DTP and filing systems are premised upon processing for carrying out dialog with the user and there is a need for high-speed processing that can be executed without hindering the processing for effecting the dialog with the user. In a case where the techniques of the foregoing embodiments are provided in the form of software and implemented by a computer, there are situations in which too much processing time is needed when the input image is large.

In order to overcome this difficulty, this embodiment does not directly apply the techniques of the foregoing embodiments to the input image but applies them instead to an image obtained by reducing the input image. As a result, image segments are extracted at a high speed equivalent to that obtained when direct extraction is performed using the input image, with the extraction of this embodiment being based upon data indicative of image segments extracted from a reduced image.

Since a reduced image is such that the size of the image to be processed is small, image-segment extraction can be performed at high speed. Accordingly, it will suffice to extract an image segment by re-utilizing parameters, which have been calculated from the reduced image, in the range of the reduced image segment even if the input image is one having a large image size. As a result, high-speed processing becomes possible. This means that an overall higher processing speed can be obtained in comparison with that achieved by directly applying the techniques of the foregoing embodiments to the input image.

As an example of an image segmentation technique using a reduced image or a hierarchical image (a collection of a plurality of reduced images having different reduction ratios), see "Dialog-type Analytical Support System in Understanding of Document Images, and Document Image Data-Base Editing Management System", Kato, Hanaki, Sakai, *Technical Report of the Institute of Electronics, Information and Communication Engineers of Japan*, PRL84-101, pp. 65–72 (1984). This method is used for application to binary images.

As described earlier, the color of the background can be assumed in advance (to be white, for example) in the case of a binary image, but the color of the background cannot be assumed in the case of a color image to which this embodiment is applied. As a consequence, there are situations in which image segments necessary when creating a reduced image are eliminated, as a result of which image segments happen to be omitted. (In the case of a binary image, this can be avoided by giving priority to elimination of white pixels constituting the background.) For these and other reasons, the conventional binarization method can be directly applied to a color document image.

Further, in the case of a binary image, there is little overlapping of image segments (or of circumscribed rectangles enclosing image segments) and image-segment shapes in the input image need only be extracted by focusing solely upon the positions of the image segments obtained from the reduced image (i.e., the positions of the image segments need only be cut from the input image). By contrast, in the case of a color image, there are instances in which image segments (or circumscribed rectangles enclosing image segments) overlap, and it is necessary that image-segment shapes in the input image be extracted upon taking into account not only the positions of the image segments obtained from the reduced image but also the shapes of the image segments obtained from the reduced image.

[Processing Procedure]

Figure 43:
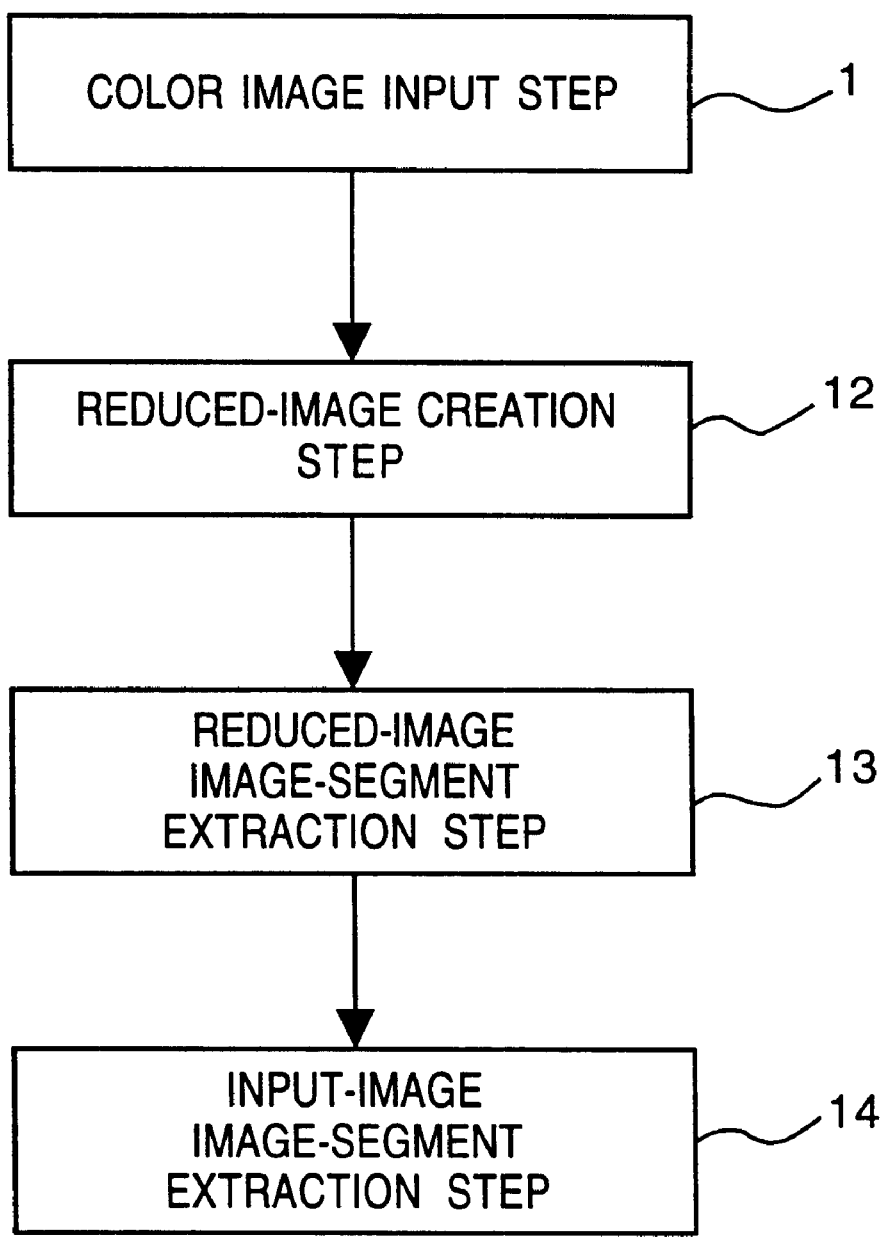
FIG. 43 is a diagram showing the composition of a color image processing method according to a fifth embodiment of the present invention.

FIG. 43 is a diagram showing a processing procedure in an image processing apparatus according to a fifth embodiment. A digital color image to undergo processing is inputted at a color image input step 1, a reduced image is created from the input color image at a reduced-image image-segment extraction step 13, and an image segment is extracted from the input image based upon image-segment data extracted from the reduced image.

[Construction of Apparatus]

Figure 44:
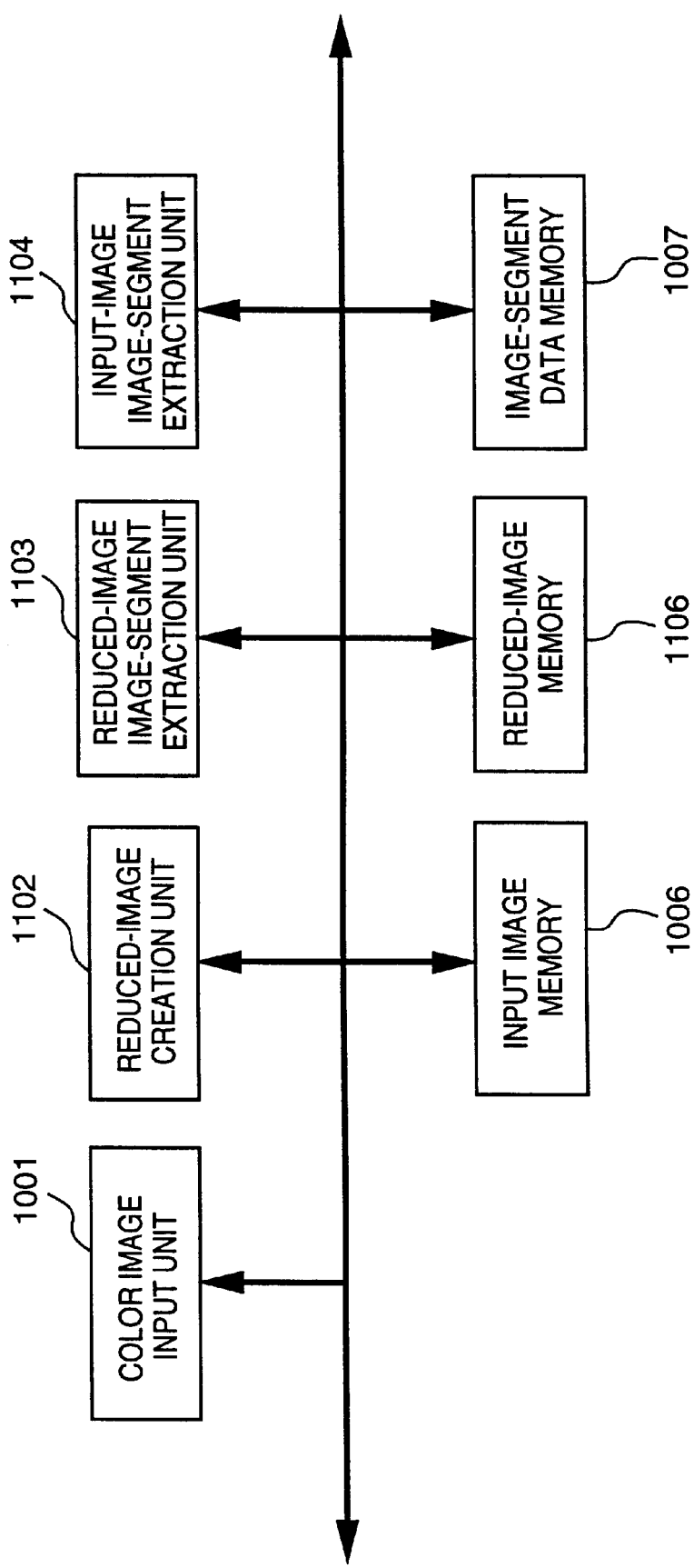
FIG. 44 is a diagram showing the construction of a color image processing apparatus which executes the illustrated processing.

FIG. 44 is a diagram showing the construction of a color image processing apparatus which executes the processing illustrated in FIG. 43. The hardware for implementing the arrangement shown in FIG. 44 has a construction the same as that of FIG. 3 described in the first embodiment and need not be described again.

In FIG. 44, the color image input unit 1001 inputs digital color image data to be processed and stores this data in the input image memory 1006.

A reduced-image creation unit 1102 creates reduced-image data from the color image data stored in the input image memory 1006 by the color image input unit 1001 and stores the created data in a reduced-image memory 1106.

A reduced-image image-segment extraction unit 1103 extracts an image segment from the reduced image created by the reduced-image creation unit 1102 and stored in the reduced-image memory 1106 and stores this image-segment data in the image-segment data memory 1007.

An input-image image-segment extraction unit 1104 extracts an image segment in the input image from the image-segment data of the reduced image extracted by the reduced-image image-segment extraction unit 1103 and stored in the image-segment data memory 1007 and stores this image-segment data in the image-segment data memory 1007.

The reduced-image creation unit 1102, the reduced-image image-segment extraction unit 1103 and the input-image image-segment extraction unit 1104 can be realized by the CPU 2001, which operates in accordance with the program stored in the ROM 2006 or storage device 2002, and the RAM 2006 or memory device 2002 used as a working memory. It goes without saying that these can also be realized by their own CPUs, RAMs and memories or by their own hardware.

Further, the input image memory 1006, the reduced-image memory 1106 and the image-segment data memory 1007 can be realized by the RAM 2006 or memory device 2002 in FIG. 4. It goes without saying that these memories can be realized by their own storage devices.

[Details of Processing]

The main steps shown in FIG. 43 will now be described in detail while using the arrangement of FIG. 44.

Color Image Input Step

The color image input step 1 inputs digital color image data to be processed and stores the inputted image data in the input image memory 1006.

Reduced-image Creation Step

A reduced-image creation step 12 creates reduced-image data of the color image data stored in the input image memory 1006 by the color image input step 1 and stores the created data in the reduced-image memory 1106. Here the reduced image is obtained by reducing the size of the input image in the horizontal and vertical directions by 1/N (where N is an arbitrary natural number and 1/N shall be referred to as the "reduction ratio"). The reduction ratio should be within a range which will not influence subsequent processing even through reduction is carried out and is suitably designated depending upon the size and content of the input image.

Figure 45:
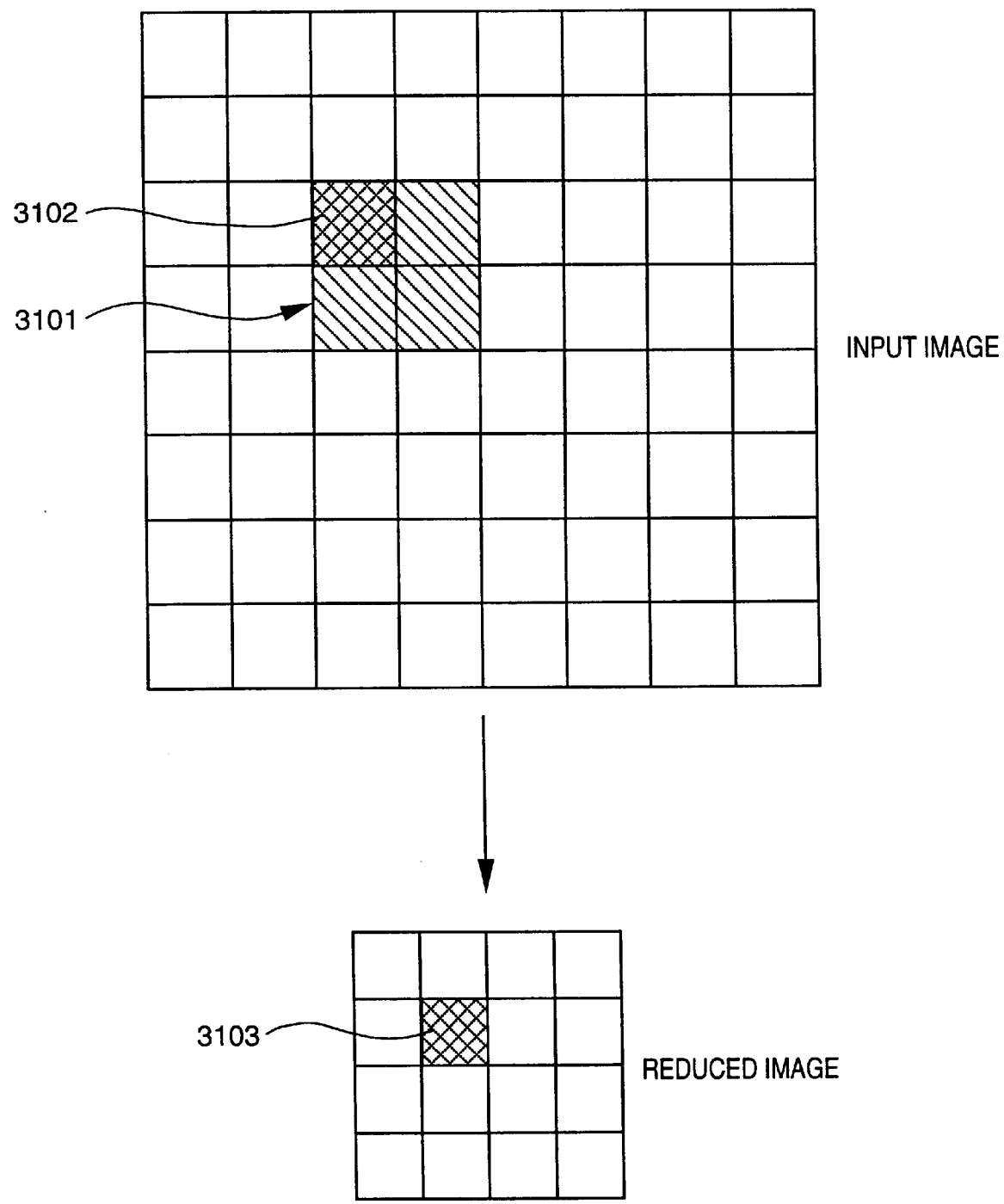
FIG. 45 is a diagram for describing a step of forming a reduced image.

The reduced-image creation step 12 can be implemented by a well-known method of creating an image in which pixels are removed by being thinned out. An example of creation of an image reduced by ½ in the vertical and horizontal directions by a well-known method of creating an image in which pixels are removed by being thinned out is as follows: The input image is divided into blocks 3101 of two pixels vertically and two pixels horizontally (for a total of four pixels) shown in FIG. 45, and one pixel in each block (say a pixel 3102 in the upper left-hand corner) is made one corresponding pixel 3103 of the reduced image, whereby an image reduced by ½ vertically and horizontally can be created. Though an example has been described in which an image reduced by ½ vertically and horizontally is created, an image reduced to 1/N vertically and horizontally can be obtained if the blocks are made three pixels in each of the horizontal and vertical directions (for a total of nine pixels), four pixels in each of the horizontal and vertical directions (for a total of 16 pixels), five pixels in each of the horizontal and vertical directions (for a total of 25 pixels), etc.

Further, an average value of each of the R, G, B values of all pixels in the block may be adopted as the pixel value of the reduced image.

Reduced-image Image-segment Extraction Step

A reduced-image image-segment extraction step 13 extracts an image segment from the reduced image created by the reduced-image creation unit 12 and stored in the reduced-image memory 1106 and stores this extracted image-segment data in the image-segment data memory 1007. The reduced-image image-segment extraction step 13 can be realized by the image-segment extraction step 2 described in the first embodiment.

Input-image Image-segment Extraction Step

An input-image image-segment extraction step 14 creates image-segment data in an input image from image-segment data of a reduced image extracted by the reduced-image image-segment extraction step 13 and stored in the image-segment data memory 1007.

Figure 46:
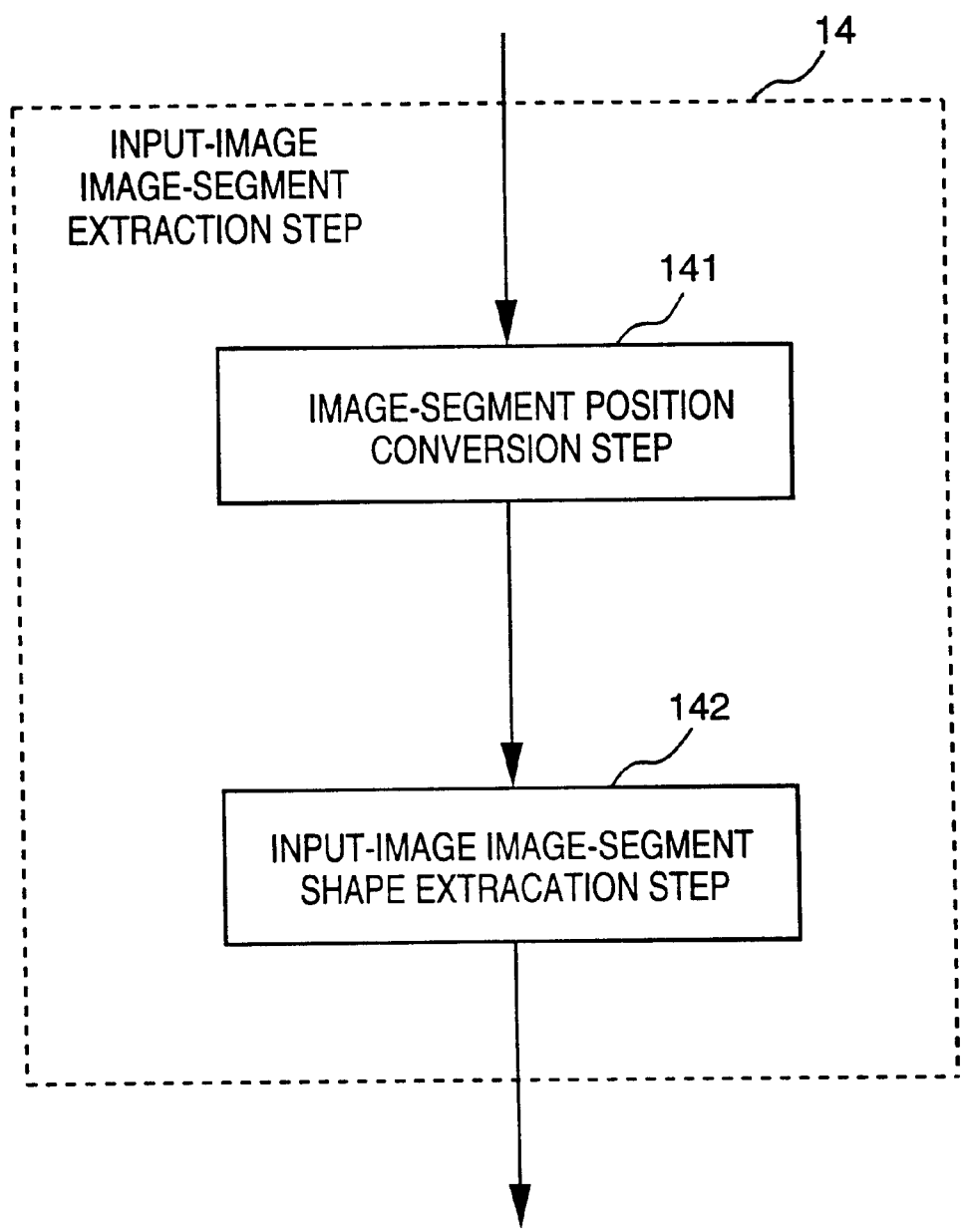
FIG. 46 is a diagram showing the constitution of an input-image image-segment extraction step depicted in FIG. 43.
Figure 47:
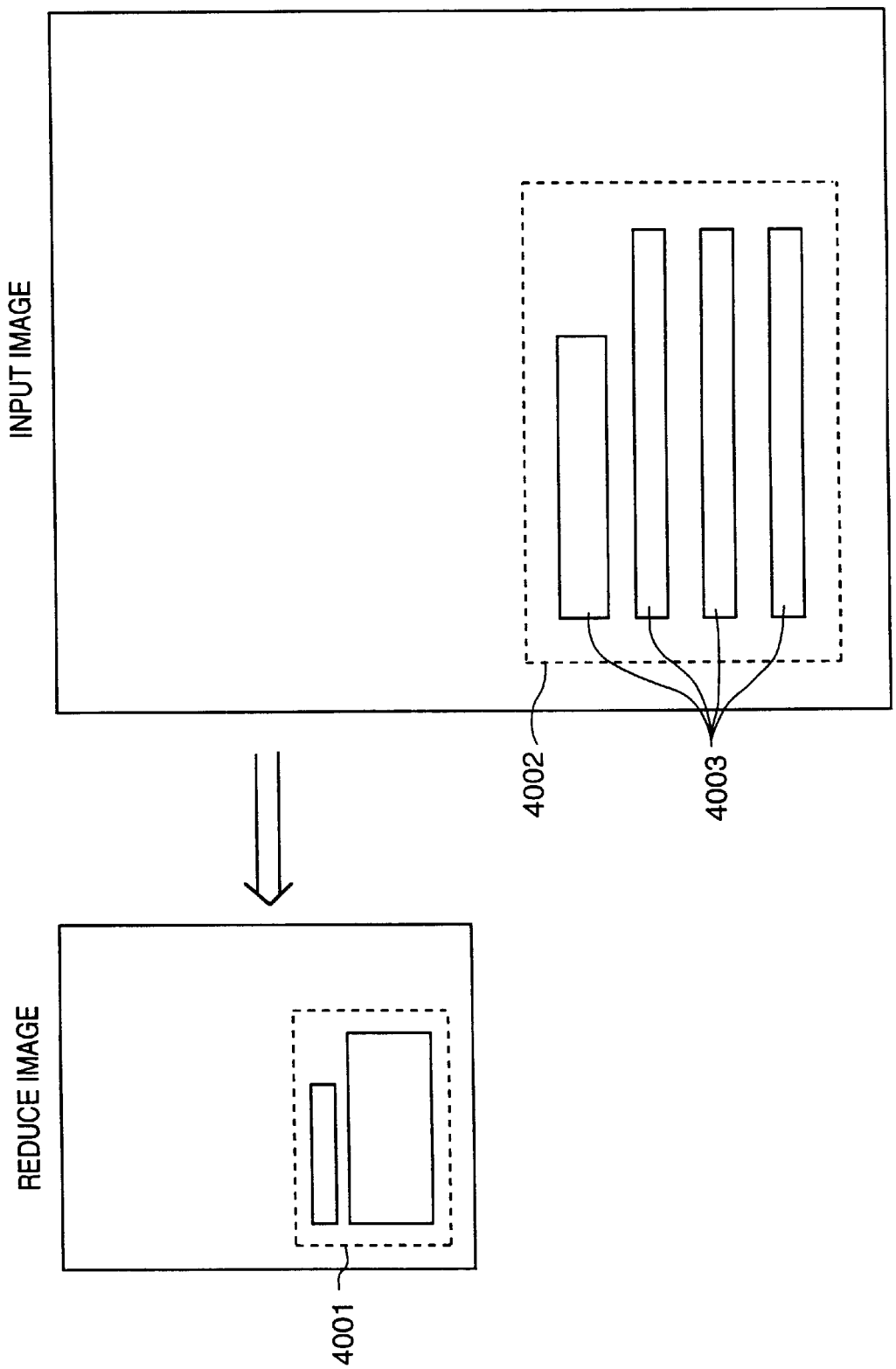
FIG. 47 is a diagram showing the form of processing of an input-image image-segment extraction step depicted in FIG. 43.

Part of the input-image image-segment creation step 14 is shown in FIG. 46. The manner of processing of the input-image image-segment creation step 14 is illustrated in FIG. 47. In the input-image image-segment creation step 14, the process illustrated in FIG. 46 is performed with regard to all image segments that have been stored in the image-segment data.

In FIG. 46, an image-segment position conversion step 141 calculates an image-segment position (indicated at 4002 in FIG. 47) in the input image from an image-segment position (indicated at 4001 in FIG. 47) in a reduced image of image-segment data. The calculated position is stored in the image-segment data. More specifically, the X, Y coordinates and values of width and height of the image-segment position are multiplied by the reciprocal N of the reduction ratio.

An input-image image-segment shape extraction step 142 extracts an image-segment shape of the input image in a rectangular image segment of the image-segment position in the input image calculated at the image-segment position converting step 141. More specifically, a rectangular image segment of the image-segment position calculated at the image-segment position conversion step 141 is binarized into a background color and image segments other than the background color, a binary image (indicated at 4003 in FIG. 47) indicating the image-segment shape in the input image is extracted and this is stored in the image-segment shape of the image-segment data. The background color uses the value (stored as the image-segment color in the image-segment color of the background image segment) calculated at the background image segmentation step (see FIG. 7) in the reduced-image image-segment extraction step 13. As a result, the background color need not be re-calculated and a simple binarization processed need only be applied to a limited image segment of the input image, thus making it possible to executed processing at high speed.

[Application of this Embodiment]

The image-segment data extracted at the input-image image-segment extraction step 14 is capable of being utilized in zooming of color images, reduction of the quantity of data and structuring of documents by the methods described in the foregoing embodiments.

Figure 48:
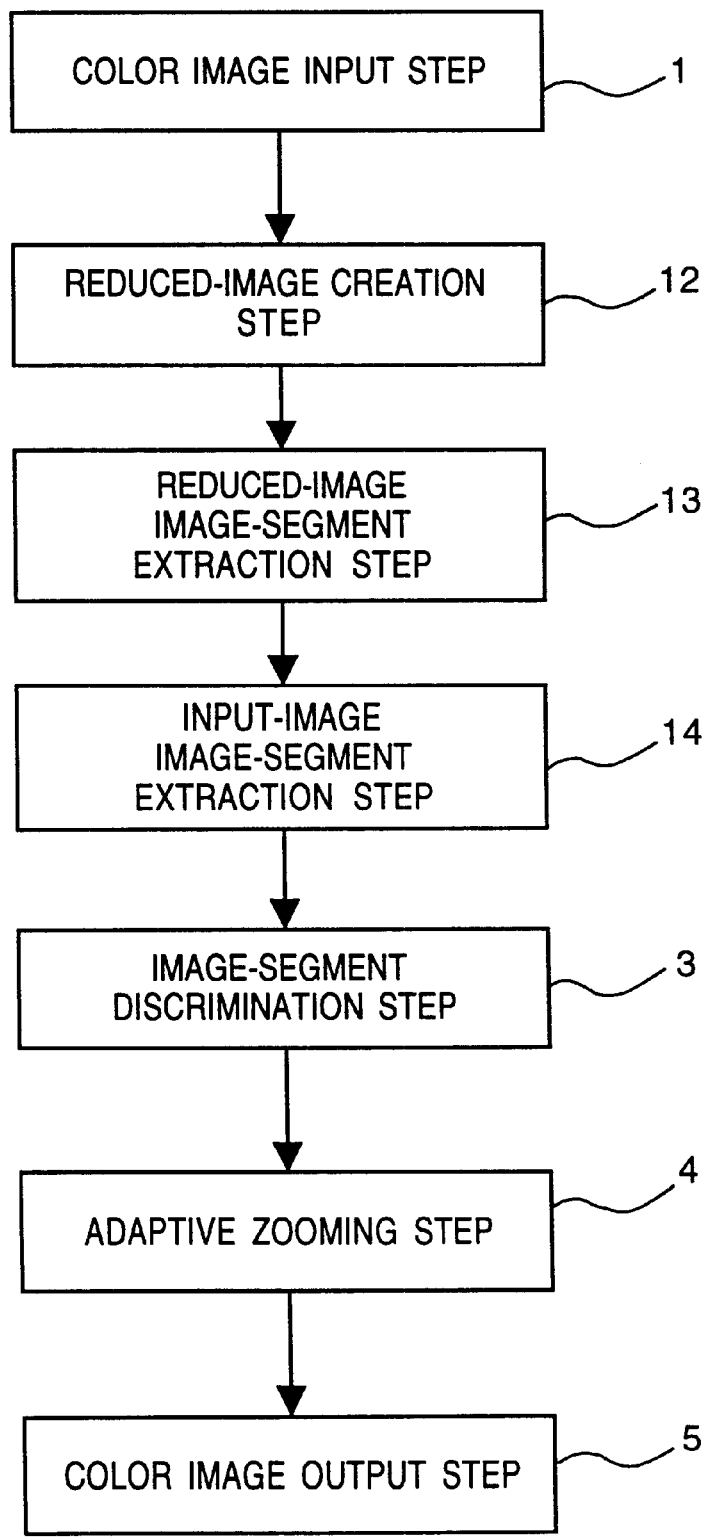
FIG. 48 is a diagram showing an example in which image-segment data extracted by the input-image image-segment extraction step of FIG. 43 is applied to the color image zoom method described in connection with the first embodiment.

FIG. 48 is a diagram showing an example in which image-segment data extracted by the input-image image-segment extraction step 14 is applied to the color image zoom method (FIG. 2) described in connection with the first embodiment.

Specifically, the image-segment discrimination step 3 discriminates image-segment components (continuous color tone components, etc.) of each image segment extracted at the input-image image-segment extraction step 14. The adaptive zooming step 4 subjects each image segment extracted by the input-image image-segment extraction step 14 to zoom processing conforming to the image-segment component discriminated at the image-segment discrimination step 3, thereby creating a zoomed image of the input image. The color image output step 5 displays, makes a hard copy of or delivers to a communication line the zoomed image created by the adaptive zooming step 4.

Figure 49:
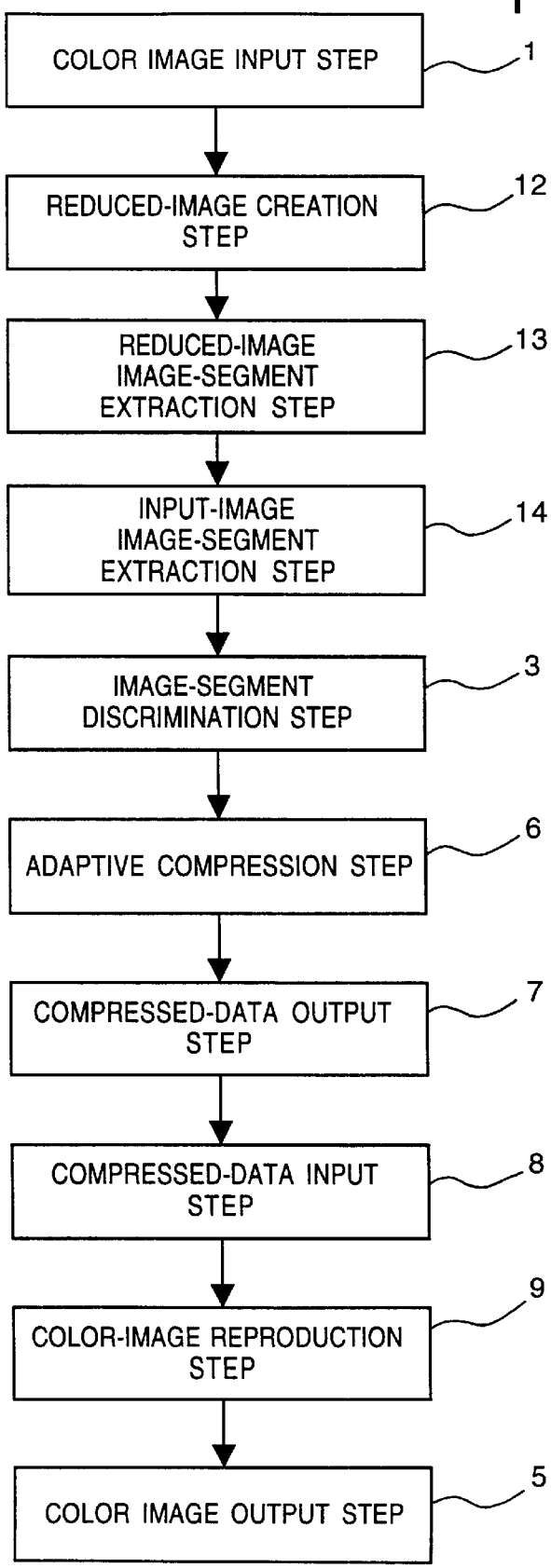
FIG. 49 is a diagram showing an example in which image-segment data extracted by the input-image image-segment extraction step of FIG. 43 is applied to the color image compression method described in connection with the second embodiment.

FIG. 49 is a diagram showing an example in which image-segment data extracted by the input-image image-segment extraction step 14 is applied to the color image compression method (FIG. 25) described in connection with the second embodiment.

Specifically, the image-segment discrimination step 3 discriminates the type of each image segment extracted at the input-image image-segment extraction step 14 and stores the result of discrimination in the image-segment data. The adaptive compression step 6 subjects each image segment extracted by the input-image image-segment extraction step 14 to compression processing conforming to the type of image-segment component discriminated at the image-segment discrimination step 3, thereby compressing the input image data. The compressed-data output step 7 outputs the compressed data created at the adaptive compression step 6 by transmitting the compressed data to a communication line or writing the compressed data in an image storage device.

According to the compressed-data input step 8, the data compressed at the adaptive compression step 6 is inputted by being received from a communication line or read in from an image storage device. The data compressed at the adaptive compression step 6 is reproduced as color image data at the color image reproduction step 11. The image reproduced at the color image reproduction step 11 is displayed or produced as a hard copy at the color image output step 5.

Here the steps from the color image input step 1 to the compressed-data output step 7 are executed when the color image is compressed. The steps from the compressed-data input step 8 to the color image output step 5 are executed when image data is reproduced from the compressed data.

Figure 50:
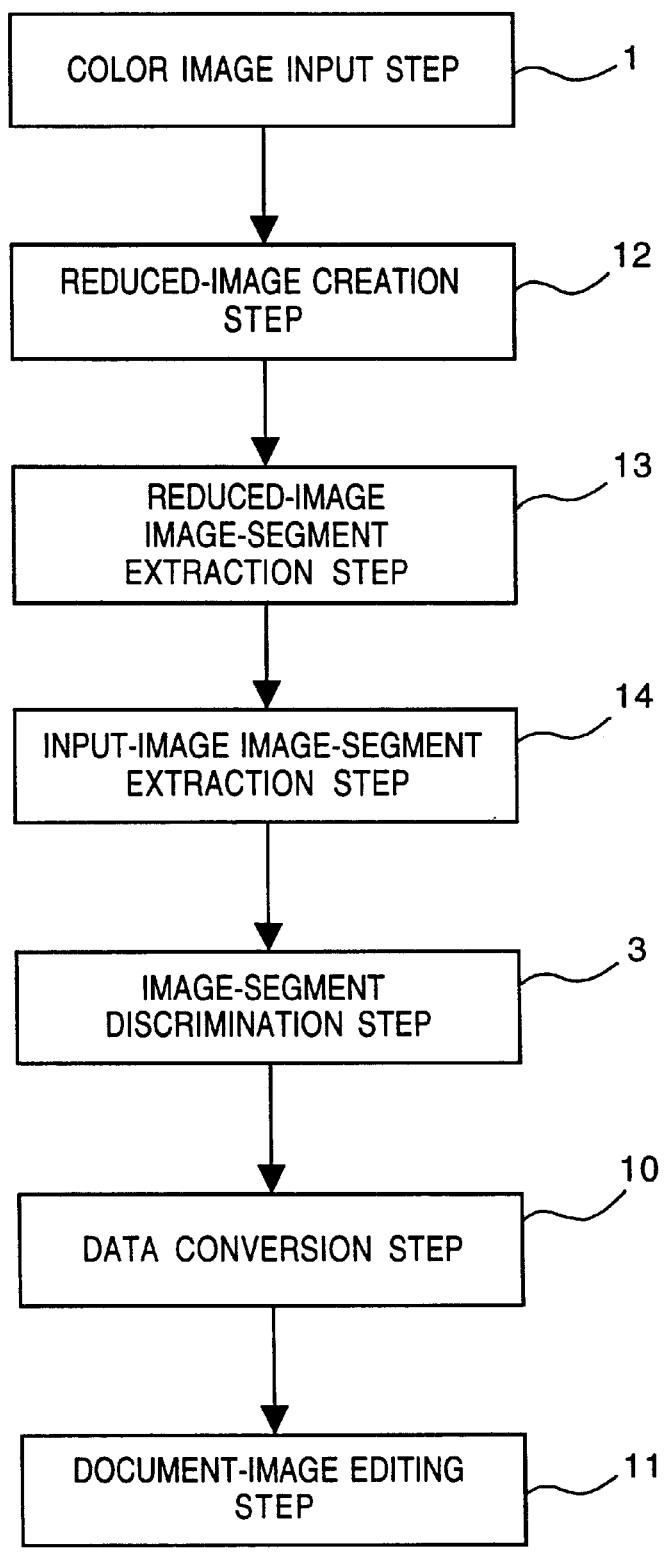
FIG. 50 is a diagram showing an example in which image-segment data extracted by the input-image image-segment extraction step of FIG. 43 is applied to the structuring of a document image described in connection with the third embodiment.

FIG. 50 is a diagram showing an example in which image-segment data extracted by the input-image image-segment extraction step 14 is applied to the structuring (FIG. 35) of a document image described in connection with the third embodiment.

Specifically, the image-segment discrimination step 3 discriminates the type of each image segment extracted at the input-image image-segment extraction step 14 and stores the result of discrimination in the image-segment data. According to the data conversion step 10, image-segment data created by the process up to the image-segment discrimination step is converted, for each image segment, to image data having a data format suitable for the editing of a document image in a DTP apparatus or the like. In the document image editing step 11, editing and output of a document image are performed by a well-known document image editing method for editing the document image in accordance with a designation from the user.

<Sixth Embodiment>

Figure 52:
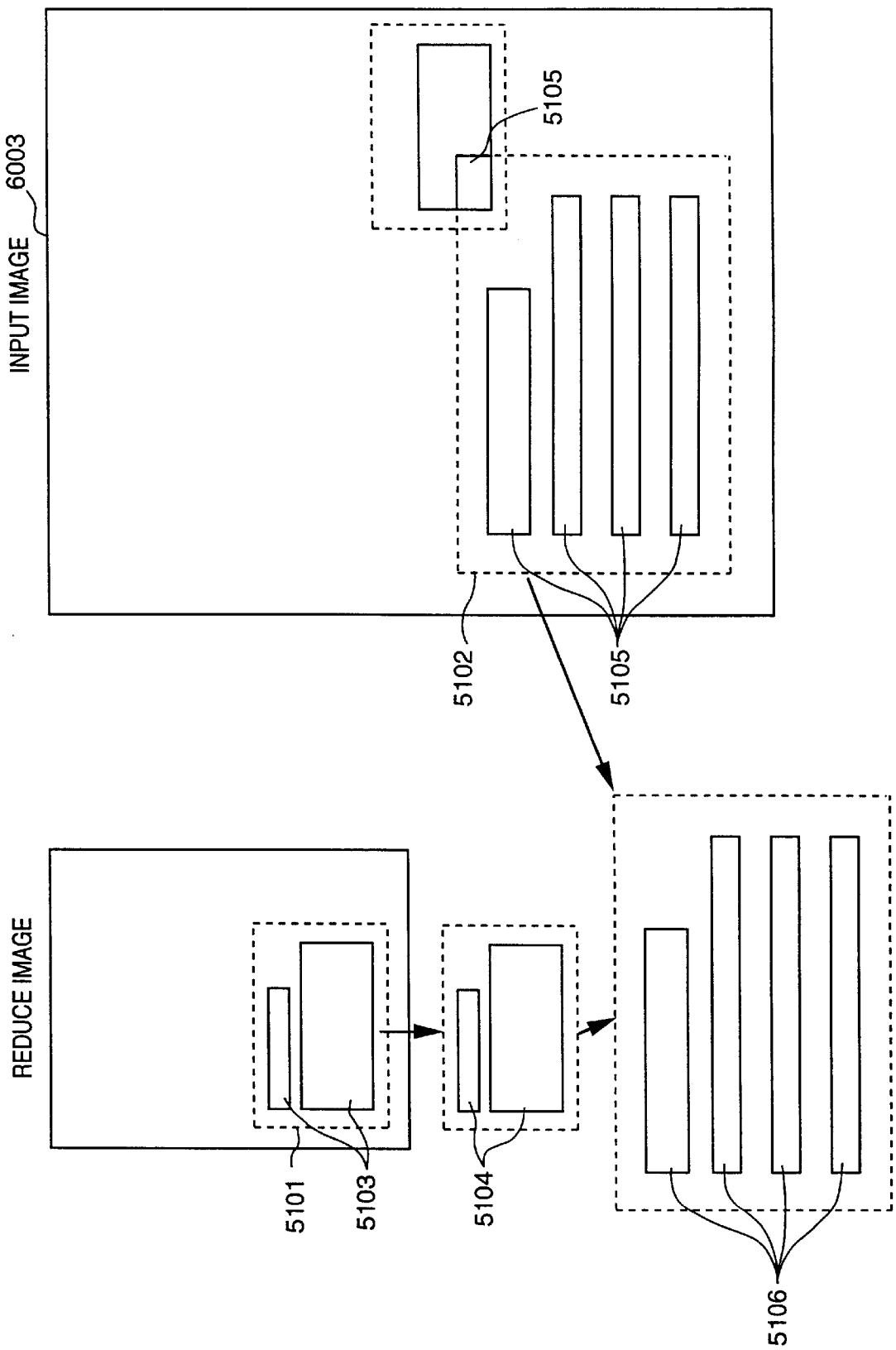
FIG. 52 is a diagram showing the form of processing of the input-image image-segment extraction step depicted in FIG. 51.

An image processing apparatus according to a sixth embodiment of the present invention will now be described. Components in the sixth embodiment similar to those of the first through fifth embodiments are designated by like characters and need not be described in detail again. The input-image image-segment extraction step 14 in the fifth embodiment binarizes a portion corresponding to the image-segment position of each image segment extracted from a reduced image of the input image and calculates the image-segment shape in the input image. This method makes it possible to obtain excellent results by comparatively simple calculations. However, in a case where circumscribed rectangles enclosing extracted image segments overlap, as shown in FIG. 52, a problem which arises is that the shape of another image segment also happens to be extracted at the overlapping portion.

The input-image image-segment extraction step 14 of this embodiment solves the above-mentioned problem and makes it possible to extract image-segment shapes correctly even in a case where the input image has overlapping circumscribed rectangles enclosing image segments.

Figure 51:
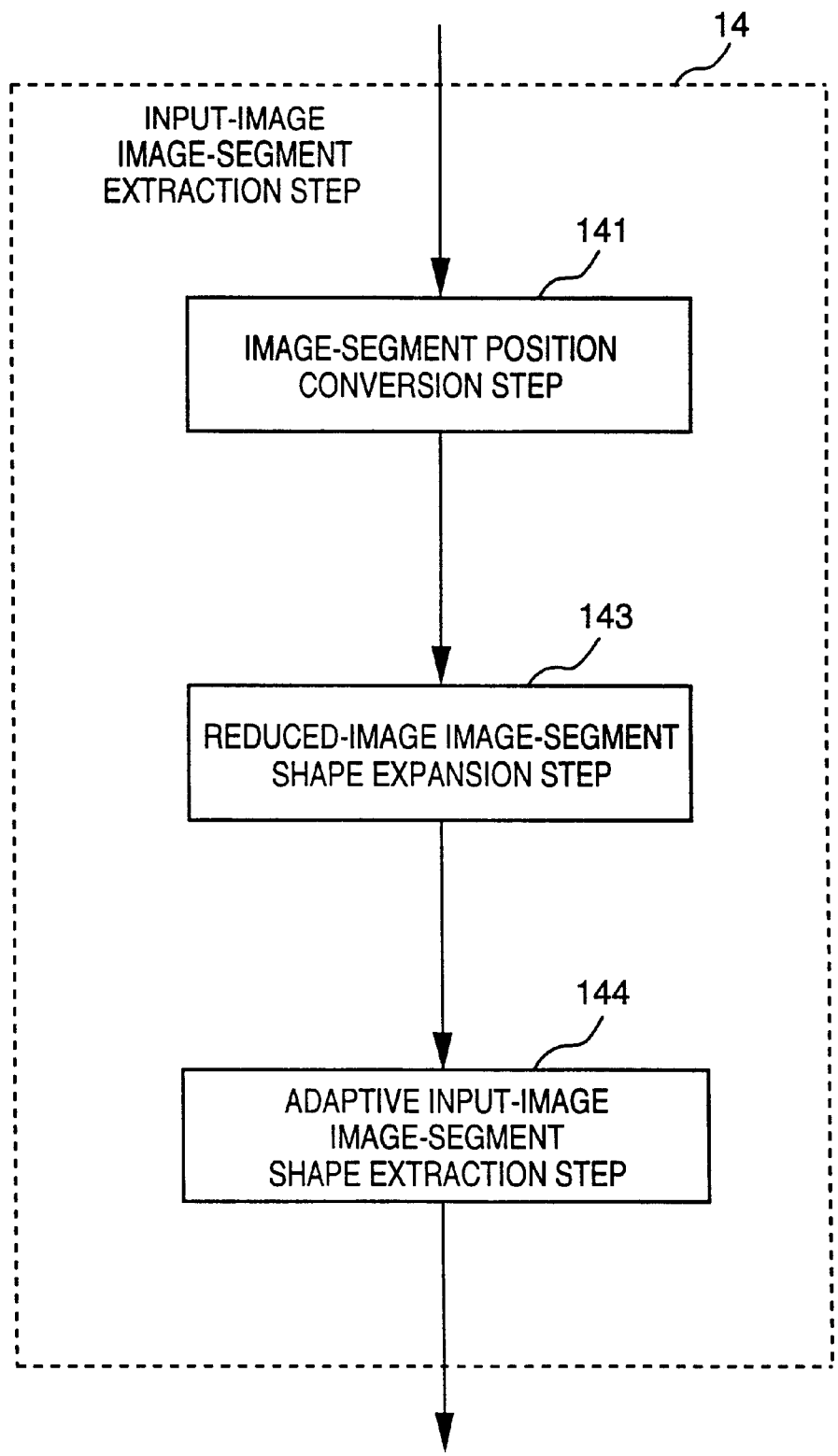
FIG. 51 is a diagram showing the constitution of an input-image image-segment extraction step according to a sixth embodiment of the present invention.

FIG. 51 is a diagram showing part of the input-image image-segment extraction step 14 of this embodiment. The manner of processing of the input-image image-segment creation step of this embodiment is illustrated in FIG. 52. In the input-image image-segment extraction step 14, the process illustrated in these Figures is performed with regard to all image segments that have been stored in the image-segment data.

In FIG. 51, the image-segment position conversion step 141 calculates an image-segment position (indicated at 5102 in FIG. 52) in the input image from an image-segment position (indicated at 5101 in FIG. 52) in a reduced image of image-segment data, as in the fifth embodiment. The calculated position is stored in the image-segment data.

A reduced-image image-segment shape expansion step 143 applies well-known expansion processing to a binary image (indicated at 5103 in FIG. 52) indicative of an image-segment shape in the reduced image extracted by a reduced-image image-segment extraction step 13. (An expanded image indicated at 5104 in FIG. 52 shall be referred to as an "expanded image".) Expansion processing is performed a number of times which is the reciprocal of the reduction ratio (namely N times).

A selective input-image image-segment shape extraction step 144 extracts an image segment in the input image in the same manner as the input-image image-segment shape extraction step 142 of the fifth embodiment. According to step 144, however, reference is made to the expanded image, which has been created at the reduced-image image-segment shape expansion step 143, in such a manner that extraction will not extend to other image segments owing to overlapping of circumscribed rectangles. More specifically, with regard to each pixel of a rectangular image segment at image-segment position 5102 in the input image calculated at the image-segment position conversion step 141, only pixels (the portions at 5105 in FIG. 52) having a value other than that of the background color and for which the corresponding pixels of the expanded image 5104 created at the reduced-image image-segment shape expansion step 143 are pixels in the relevant image segment (where the pixel values are "1"s) are adopted as pixels (of value "1") constructing the image segment (indicated at 5106 in FIG. 52). The binary image thus created is stored as the image-segment shape of the image-segment data.

Of course, as in the fifth embodiment, the background color uses a value calculated by the background image segmentation step (see FIG. 7) of the reduced-image image-segment extraction step 13. (The value has been stored as an image-segment color in the image-segment data of the background image segment.)

It should be noted that this embodiment is capable of being implemented without the reduced-image image-segment shape expansion step 143. Though the results of extraction will be inferior if there is no reduced-image image-segment shape expansion step 143, an advantage gained is that the process is simplified.

In accordance with the input-image image-segment extraction step 14 of this embodiment, the processing is more complicated in comparison with the input-image image-segment extraction step 14 of the fifth embodiment. However, excellent results of image-segment extraction can be obtained even if circumscribed rectangles enclosing image segments overlap.

<Seventh Embodiment>

An image processing apparatus according to a seventh embodiment of the present invention will now be described. Components in the seventh embodiment similar to those of the first through sixth embodiments are designated by like characters and need not be described in detail again.

The input-image image-segment extraction step 14 of the sixth embodiment extracts the image segments of an input image by combining image-segment shapes extracted from a reduced image and the results of binarizing the input image. This method provides excellent results of extraction even if circumscribed rectangles enclosing image segments overlap. However, when a color original image is reduced, there are occasions where the shape of an image segment in the reduced image is omitted owing to elimination of a part of the image segment. As a consequence, the shape of an image segment in the input image finally extracted is omitted as well.

The input-image image-segment extraction step 14 of this embodiment solves the problem wherein part of the shape of an image segment is eliminated.

Figure 53:
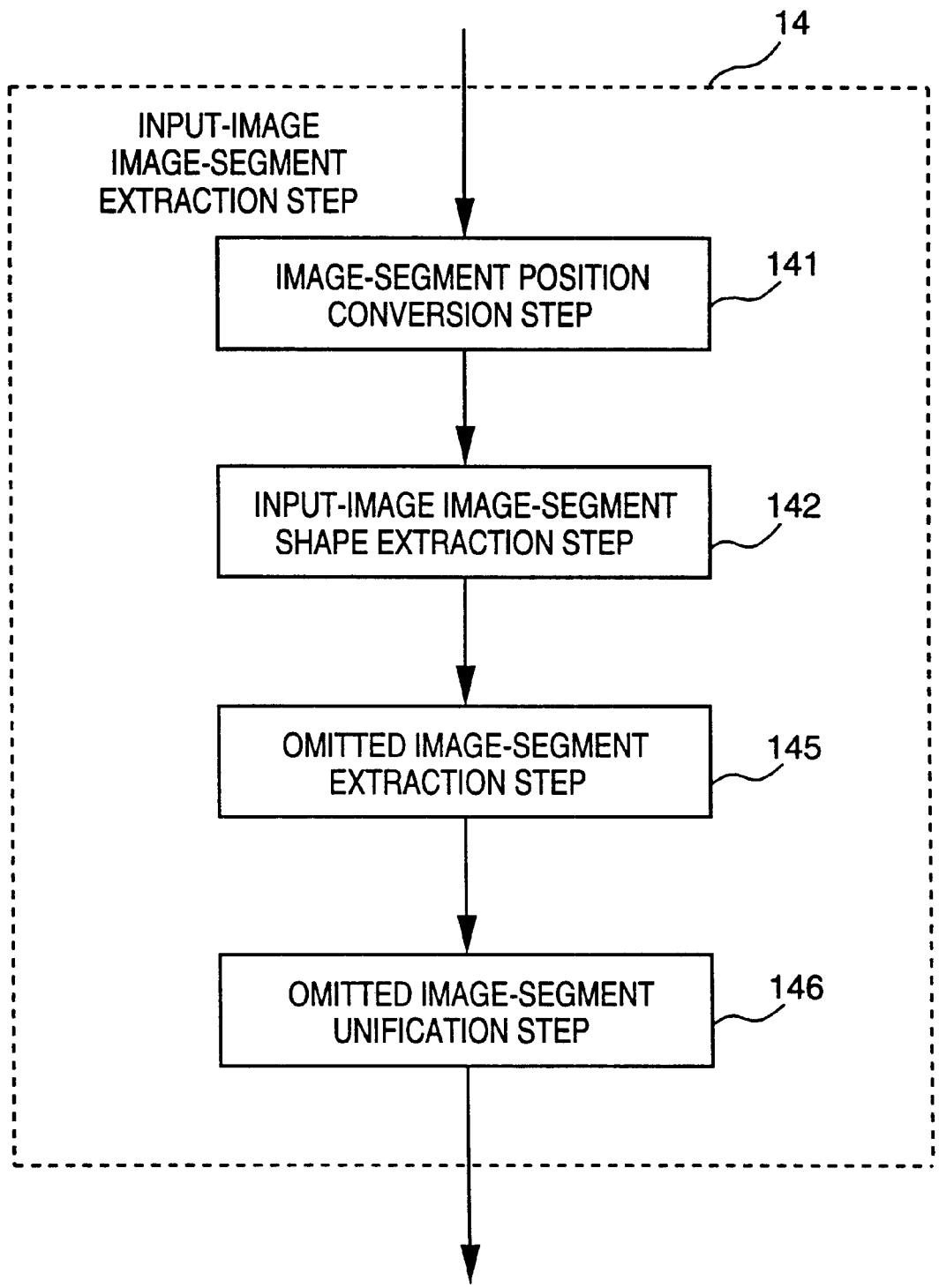
FIG. 53 is a diagram showing the constitution of an input-image image-segment extraction step according to a seventh embodiment of the present invention.

FIG. 53 is a diagram showing part of the input-image image-segment extraction step 14 according to this embodiment. The manner of the processing of the input-image image-segment extraction step 14 is illustrated in FIG. 54. According to the input-image image-segment extraction step 14, the process shown in FIG. 53 is applied to a collection of image segments (hereinafter referred to as "a group of image segments of the same level") having the same background image segment shown in FIG. 55, and is applied to all image segments that have been stored as the image-segment data.

In FIG. 53, with regard to each image segment of the group of image segments of the same level, the image-segment position conversion step 141 calculates an image-segment position (indicated at 6002 in FIG. 54) in the input image from an image-segment position (indicated at 6001 in FIG. 54) in a reduced image of image-segment data, as in the fifth embodiment. The calculated position is stored in the image-segment data.

The input-image image-segment shape extraction step 142 extracts a rectangular image segment (indicated at 6003 in FIG. 54) corresponding to the image-segment position (i.e., the image-segment position of the background image segment) of the group of image segments of the same level in the input image calculated at the image-segment position conversion step 141. In other words, as in the input-image image-segment shape extraction step 142 of the fifth embodiment, binarization is effected into a background color and image segments other than the background color, and an image-segment shape (indicated at 6004 in FIG. 54) contained in the group 6003 of image segments of the same level in the input image is created. Of course, as in the fifth embodiment, the background color uses a value calculated by the background image segmentation step of the reduced-image image-segment extraction step 13. (The value has been stored as an image-segment color in the image-segment data of the background image segment.)

An omitted image-segment extraction step 145 compares an image segment extracted from a reduced image and an image segment extracted from an input image, thereby extracting an area (referred to as an "omitted image segment") which is omitted at the time of reduced image creation. To this end, a number (label) specific to each image segment indicating whether a pixel is a pixel corresponding to any image segment of the group of image segments of the same level is set for each pixel of the binary image 6004 representing the image-segment shape created by the input-image image-segment shape extraction step 142. Next, in the image-segment shape of each image segment, a label (indicated at 6005 in FIG. 54) is written in pixels (whose values are "1") indicating the image segment in the binary image representing this image-segment shape. Finally, an image segment created by the input-image image-segment shape extraction step 142 and which has not been labeled is extracted as an omitted image segment (indicated at 6006 in FIG. 54).

An omitted image-segment unification step 146 unifies the omitted image segment extracted at the omitted image-segment extraction step 145 with image segments that have already been extracted. More specifically, a pixel not labeled at the omitted image-segment extraction step 145 is provided with the label of the nearest labeled pixel and is unified with image segments already extracted (indicated at 6007 in FIG. 54). Finally, circumscribed rectangles (indicated at 6008 in FIG. 54) of image segments provided with the same label are obtained, the image-segment positions are changed with respect to the image-segment data of each image segment and the binary image of the pixels having the same label is stored as the image-segment shape.

Thus, in accordance with the input-image image-segment extraction step 14 of this embodiment, excellent results of extraction can be obtained even if part of an image segment is eliminated at the time the reduced image is formed.

In accordance with the fifth through seventh embodiments as described above, image segmentation of a color document image can be performed at high speed, and in a manner equivalent to that in a case where image segmentation is performed directly with respect to an input image, regardless of the shape of the input image. A color document image can be zoomed with excellent image quality, and compression and decompression (reproduction) can be carried out with excellent image quality and at an excellent compression ratio. In addition, a color document image can be structured and the structured data can be edited.

<Other Embodiment>

The present invention can be applied to a system constituted by a plurality of devices (e.g., host computer, interface, reader, printer) or to an apparatus comprising a single device (e.g., copy machine, facsimile).

Further, the object of the present invention can also be achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type CD-ROM, CD-R, a magnetic tape, a non-volatile type memory card, and ROM can be used for providing the program codes.

Furthermore, besides the aforesaid functions according to the above embodiments being realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing method of extracting an image area from an image in which image areas having different components are mixed, comprising the steps of:
   generating a reduced image from an inputted image;
   extracting an image area from the reduced image;
   calculating a position of the image area, extracted in said first extracting step, on the inputted image;
   extracting an image area from the inputted image based on the calculated position;
   detecting an image area, which is omitted in said generating step, based on the calculated position and the image area extracted in said second extracting step; and
   unifying the image area extracted in said second extraction step and the detected image area.

2. The method according to claim 1, wherein said first extracting step comprises the steps of:
   determining whether an image area to undergo processing in the input image has an image area which will be background;
   separating the determined background image area; and
   separating at least one image area from image areas other than the background image area,
   wherein said first extracting step extracts image areas by recursively repeating said determining step and said separating steps in the image area obtained in said unifying step.

3. The method according to claim 1,
   wherein said calculating step calculates the position from position information of the image area extracted in said first extracting step and a reduction ratio of the reduced image, and
   wherein said second extracting step extracts the image area based upon a rectangular image area at the calculated position.

4. The method according to claim 1, wherein said second extracting step extracts the image area by referring to pixels of the inputted image that correspond to the image area extracted in said first extracting step.

5. The method according to claim 1, wherein said second extracting step comprises the steps of:
   applying expansion processing to a shape of the image area extracted in said first extracting step; and
   extracting the image area by referring to pixels of the inputted image that correspond to the expanded image area.

6. The method according to claim 1, wherein said second extracting step comprises the steps of:
   binarizing the inputted image to a background and portions other than the background using a value of a background color of the image area extracted in said first extracting step; and
   extracting the image area from the binarized image.

7. The method according to claim 1, wherein said generating step selects one pixel from each block comprising N×N (where N is a natural number) pixels obtained by partitioning the inputted image, and representing this block by the one pixel, thereby creating a reduced image having a reduction ration of 1/N.

8. The method according to claim 1, wherein said generating step obtains an average value of pixels of each block comprising N×N (where N is a natural number) pixels obtained by partitioning the inputted image, and representing this block by the average value, thereby creating a reduced image having a reduction ration of 1/N.

9. An image processing apparatus for extracting an image area from an image in which image areas having different components are mixed, comprising:
   a reduction unit adapted to generate a reduced image from an inputted image;
   a first extractor adapted to extract an image area from the reduced image;
   a calculator adapted to calculate a position of the image area, extracted by said first extractor, on the inputted image;
   a second extractor adapted to extract an image area from the inputted image based on the calculated position;
   a detector adapted to detect an image area, which is omitted by said reduction unit, based on the calculated position and the image area extracted by said second extractor; and
   a unification unit adapted to unify the image area extracted by said second extractor and the detected image area.

10. A computer program product storing a computer-readable medium comprising computer program code, which executes an image processing method for extracting an image area from an image in which image areas having different components are mixed, wherein the method comprises the steps of:

generating a reduced image from an inputted image;

extracting an image area from the reduced image;

calculating a position of the image area, extracted in said first extracting step, on the inputted image;

extracting an image area from the inputted image based on the calculated position;

detecting an image area, which is omitted in said generating step, based on the calculated position and the image area extracted in said second extracting step; and unifying the image area extracted in said second extracting step and the detected image area.

* * * * *

UNITED STATES PATENT AND TRADEMARK OFFICE
CERTIFICATE OF CORRECTION

PATENT NO. : 6,556,711 B2
DATED : April 29, 2003
INVENTOR(S) : Shinichiro Koga et al.

It is certified that error appears in the above-identified patent and that said Letters Patent is hereby corrected as shown below:

Title page,
Item [56], FOREIGN PATENT DOCUMENTS, "05274472" should read
-- 5-274472 --.

Drawings,
Sheet 2, FIGURE 19, "HOLODING" should read -- HOLDING --.
Sheet 45, FIGURE 46, "EXTRACATION" should read -- EXTRACTION --.

Column 7,
Line 18, "tone" should read -- tone, --.

Column 9,
Line 49, "there" should read -- their --.

Column 12,
Line 41, "step 102." should read -- step S102. --.

Column 13,
Line 40, "neighboring" should read -- "neighboring --.

Column 14,
Line 7, "mode" should read -- node --.

Column 18,
Line 19, "determine" should read -- determined --; and
Line 23, "is" should read -- in --.

Column 22,
Line 36, "ones" should read -- one --.

Column 24,
Line 58, "is stored" should read -- in --.

Column 25,
Line 45, "step 703," should read -- step S703, --.

Column 31,
Line 65, "detail" should read -- deal --.

Column 33,
Line 36, "ROM 2006" should read -- ROM 2004 --.

UNITED STATES PATENT AND TRADEMARK OFFICE
CERTIFICATE OF CORRECTION

PATENT NO. : 6,556,711 B2
DATED : April 29, 2003
INVENTOR(S) : Shinichiro Koga et al.

It is certified that error appears in the above-identified patent and that said Letters Patent is hereby corrected as shown below:

<u>Column 35,</u>
Line 3, "processed" should read -- process --; and
Line 5, "executed" should read -- execute --.

<u>Column 39,</u>
Line 56, "tion" should read -- ting --.

<u>Column 40,</u>
Lines 35 and 41, "ration" should read -- ratio --.

Signed and Sealed this

Seventh Day of October, 2003

JAMES E. ROGAN
*Director of the United States Patent and Trademark Office*